(12) United States Patent
Lee et al.

(10) Patent No.: US 12,119,918 B2
(45) Date of Patent: *Oct. 15, 2024

(54) TRANSMISSION SCHEMES AND MODES AND FALLBACK SCHEMES FOR THE ACCESS LINK OF SYSTEMS OPERATING IN HIGHER FREQUENCY BANDS PRELIMINARY CLASS

(71) Applicant: InterDigital Patent Holdings, Inc., Wilmington, DE (US)

(72) Inventors: Moon-il Lee, Melville, NY (US); Yugeswar Deenoo, Chalfont, PA (US); Tao Deng, Roslyn, NY (US); Janet A. Stern-Berkowitz, Little Neck, NY (US); Ravikumar V. Pragada, Warrington, PA (US); Mihaela C. Beluri, Jericho, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/466,121

(22) Filed: Sep. 13, 2023

(65) Prior Publication Data
US 2024/0063888 A1  Feb. 22, 2024

Related U.S. Application Data

(63) Continuation of application No. 17/546,467, filed on Dec. 9, 2021, now Pat. No. 11,804,891, which is a
(Continued)

(51) Int. Cl.
*H04B 7/08* (2006.01)
*H04B 7/0408* (2017.01)
(Continued)

(52) U.S. Cl.
CPC .......... *H04B 7/088* (2013.01); *H04B 7/0408* (2013.01); *H04B 7/0417* (2013.01);
(Continued)

(58) Field of Classification Search
CPC .... H04B 7/0408; H04B 7/0617; H04B 7/086; H04B 7/088; H04B 7/0413; H04B 7/0404;
(Continued)

(56) References Cited

U.S. PATENT DOCUMENTS 6,782,277 B1  8/2004  Chen et al.
9,048,894 B2 *  6/2015  Wang .................... H04B 7/043
(Continued)

FOREIGN PATENT DOCUMENTS

CN   103596245   2/2014
EP   1 562 306   8/2005
(Continued)

OTHER PUBLICATIONS

Intel Corporation, "On Cell Association in Phase Two Evaluation," 3GPP TSG-RAN WG1 #79, R1-144667, San Francisco, USA, (Nov. 17-21, 2014).

(Continued)

*Primary Examiner* — James M Perez
(74) *Attorney, Agent, or Firm* — Volpe Koenig

(57) ABSTRACT

A wireless transmit/receive unit (WTRU) may be configured to measure a downlink quality associated with at least one first beam. The WTRU may be configured to determine whether the measured downlink quality associated with the at least one first beam is below a threshold value. The WTRU may be configured to receive at least one control channel transmission using a determined second beam, based on, in part, a determination that the measured downlink quality associated with the at least one first beam is
(Continued)

below the threshold value. The determined second beam used to receive the at least one control channel transmission may be a same beam that is used to receive an associated data channel transmission. The determined second beam may be from a set of beams. The set of beams may be received via higher layer signaling.

20 Claims, 22 Drawing Sheets

Related U.S. Application Data continuation of application No. 15/769,133, filed as application No. PCT/US2016/061282 on Nov. 10, 2016, now Pat. No. 11,233,557.

(60) Provisional application No. 62/253,473, filed on Nov. 10, 2015.

(51) Int. Cl.
  *H04B 7/0417* (2017.01)
  *H04B 7/06* (2006.01)
  *H04L 5/00* (2006.01)

(52) U.S. Cl.
  CPC ........... *H04B 7/0628* (2013.01); *H04B 7/086* (2013.01); *H04L 5/0023* (2013.01); *H04L 5/0044* (2013.01); *H04L 5/0053* (2013.01); *H04L 5/0014* (2013.01)

(58) Field of Classification Search
  CPC .. H04B 7/0456; H04B 7/0417; H04B 7/0628; H04B 7/0697; H04B 7/024; H04B 17/309; H04B 17/318; H04B 17/336; H04L 5/0014; H04L 5/0023; H04L 5/0044; H04L 5/0053
  See application file for complete search history.

(56) References Cited

U.S. PATENT DOCUMENTS

| | | | | |
|---|---|---|---|---|
| 9,271,168 B2* | 2/2016 | Haghighat | ............ | H04L 5/0032 |
| 9,398,639 B2* | 7/2016 | Salhov | ............... | H04B 7/0857 |
| 9,407,008 B2* | 8/2016 | Fourie | .................. | H01Q 3/30 |
| 9,532,397 B2* | 12/2016 | Lee | ............... | H04W 36/00224 |
| 9,578,644 B2* | 2/2017 | Yu | ....................... | H04B 7/0632 |
| 9,775,156 B2* | 9/2017 | Yu | ...................... | H04W 48/20 |
| 9,877,327 B2* | 1/2018 | Yu | ....................... | H04B 7/0617 |
| 10,123,322 B1* | 11/2018 | Nam | ..................... | H04L 5/0092 |
| 10,172,135 B2* | 1/2019 | Deng | .................. | H04W 72/046 |
| 10,284,407 B2* | 5/2019 | Bala | ................... | H04L 27/2627 |
| 10,327,156 B2* | 6/2019 | Byun | .................. | H04W 72/56 |
| 10,348,381 B2* | 7/2019 | Jaldén | ................ | H04B 17/101 |
| 10,383,107 B2* | 8/2019 | Nam | ................... | H04L 5/0053 |
| 10,448,404 B2* | 10/2019 | Deng | ................. | H04W 72/046 |
| 10,512,008 B2* | 12/2019 | Deenoo | ............ | H04W 36/0094 |
| 10,608,858 B2* | 3/2020 | Bala | ................... | H04L 27/2605 |
| 10,651,917 B2* | 5/2020 | John Wilson | ........ | H04L 1/1607 |
| 10,812,168 B2* | 10/2020 | Kim | ................... | H04B 7/0619 |
| 10,813,085 B2* | 10/2020 | Deenoo | ............... | H04W 72/23 |
| 10,841,149 B2* | 11/2020 | Nagaraja | .............. | H04L 5/0051 |
| 10,841,914 B2* | 11/2020 | Liou | .................... | H04L 5/0094 |
| 10,848,232 B2* | 11/2020 | Pan | .................... | H04B 7/0882 |
| 10,873,862 B2* | 12/2020 | Guey | .................. | H04W 16/28 |
| 10,893,516 B2* | 1/2021 | Nam | ................... | H04B 7/0695 |
| 10,897,754 B2* | 1/2021 | Zhou | ................... | H04L 5/0048 |
| 10,924,175 B2* | 2/2021 | Wang | .................. | H04B 7/0868 |
| 10,951,291 B2* | 3/2021 | Xi | ....................... | H04B 7/063 |
| 11,063,646 B2* | 7/2021 | Chang | ................ | H04B 7/0619 |
| 11,082,286 B2* | 8/2021 | Pan | ..................... | H04W 72/21 |
| 11,172,386 B2* | 11/2021 | Zhou | ................... | H04B 7/0695 |
| 11,233,557 B2* | 1/2022 | Lee | ..................... | H04L 5/0023 |
| 11,239,896 B2* | 2/2022 | Liu | ..................... | H04W 72/542 |
| 11,245,456 B2* | 2/2022 | Marinier | .............. | H04B 7/0404 |
| 11,271,632 B2* | 3/2022 | Kim | ................... | H04B 7/0619 |
| 11,374,644 B2* | 6/2022 | Pan | .................... | H04B 7/0882 |
| 11,382,136 B2* | 7/2022 | Deng | .................. | H04W 52/365 |
| 11,394,447 B2* | 7/2022 | Deenoo | ................ | H04L 5/0055 |
| 11,419,173 B2* | 8/2022 | Deenoo | ................ | H04W 76/16 |
| 11,626,919 B2* | 4/2023 | Marinier | ................ | H04B 7/024 370/329 |
| 11,722,361 B2* | 8/2023 | Pan | .................... | H04B 7/06966 370/216 |
| 11,804,891 B2* | 10/2023 | Lee | ..................... | H04B 7/088 |
| 11,844,113 B2* | 12/2023 | Deng | ............... | H04W 72/0453 |
| 11,848,718 B2* | 12/2023 | Deenoo | ............... | H04W 48/16 |
| 11,930,491 B2* | 3/2024 | Hu | ......................... | H04L 5/0085 |
| 11,950,113 B2* | 4/2024 | Zhou | .................... | H04B 7/088 |
| 12,034,513 B2* | 7/2024 | Kim | .................... | H04B 7/0695 |
| 2008/0171516 A1* | 7/2008 | Kakura | .................. | H04B 7/086 455/63.4 |
| 2008/0318606 A1* | 12/2008 | Tsutsui | ................ | H04B 7/0413 455/500 |
| 2009/0046801 A1* | 2/2009 | Pan | ...................... | H04B 7/0452 375/267 |
| 2009/0103479 A1* | 4/2009 | Goto | ..................... | H04L 1/0002 370/328 |
| 2009/0215401 A1* | 8/2009 | Yoon | .................. | H04B 7/0617 455/67.14 |
| 2010/0165914 A1* | 7/2010 | Cho | ..................... | H04B 7/0697 370/328 |
| 2010/0265924 A1* | 10/2010 | Yong | .................. | H04B 7/0695 375/267 |
| 2012/0008510 A1* | 1/2012 | Cai | ...................... | H04W 52/42 370/252 |
| 2012/0052828 A1* | 3/2012 | Kamel | ................ | H04B 17/104 455/226.2 |
| 2012/0236771 A1* | 9/2012 | Luo | ....................... | H04L 1/1861 370/329 |
| 2012/0243638 A1* | 9/2012 | Maltsev | ............... | H04L 27/2656 375/316 |
| 2012/0320841 A1* | 12/2012 | Miki | ................... | H04B 7/0689 370/328 |
| 2013/0044664 A1* | 2/2013 | Nory | ...................... | H04L 1/0045 370/336 |
| 2013/0059619 A1* | 3/2013 | Kim | ....................... | H04B 7/063 455/509 |
| 2013/0079047 A1* | 3/2013 | Nilsson | .................... | H01Q 3/26 455/509 |
| 2013/0083681 A1* | 4/2013 | Ebrahimi Tazeh Mahalleh | .......... | H04B 7/0626 370/252 |
| 2013/0107923 A1* | 5/2013 | Salhov | .................. | H04B 7/086 375/222 |
| 2013/0121185 A1* | 5/2013 | Li | ....................... | H04W 72/046 370/252 |
| 2013/0155847 A1* | 6/2013 | Li | ......................... | H04W 24/04 370/225 |
| 2013/0286960 A1 | 10/2013 | Li et al. | | |
| 2013/0294537 A1* | 11/2013 | Cha | ..................... | H04B 7/0413 375/267 |
| 2014/0004869 A1* | 1/2014 | Jung | .................. | H04W 72/0446 455/452.1 |
| 2014/0073337 A1* | 3/2014 | Hong | .................. | H04W 72/046 455/452.1 |
| 2014/0162655 A1* | 6/2014 | Hong | .................. | H01Q 21/065 343/893 |
| 2014/0177607 A1* | 6/2014 | Li | ....................... | H04B 7/0695 370/336 |
| 2015/0341091 A1* | 11/2015 | Park | .................... | H04B 7/0456 375/267 |
| 2015/0341095 A1* | 11/2015 | Yu | ......................... | H04B 7/061 370/252 |
| 2015/0341105 A1* | 11/2015 | Yu | ......................... | H04B 7/088 370/328 |
| 2016/0065284 A1* | 3/2016 | Yu | ........................ | H04L 5/0023 370/329 |

(56) References Cited

U.S. PATENT DOCUMENTS

| | | | |
|---|---|---|---|
| 2016/0072572 A1* | 3/2016 | Kang | H04B 7/0452 370/329 |
| 2016/0080060 A1* | 3/2016 | Yu | H04B 7/0626 455/452.2 |
| 2016/0095102 A1* | 3/2016 | Yu | H04W 72/046 455/452.2 |
| 2016/0119850 A1* | 4/2016 | Kimura | H04W 24/10 370/332 |
| 2016/0149680 A1* | 5/2016 | Kang | H04B 7/0639 370/329 |
| 2016/0173183 A1* | 6/2016 | Kang | H04B 7/0691 455/562.1 |
| 2016/0173250 A1* | 6/2016 | Kang | H04B 7/0626 370/329 |
| 2016/0198474 A1* | 7/2016 | Raghavan | H04B 7/0456 370/335 |
| 2016/0294462 A1* | 10/2016 | Jeong | H04B 7/0695 |
| 2016/0337916 A1* | 11/2016 | Deenoo | H04W 8/22 |
| 2017/0034812 A1* | 2/2017 | Deng | H04W 72/046 |
| 2017/0104516 A1* | 4/2017 | Maltsev | H04L 1/0606 |
| 2017/0127400 A1* | 5/2017 | Yu | H04W 48/20 |
| 2017/0366311 A1* | 12/2017 | Iyer | H04B 7/0482 |
| 2017/0367082 A1* | 12/2017 | Yu | H04B 7/0632 |
| 2018/0167883 A1* | 6/2018 | Guo | H04B 7/0617 |
| 2018/0219606 A1* | 8/2018 | Ng | H04L 5/0053 |
| 2018/0227031 A1* | 8/2018 | Guo | H04W 24/10 |
| 2018/0262252 A1* | 9/2018 | Oh | H04B 7/0478 |
| 2018/0309496 A1* | 10/2018 | Lee | H04B 7/0408 |
| 2018/0310283 A1* | 10/2018 | Deenoo | H04L 5/0053 |
| 2018/0375707 A1* | 12/2018 | Bala | H04L 27/2605 |
| 2019/0052331 A1* | 2/2019 | Chang | H04B 7/08 |
| 2019/0053072 A1* | 2/2019 | Kundargi | H04W 16/28 |
| 2019/0053162 A1* | 2/2019 | Islam | H04W 52/0229 |
| 2019/0081688 A1* | 3/2019 | Deenoo | H04L 5/0069 |
| 2019/0098614 A1* | 3/2019 | Deng | H04W 72/046 |
| 2019/0104549 A1* | 4/2019 | Deng | H04W 52/365 |
| 2019/0110300 A1* | 4/2019 | Chen | H04W 74/02 |
| 2019/0124631 A1* | 4/2019 | Ren | H04L 5/0048 |
| 2019/0165843 A1* | 5/2019 | Shang | H04B 7/0626 |
| 2019/0174554 A1* | 6/2019 | Deenoo | H04L 5/0098 |
| 2019/0181941 A1* | 6/2019 | Kim | H04B 7/0695 |
| 2019/0191399 A1* | 6/2019 | Islam | H04W 72/046 |
| 2019/0199569 A1* | 6/2019 | Bala | H04L 27/2627 |
| 2019/0200337 A1* | 6/2019 | Zhou | H04L 5/0055 |
| 2019/0215870 A1* | 7/2019 | Babaei | H04L 5/0092 |
| 2019/0222279 A1* | 7/2019 | Xi | H04B 7/0617 |
| 2019/0222289 A1* | 7/2019 | John Wilson | H04B 7/0626 |
| 2019/0223175 A1* | 7/2019 | Hakola | H04L 27/2605 |
| 2019/0229792 A1* | 7/2019 | John Wilson | H04L 5/0051 |
| 2019/0260447 A1* | 8/2019 | Nam | H04W 72/0453 |
| 2019/0260456 A1* | 8/2019 | Zhou | H04W 24/08 |
| 2019/0260458 A1* | 8/2019 | Zhou | H04W 24/08 |
| 2019/0280802 A1* | 9/2019 | Ma | H04W 72/1273 |
| 2019/0289588 A1* | 9/2019 | Akkarakaran | H04W 72/046 |
| 2019/0305840 A1* | 10/2019 | Cirik | H04W 36/0005 |
| 2019/0313273 A1* | 10/2019 | Sharma | H04W 8/08 |
| 2019/0313389 A1* | 10/2019 | John Wilson | H04W 72/21 |
| 2019/0327768 A1* | 10/2019 | Kim | H04W 74/006 |
| 2019/0341992 A1* | 11/2019 | Zhou | H04W 16/28 |
| 2019/0342907 A1* | 11/2019 | Huang | H04W 72/23 |
| 2019/0349065 A1* | 11/2019 | Zhang | H04B 7/088 |
| 2019/0349915 A1* | 11/2019 | Ahn | H04L 5/0044 |
| 2019/0373450 A1* | 12/2019 | Zhou | H04W 76/27 |
| 2019/0373635 A1* | 12/2019 | Yang | H04B 7/0408 |
| 2019/0394764 A1* | 12/2019 | Deng | H04W 72/046 |
| 2020/0021350 A1* | 1/2020 | Koskela | H04W 48/12 |
| 2020/0021419 A1* | 1/2020 | Taherzadeh Boroujeni | H04L 5/0091 |
| 2020/0045745 A1* | 2/2020 | Cirik | H04W 72/23 |
| 2020/0045767 A1* | 2/2020 | Velev | H04W 8/24 |
| 2020/0053757 A1* | 2/2020 | Bagheri | H04W 72/0446 |
| 2020/0053800 A1* | 2/2020 | Deng | H04W 24/08 |
| 2020/0059290 A1* | 2/2020 | Pan | H04W 24/10 |
| 2020/0059398 A1* | 2/2020 | Pan | H04L 41/0654 |
| 2020/0059867 A1* | 2/2020 | Haghighat | H04W 52/285 |
| 2020/0067590 A1* | 2/2020 | Wang | H04B 7/0868 |
| 2020/0077283 A1* | 3/2020 | Zhou | H04W 24/04 |
| 2020/0084680 A1* | 3/2020 | Deenoo | H04W 36/0094 |
| 2020/0099437 A1* | 3/2020 | Harada | H04W 74/0833 |
| 2020/0119869 A1* | 4/2020 | Taherzadeh Boroujeni | H04L 5/0023 |
| 2020/0145158 A1* | 5/2020 | Zhou | H04L 5/0044 |
| 2020/0145982 A1* | 5/2020 | Cheng | H04W 72/23 |
| 2020/0178350 A1* | 6/2020 | Miao | H04L 5/0055 |
| 2020/0186261 A1* | 6/2020 | Devarasetty | H04B 7/0617 |
| 2020/0196179 A1* | 6/2020 | Kim | H04B 17/24 |
| 2020/0196351 A1* | 6/2020 | Zhou | H04W 72/23 |
| 2020/0205013 A1* | 6/2020 | John Wilson | H04W 16/14 |
| 2020/0205116 A1* | 6/2020 | Zhang | H04L 1/203 |
| 2020/0228267 A1* | 7/2020 | Park | H04L 5/0094 |
| 2020/0229001 A1* | 7/2020 | Takata | H04L 5/0051 |
| 2020/0244337 A1* | 7/2020 | Yuan | H04W 76/27 |
| 2020/0275524 A1* | 8/2020 | Wang | H04L 5/0051 |
| 2020/0281001 A1* | 9/2020 | Zuo | H04W 4/029 |
| 2020/0287678 A1* | 9/2020 | Li | H04W 72/23 |
| 2020/0288338 A1* | 9/2020 | Freda | H04W 76/19 |
| 2020/0288479 A1* | 9/2020 | Xi | H04W 72/046 |
| 2020/0314906 A1* | 10/2020 | Goyal | H04W 74/0816 |
| 2020/0351842 A1* | 11/2020 | Lin | H04W 24/10 |
| 2020/0374960 A1* | 11/2020 | Deenoo | H04B 7/0695 |
| 2020/0389876 A1* | 12/2020 | Islam | H04L 5/0094 |
| 2020/0396744 A1* | 12/2020 | Xiong | H04B 7/088 |
| 2020/0404690 A1* | 12/2020 | Lee | H04L 5/005 |
| 2021/0006614 A1* | 1/2021 | Oyman | H04L 65/756 |
| 2021/0007149 A1* | 1/2021 | Li | H04W 74/0833 |
| 2021/0014010 A1* | 1/2021 | Babaei | H04W 72/0446 |
| 2021/0014791 A1* | 1/2021 | Freda | H04W 52/0216 |
| 2021/0014847 A1* | 1/2021 | Deng | H04W 72/046 |
| 2021/0022018 A1* | 1/2021 | Belov | H04W 24/06 |
| 2021/0036759 A1* | 2/2021 | Kim | H04B 7/088 |
| 2021/0037511 A1* | 2/2021 | Deenoo | H04W 72/23 |
| 2021/0045125 A1* | 2/2021 | Mondal | H04W 80/08 |
| 2021/0045149 A1* | 2/2021 | Davydov | H04W 72/23 |
| 2021/0152233 A1* | 5/2021 | Pan | H04B 7/0691 |
| 2021/0159966 A1* | 5/2021 | Xi | H04B 7/088 |
| 2021/0167821 A1* | 6/2021 | Chen | H04B 7/0404 |
| 2021/0204346 A1* | 7/2021 | Ye | H04B 7/00 |
| 2021/0273714 A1* | 9/2021 | Lee | H04W 56/001 |
| 2021/0281308 A1* | 9/2021 | Wong | H04B 7/0888 |
| 2021/0359900 A1* | 11/2021 | Pan | H04W 72/21 |
| 2022/0007406 A1* | 1/2022 | Matsumura | H04L 5/0051 |
| 2022/0060914 A1* | 2/2022 | Zhou | H04B 7/0695 |
| 2022/0103237 A1* | 3/2022 | Lee | H04L 5/0044 |
| 2022/0210812 A1* | 6/2022 | Matsumura | H04L 5/0048 |
| 2022/0239363 A1* | 7/2022 | Kim | H04W 72/046 |
| 2022/0286187 A1* | 9/2022 | Deenoo | H04L 5/0069 |
| 2022/0286192 A1* | 9/2022 | Xi | H04B 7/0695 |
| 2022/0322480 A1* | 10/2022 | Deenoo | H04W 72/23 |
| 2022/0338270 A1* | 10/2022 | Deng | H04B 7/0617 |
| 2022/0360408 A1* | 11/2022 | Jung | H04B 7/0628 |
| 2023/0269601 A1* | 8/2023 | Laselva | H04W 72/046 370/329 |
| 2023/0344701 A1* | 10/2023 | Pan | H04W 74/0833 |
| 2024/0063888 A1* | 2/2024 | Lee | H04L 5/0044 |
| 2024/0080905 A1* | 3/2024 | Deng | H04W 52/365 |
| 2024/0244636 A1* | 7/2024 | Prasad | H04W 72/232 |

FOREIGN PATENT DOCUMENTS

| | | |
|---|---|---|
| JP | 2007274549 A | 10/2007 |
| WO | 2009/023700 | 2/2009 |
| WO | 2012/001692 | 1/2012 |
| WO | 2015/080648 | 6/2015 |
| WO | 2016/045621 | 3/2016 |

OTHER PUBLICATIONS

Kyocera, "Dynamic Beamformed CSI-RS for Elevation Beamforming/FD-MIMO," 3GPP TSG RAN WG1 Meeting #80Bis, R1-151471, Belgrade, Serbia (Apr. 20-24, 2015).

Rappaport et al., "Millimeter Wave Mobile Communications for 5G Cellular: It Will Work!," IEEE Access, vol. 1, pp. 335-349, (2013).

(56) References Cited

OTHER PUBLICATIONS

Third Generation Partnership Project, "Technical Specification Group Radio Access Network; Evolved Universal Terrestrial Radio Access (E-UTRA); Physical channels and modulation (Release 12)," 3GPP TS 36.211 V12.8.0 (Dec. 2015).
Third Generation Partnership Project, "Technical Specification Group Radio Access Network; Evolved Universal Terrestrial Radio Access (E-UTRA); Physical channels and modulation (Release 12)," 3GPP TS 36.211 V12.7.0 (Sep. 2015).
Third Generation Partnership Project, "Technical Specification Group Radio Access Network; Evolved Universal Terrestrial Radio Access (E-UTRA); Physical channels and modulation (Release 13)," 3GPP TS 36.211 V13.3.0 (Sep. 2016).
Third Generation Partnership Project, "Technical Specification Group Radio Access Network; Evolved Universal Terrestrial Radio Access (E-UTRA); Physical channels and modulation (Release 14)," 3GPP TS 36.211 V14.0.0 (Sep. 2016).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.6.0 (Sep. 2015).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.8.0 (Mar. 2016).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.3.0 (Sep. 2016).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.0.0 (Sep. 2016).
Third Generation Partnership Project, "Technical Specification Group Radio Access Network; Evolved Universal Terrestrial Radio Access (E-UTRA); Physical layer procedures (Release 12)," 3GPP TS 36.213 V12.7.0 (Sep. 2015).
Third Generation Partnership Project, "Technical Specification Group Radio Access Network; Evolved Universal Terrestrial Radio Access (E-UTRA); Physical layer procedures (Release 12)," 3GPP TS 36.213 V12.11.0 (Sep. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.3.0 (Sep. 2016).
Third Generation Partnership Project, "Technical Specification Group Radio Access Network; Evolved Universal Terrestrial Radio Access (E-UTRA); Physical layer procedures (Release 14)," 3GPP TS 36.213 V14.0.0 (Sep. 2016).
Third Generation Partnership Project, "Technical Specification Group Radio Access Network; Evolved Universal Terrestrial Radio Access (E-UTRA); Physical layer; Measurements (Release 12)," 3GPP TS 36.214 V12.2.0 (Mar. 2015).
Third Generation Partnership Project, "Technical Specification Group Radio Access Network; Evolved Universal Terrestrial Radio Access (E-UTRA); Physical layer; Measurements (Release 12)," 3GPP TS 36.214 V12.3.0 (Sep. 2016).
Third Generation Partnership Project, "Technical Specification Group Radio Access Network; Evolved Universal Terrestrial Radio Access (E-UTRA); Physical layer; Measurements (Release 13)," 3GPP TS 36.214 V13.3.0 (Sep. 2016).
Third Generation Partnership Project, "Technical Specification Group Radio Access Network; Evolved Universal Terrestrial Radio Access (E-UTRA); Physical layer; Measurements (Release 14)," 3GPP TS 36.214 V14.0.0 (Sep. 2016).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.1.0 (Sep. 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.5.0 (Sep. 2016).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.0.0 (Sep. 2016).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.7.0 (Sep. 2015).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.11.0 (Sep. 2016).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.3.0 (Sep. 2016).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.0.0 (Sep. 2016).

* cited by examiner

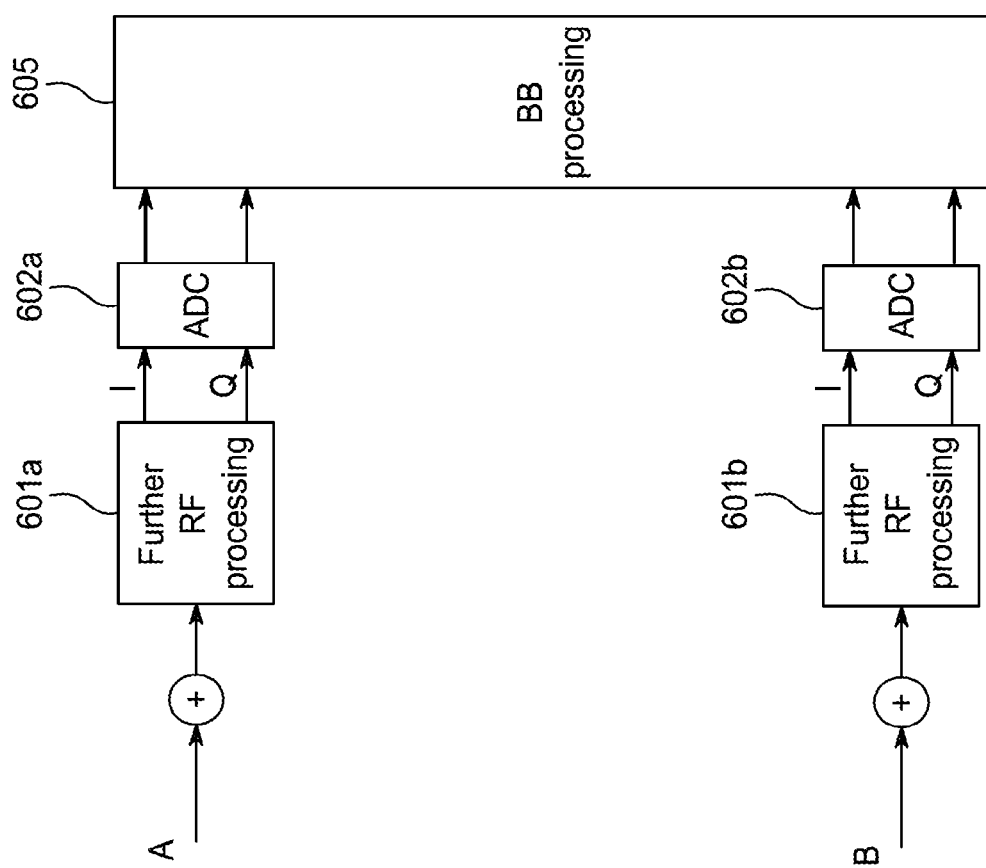

TRANSMISSION SCHEMES AND MODES AND FALLBACK SCHEMES FOR THE ACCESS LINK OF SYSTEMS OPERATING IN HIGHER FREQUENCY BANDS PRELIMINARY CLASS

CROSS REFERENCE TO RELATED APPLICATIONS

This application is a continuation of U.S. patent application Ser. No. 17/546,467, filed Dec. 9, 2021, which is a continuation of U.S. patent application Ser. No. 15/769,133, filed Apr. 18, 2018 which issued as U.S. Pat. No. 11,233,557 on Jan. 25, 2022, which is a U.S. National Stage, under 35 U.S.C. § 371, of International Application No. PCT/US2016/061282 filed Nov. 10, 2016, which claims the benefit of U.S. Provisional Application No. 62/253,473 filed Nov. 10, 2015, the content of which is hereby incorporated by reference herein.

BACKGROUND

In order to meet the high data rate required for next generation of cellular communication systems, the wireless industry and academia have been exploring ways to leverage the large bandwidths available at above-6 GHz frequencies (e.g., centimeter wave (cmW) and millimeter wave (mmW) frequencies). One challenge of using these above-6 GHz frequencies may be issues with signal propagation, which has been considered unfavorable for wireless communication, especially in an outdoor environment.

The propagation of higher frequencies, such as these, may experience higher free space path loss. Rainfall and atmospheric gasses (e.g., oxygen, nitrogen, and hydrogen) may add further attenuation for above-6 GHz frequencies. In addition, foliage may cause attenuation and depolarization. Penetration and diffraction attenuation may also become more severe. As a result, Non Line-Of-Sight (NLOS) propagation path loss may be significant at above-6 GHz frequencies. For example, at mmW frequencies NLOS path loss may be more than 20 dB higher than Line-Of-Sight (LOS) path loss.

Outdoor mmW cellular networks may be feasible through the use of beamforming techniques. In addition, a large number of reflected and scattered multipath components (MPC) may be utilized to facilitate the mmW coverage in NLOS conditions.

SUMMARY

Embodiments provide a system, method, and apparatus for transmitting data between a wireless transmit/receive unit (WTRU) and a base station at a high carrier frequency.

According to an embodiment, a WTRU is configured to perform wireless communications in higher frequency bands using a fallback scheme. The WTRU includes a receiver configured to receive, in a time transmission interval (TTI), at least one control signal and a first data signal using a first beam associated with a first beam identifier (ID) and a second data signal, subsequent to the first data signal, using a second beam associated with a second beam ID different from the first beam ID. At least one of the control signal(s) indicates the second beam ID. The WTRU further includes a processor configured to switch a receive beam of the receiver from the first beam to the second beam based on the second beam ID to receive the second data signal.

According to an embodiment, a method implemented by a WTRU includes receiving, in a time transmission interval (TTI), at least one control signal and a first data signal using a first beam associated with a first beam identifier (ID) and a second data signal, subsequent to the first data signal, using a second beam associated with a second beam ID different from the first beam ID. At least one of the control signal(s) indicates the second beam ID. The method further includes switching a receive beam of the WTRU from the first beam to the second beam based on the second beam ID to receive the second data signal.

According to an embodiment, a wireless communication device is configured to perform wireless communications in higher frequency bands using a fallback scheme. The wireless communication device includes a transmitter configured to transmit, in a time transmission interval (TTI), at least one control signal and a first data signal using a first beam associated with a first beam identifier (ID) and a second data signal, subsequent to the first data signal, using a second beam associated with a second beam ID different from the first beam ID. At least one of the control signal(s) indicates the second beam ID. The wireless communication device further includes a processor configured to switch a transmit beam of the transmitter from the first beam to the second beam based on the second beam ID to transmit the second data signal to a WTRU.

According to an embodiment, a method implemented in a wireless communication device includes a transmitting, in a time transmission interval (TTI), at least one control signal and a first data signal using a first beam associated with a first beam identifier (ID) and a second data signal, subsequent to the first data signal, using a second beam associated with a second beam ID different from the first beam ID. At least one of the control signal(s) indicates the second beam ID. The method further includes switching a transmit beam of the wireless communication device from the first beam to the second beam based on the second beam ID to transmit the second data signal to a WTRU.

According to an embodiment, a WTRU is configured to perform wireless communications in higher frequency bands using a fallback scheme. The WTRU includes a receiver configured to receive, in a time transmission interval (TTI), at least one control signal, a first transport block and a second transport block. The at least one control signal and the first transport block are received using a first beam, and the second transport block is received using a second beam that has a beam width that is more narrow than a beam width of the first beam. In addition, the first transport block and the second transport block are multiplexed using time division multiplexing such that the second transport block is received subsequent to the first transport block. The WTRU further includes a processor configured to switch a receive beam of the receiver from the first beam to the second beam, to receive the second transport block, based on beam information associated with the second beam received in one of the at least one control signal.

According to an embodiment, a method implemented by a WTRU includes receiving, in a time transmission interval (TTI), at least one control signal, a first transport block and a second transport block. The at least one control signal and the first transport block are received using a first beam, and the second transport block is received using a second beam that has a beam width that is more narrow than a beam width of the first beam. In addition, the first transport block and the second transport block are multiplexed using time division multiplexing such that the second transport block is received subsequent to the first transport block. The method further includes switching a receive beam of the WTRU from the first beam to the second beam, to receive the second transport block, based on beam information associated with the second beam received in one of the at least one control signal.

BRIEF DESCRIPTION OF THE DRAWINGS

A more detailed understanding may be had from the following description, given by way of example in conjunction with the accompanying drawings wherein:

FIGS. 6A and 6B show a diagram illustrating an analog beamforming system with one PAA and two RF chains according to one or more embodiments;

DETAILED DESCRIPTION $$\in \in \in \in tf = \mod\left(\frac{UE_{ID}}{N_F}\right)$$

Embodiments described herein may define transmission modes (including reference signals and channel state information (CSI) feedback) and transmission schemes for operation of highly directional beamformed systems. In addition, embodiments may define how to mitigate control and/or data channel performance loss due to narrow beam misalignment, for systems operating in higher frequency bands (e.g. above-6 GHz frequencies).

$$\in \in \in \in tf = \mod\left(\frac{UE_{ID}}{N_F}\right)$$

The latter problem can further be broken down into two different scenarios. In the first scenario, a change in the wireless transmit/receive unit (WTRU) orientation may be such that the data channel performance using a narrow beam pair may be significantly degraded, while the downlink (DL) wide beam control channel may still be received by the WTRU. In the second scenario, the WTRU orientation change may be such that both the data and the control channels may not be received by the WTRU.

$$\in \in \in \in tf = \mod\left(\frac{UE_{ID}}{N_F}\right)$$

Embodiments may include downlink/uplink (DL/UL) transmission schemes for the access link of beamformed systems operating in the high frequency bands (e.g., above 6 GHz) using one or multiple radio frequency (RF) chains. In addition embodiments may define DL/UL transmission modes and modes of operations.

$$\in \in \in \in tf = \mod\left(\frac{UE_{ID}}{N_F}\right)$$

In addition to presenting transmission schemes and transmission modes for above 6 GHz systems, embodiments described herein may include various scenarios where significant degradation of the control and/or data channel performance may occur due to transmit-receive (Tx-Rx)

beam misalignment. Embodiments may address techniques for control and data fallback to maintain connectivity until a transmission mode change or a beam change is performed.

$$\in\in\in\in tf = \mod\left(\frac{UE_{ID}}{N_F}\right)$$

Figure 1A:
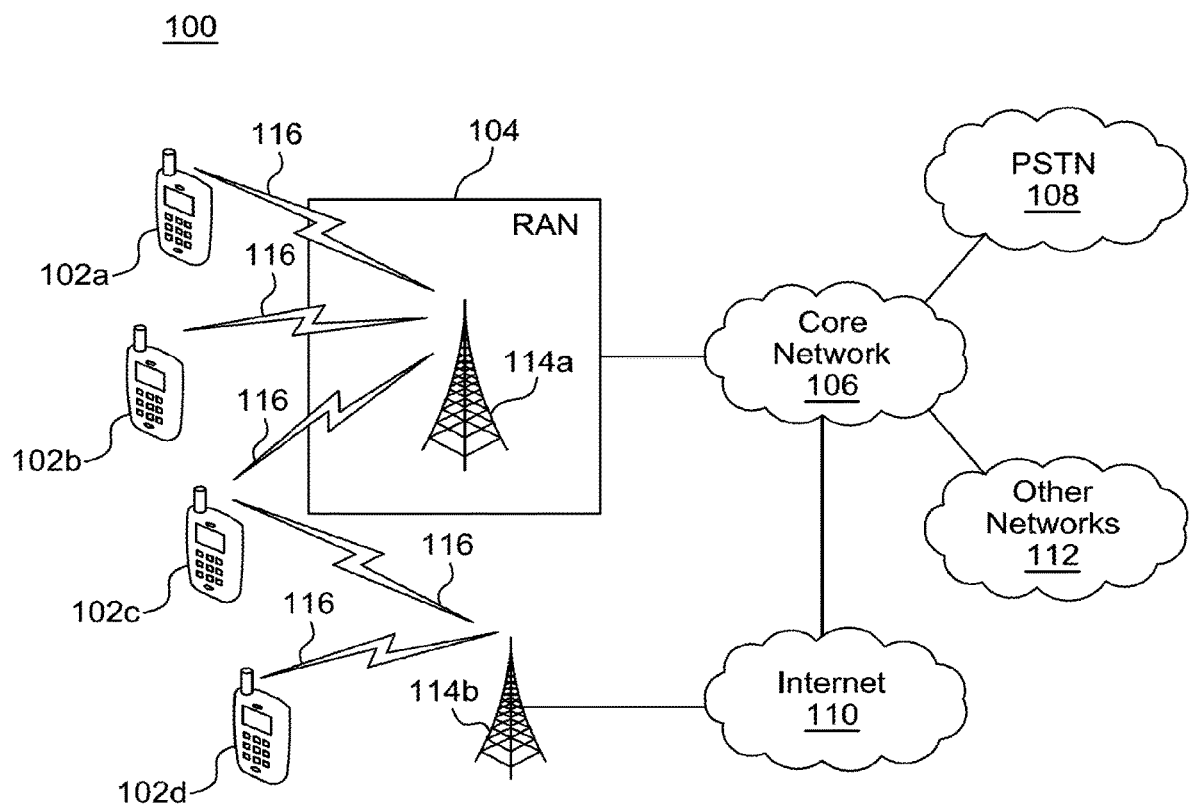
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

$$\in\in\in\in tf = \mod\left(\frac{UE_{ID}}{N_F}\right)$$

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

$$\in\in\in\in tf = \mod\left(\frac{UE_{ID}}{N_F}\right)$$

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

$$\in\in\in\in tf = \mod\left(\frac{UE_{ID}}{N_F}\right)$$

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

$$\in\in\in\in tf = \mod\left(\frac{UE_{ID}}{N_F}\right)$$

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

$$\in\in\in\in tf = \mod\left(\frac{UE_{ID}}{N_F}\right)$$

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

$$\in\in\in\in tf = \mod\left(\frac{UE_{ID}}{N_F}\right)$$

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

$$\in\in\in\in tf = \mod\left(\frac{UE_{ID}}{N_F}\right)$$

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1.times, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

$$\in\in\in\in tf = \mod\left(\frac{UE_{ID}}{N_F}\right)$$

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

$$\in\in\in\in tf = \mod\left(\frac{UE_{ID}}{N_F}\right)$$

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

$$\in\in\in\in tf = \mod\left(\frac{UE_{ID}}{N_F}\right)$$

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

$$\in\in\in\in tf = \mod\left(\frac{UE_{ID}}{N_F}\right)$$

One or more of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

$$\in\in\in\in tf = \mod\left(\frac{UE_{ID}}{N_F}\right)$$

Figure 1B:
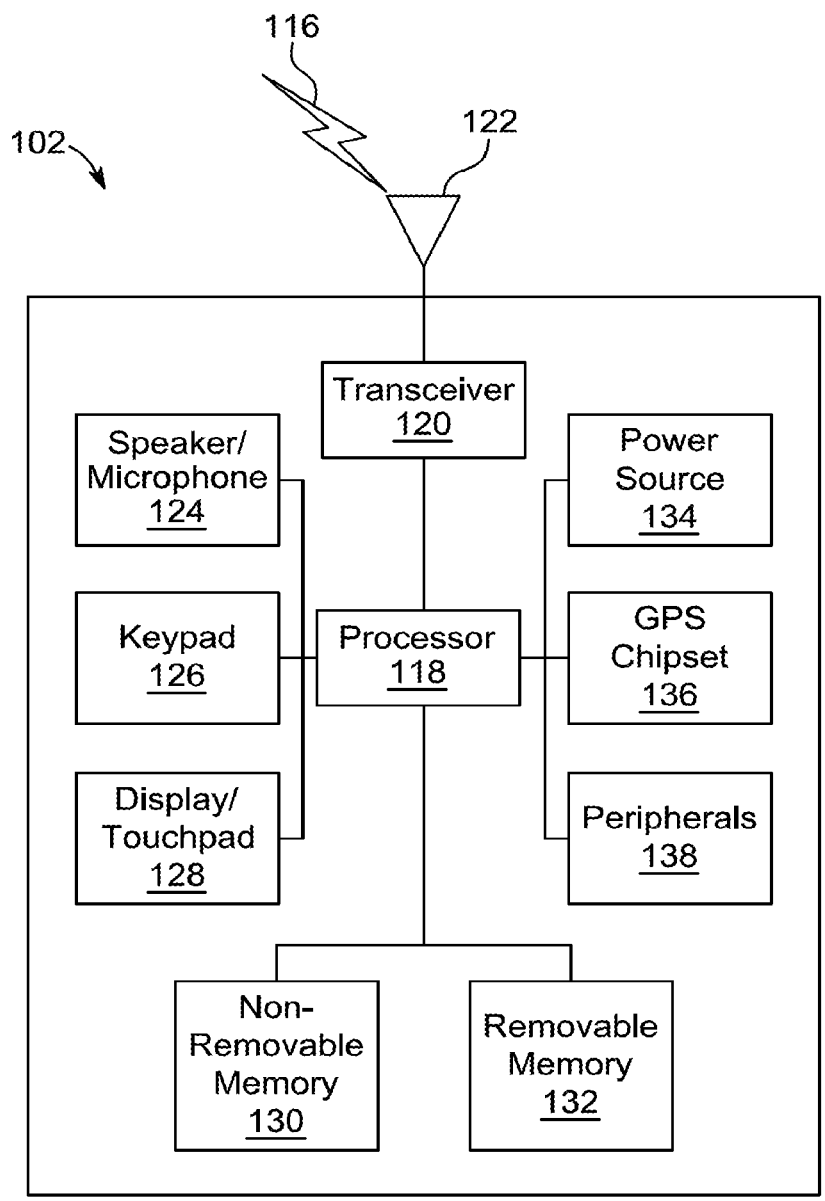
FIG. 1B is a system diagram of an example wireless transmit/receive unit (WTRU) that may be used within the communications system illustrated in FIG. 1A.
Figure 1C:
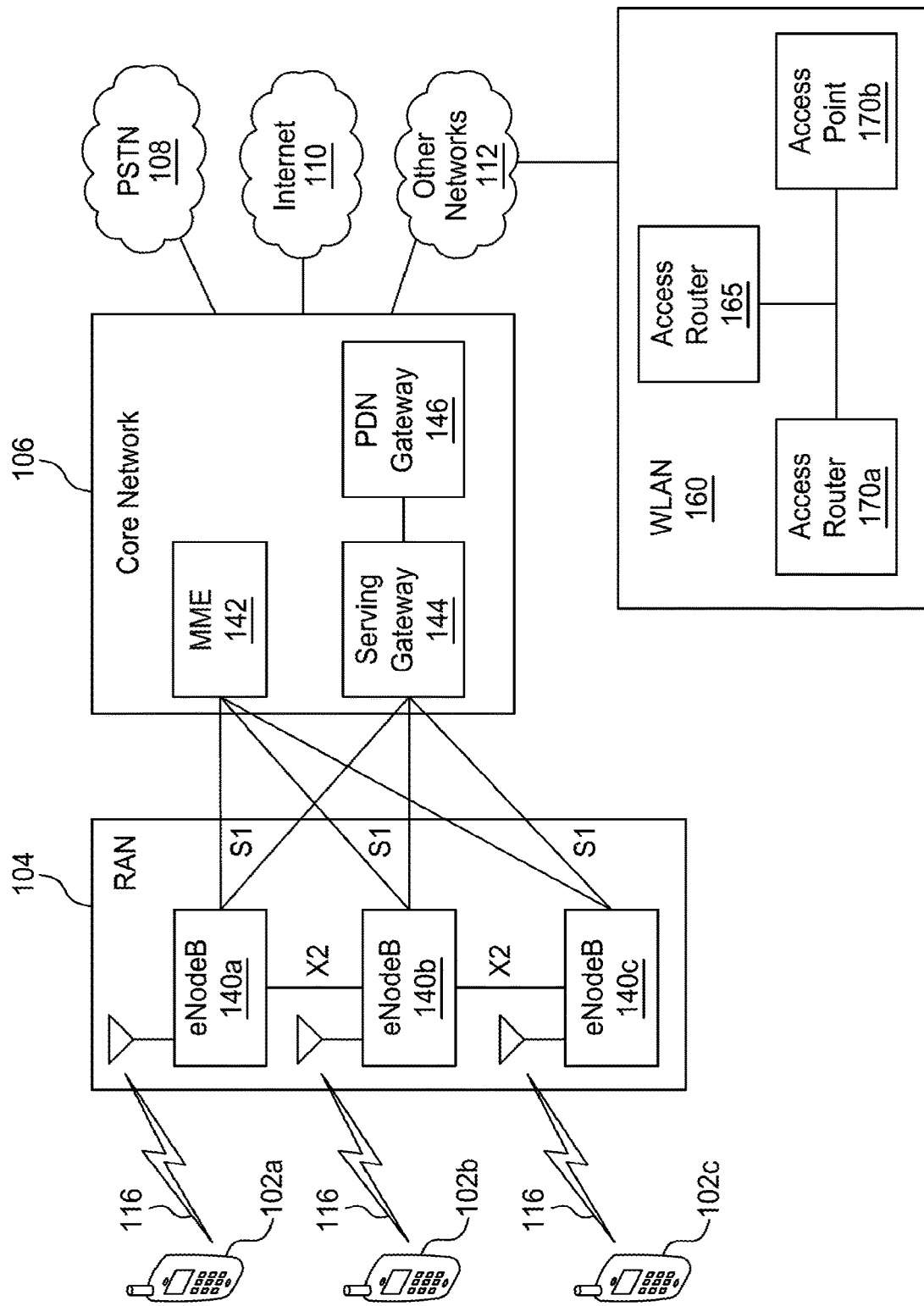
FIG. 1C is a system diagram of an example radio access network and an example core network that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

$$\in\in\in\in tf = \mod\left(\frac{UE_{ID}}{N_F}\right)$$

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

$$\in\in\in\in tf = \mod\left(\frac{UE_{ID}}{N_F}\right)$$

The transceiver 120, or any part thereof, may be configured to align its transmit beam, for transmitting an uplink transmission, with a receive beam of an eNode-B. Similarly, the transceiver 120, or any part thereof, may be configured to align its receive beam, for receiving a downlink transmission, with a transmit beam of the eNode-B. The processor 118 may further be configured to determine a transmit beam and/or receive beam (e.g., based on received configuration or control information) for the transceiver 120 to use, and configure the transceiver 120 accordingly for communicating with the eNode-B.

$$\epsilon\epsilon\epsilon\epsilon\, tf = \mathrm{mod}\left(\frac{UE_{ID}}{N_F}\right)$$

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

$$\epsilon\epsilon\epsilon\epsilon\, tf = \mathrm{mod}\left(\frac{UE_{ID}}{N_F}\right)$$

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

$$\epsilon\epsilon\epsilon\epsilon\, tf = \mathrm{mod}\left(\frac{UE_{ID}}{N_F}\right)$$

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

$$\epsilon\epsilon\epsilon\epsilon\, tf = \mathrm{mod}\left(\frac{UE_{ID}}{N_F}\right)$$

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

$$\epsilon\epsilon\epsilon\epsilon\, tf = \mathrm{mod}\left(\frac{UE_{ID}}{N_F}\right)$$

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NIMH), lithium-ion (Li-ion), etc.), solar cells, fuel cells, and the like.

$$\epsilon\epsilon\epsilon\epsilon\, tf = \mathrm{mod}\left(\frac{UE_{ID}}{N_F}\right)$$

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

$$\epsilon\epsilon\epsilon\epsilon\, tf = \mathrm{mod}\left(\frac{UE_{ID}}{N_F}\right)$$

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

$$\epsilon\epsilon\epsilon\epsilon\, tf = \mathrm{mod}\left(\frac{UE_{ID}}{N_F}\right)$$

Figure 10:
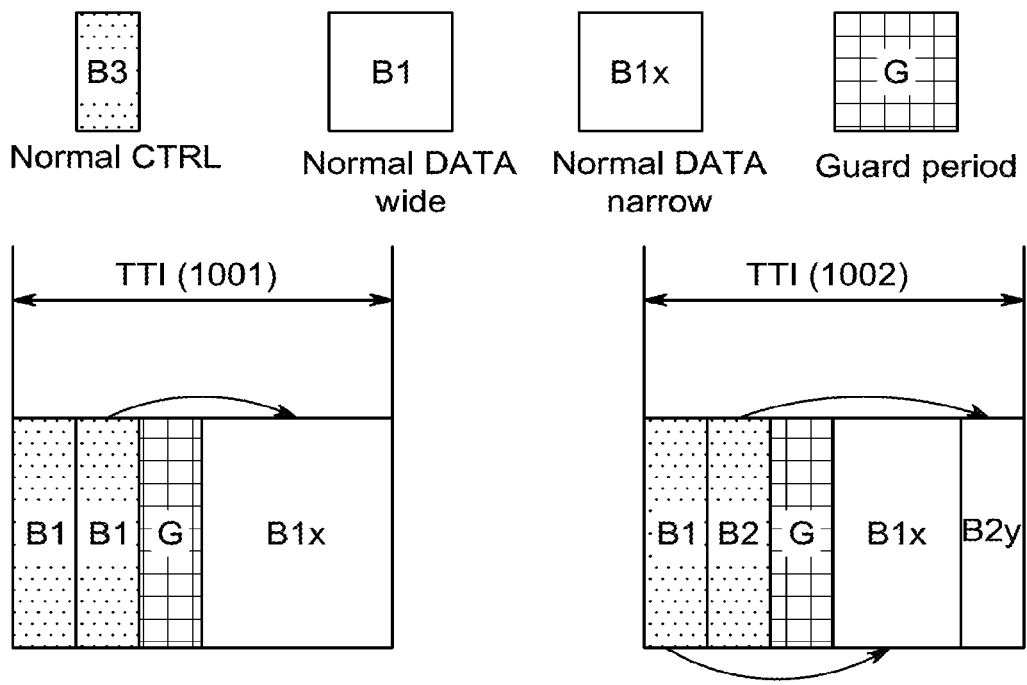
FIG. 10 shows a diagram illustrating an intra-transmission time interval (TTI) downlink (DL) assignment with a guard period according to one or more embodiments.

FIG. 10 is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

$$\epsilon\epsilon\epsilon\epsilon\, tf = \mathrm{mod}\left(\frac{UE_{ID}}{N_F}\right)$$

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

$$\epsilon\epsilon\epsilon\epsilon\, tf = \mathrm{mod}\left(\frac{UE_{ID}}{N_F}\right)$$

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 10, the eNode-Bs 140a, 140b, 140c may communicate with one another over an X2 interface.

$$\epsilon\epsilon\epsilon\epsilon\, tf = \mathrm{mod}\left(\frac{UE_{ID}}{N_F}\right)$$

The core network 106 shown in FIG. 10 may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

$$\epsilon\epsilon\epsilon\epsilon\, tf = \mathrm{mod}\left(\frac{UE_{ID}}{N_F}\right)$$

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

$$\epsilon\epsilon\epsilon\epsilon\, tf = \mathrm{mod}\left(\frac{UE_{ID}}{N_F}\right)$$

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

$$\epsilon\epsilon\epsilon\epsilon\, tf = \mathrm{mod}\left(\frac{UE_{ID}}{N_F}\right)$$

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

$$\epsilon\epsilon\epsilon\epsilon\, tf = \mathrm{mod}\left(\frac{UE_{ID}}{N_F}\right)$$

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

$$\epsilon\epsilon\epsilon\epsilon\, tf = \mathrm{mod}\left(\frac{UE_{ID}}{N_F}\right)$$

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

$$\epsilon\epsilon\epsilon\epsilon\, tf = \mathrm{mod}\left(\frac{UE_{ID}}{N_F}\right)$$

It should be noted that although 3GPP LTE may be used for example purposes, the techniques described herein may be applied to any other system.

$$\epsilon\epsilon\epsilon\epsilon\, tf = \mod\left(\frac{UE_{ID}}{N_F}\right)$$

The following list of definitions, although not intended to be limiting, may be helpful in understanding the following embodiments.

$$\epsilon\epsilon\epsilon\epsilon\, tf = \mod\left(\frac{UE_{ID}}{N_F}\right)$$

A "beam" may be one lobe (e.g. main/side/grating) of a transmit radiation pattern and receive gain pattern of an antenna array. The beam may also denote a spatial direction that may be represented with a set beamforming weights. The beam may be identified or associated with a reference signal, an antenna port, a beam identity (ID), and/or a scrambling sequence number. The beam may be transmitted and/or received at a specific time, frequency, code, and/or spatial resource. The beam may be formed digitally, in an analog manner, or both (i.e., hybrid beamforming). The analog beamforming may be based on fixed code-book or continuous phase shifting.

$$\epsilon\epsilon\epsilon\epsilon\, tf = \mod\left(\frac{UE_{ID}}{N_F}\right)$$

A "beam-specific reference signal" (BSRS) may be a sequence associated with a transmit beam used for beam acquisition, timing and/or frequency synchronization, channel estimation for a physical downlink directional control channel (PDDCCH), fine beam tracking, beam measurement, etc. BSRS may carry (e.g., implicitly carry) beam identity information. There may be different types of BSRS. For example, there may be BSRS for an mmW sector and its member segments. The segment may be referred as a beam direction (e.g., a narrow beam direction or a wide beam direction).

$$\epsilon\epsilon\epsilon\epsilon\, tf = \mod\left(\frac{UE_{ID}}{N_F}\right)$$

A "data channel beam" may be used to transmit a data channel, a Physical Downlink Shared Channel (PDSCH), a mPDSCH, a mmW PDSCH, a mmW data channel, a directional PDSCH, a beamformed data channel, a spatial data channel, a data channel slice, or a high frequency data channel. The data channel beam may be identified or associated with a reference signal, an antenna port, a beam identity (ID), and/or a scrambling sequence number. The data channel beam may be transmitted and/or received at a specific time, frequency, code, and/or spatial resource.

$$\epsilon\epsilon\epsilon\epsilon\, tf = \mod\left(\frac{UE_{ID}}{N_F}\right)$$

A "control channel beam" may be used to transmit a control channel, a control channel beam, a PDCCH, an mPDCCH, an mmW PDCCH, an mmW control channel, a directional PDCCH, a beamformed control channel, a spatial control channel, a control channel slice or a high frequency control channel. A control channel beam may be identified or associated with a reference signal, an antenna port, a beam identity (ID), a scrambling sequence number and may be transmitted and/or received at a specific time and/or frequency and/or code and/or spatial resources.

$$\epsilon\epsilon\epsilon\epsilon\, tf = \mod\left(\frac{UE_{ID}}{N_F}\right)$$

A "measurement beam" may be used to transmit a signal or channel for beam measurement. This may include a beam reference signal, a beam measurement reference signal, Cell Specific Reference Signal (CRS), Channel State Information-Reference Signal (CSI-RS), CSI-interference measurement (CSI-IM), etc. The measurement beam may be identified or associated with a reference signal, an antenna port, a beam identity (ID), and/or a scrambling sequence number. The measurement beam may be transmitted and/or received at a specific time, frequency, code, and/or spatial resource.

$$\epsilon\epsilon\epsilon\epsilon\, tf = \mod\left(\frac{UE_{ID}}{N_F}\right)$$

A "control channel beam duration" may be the length of time, which may be referred to in units of OFDM symbols, used within a scheduling interval for the transmission of one control channel beam.

$$\epsilon\epsilon\epsilon\epsilon\, tf = \mod\left(\frac{UE_{ID}}{N_F}\right)$$

A "control region" may be the length in the of time domain, which may be referred to in units of OFDM symbols, used within a scheduling interval for the transmission of all the control channel beams in that scheduling interval. For example, a control region may be the number of OFDM symbols in a TTI occupied by all the control channel beams transmitted in the TTI.

$$\epsilon\epsilon\epsilon\epsilon\, tf = \mod\left(\frac{UE_{ID}}{N_F}\right)$$

A "data region" may be part of the scheduling interval in time domain, which may be referred to in units of OFDM symbols, used for the transmission of all data channel beams in that scheduling interval.

$$\epsilon\epsilon\epsilon\epsilon\, tf = \mod\left(\frac{UE_{ID}}{N_F}\right)$$

A "data fallback" may be an alternate scheme for data transmission, that may be used dynamically, irrespective of the transmission mode, to maintain the data communication between the base station and the WTRU. Data fallback schemes may be used in either downlink (DL), or uplink (UL), or both.

$$\epsilon\epsilon\epsilon\epsilon\ tf = \mathrm{mod}\left(\frac{UE_{ID}}{N_F}\right)$$

A "control fallback" may be an alternate scheme for signaling the control channel, that may be used dynamically, irrespective of the transmission mode, to maintain the control signaling between the base station and the WTRU.

$$\epsilon\epsilon\epsilon\epsilon\ tf = \mathrm{mod}\left(\frac{UE_{ID}}{N_F}\right)$$

In some embodiments described herein, the terms base station, eNode-B (eNB), mmW eNB (mB), Small Cell mmW eNB (SCmB), cell, small cell, primary cell (Pcell), and secondary cell (Scell) may be used interchangeably. In some embodiments, the term operate may be used interchangeably with transmit and/or receive. In some embodiments, the terms component carrier, mmW carrier may be used interchangeably with serving cell.

$$\epsilon\epsilon\epsilon\epsilon\ tf = \mathrm{mod}\left(\frac{UE_{ID}}{N_F}\right)$$

In some embodiments, the mB may transmit and/or receive one or more mmW channels and/or signals in a licensed band and/or an unlicensed band. In some embodiments, the WTRU may be substituted for eNB and/or vice versa and still be consistent with this disclosure. In some embodiments, UL may be substituted for DL and/or vice versa and still be consistent with this disclosure.

$$\epsilon\epsilon\epsilon\epsilon\ tf = \mathrm{mod}\left(\frac{UE_{ID}}{N_F}\right)$$

In some embodiments, a channel may refer to a frequency band that may have a center, or carrier frequency, and a bandwidth. Licensed and/or unlicensed spectrum may include one or more channels which may or may not overlap. Channel, frequency channel, wireless channel, and mmW channel may be used interchangeably. Accessing a channel may be the same as using (e.g., transmitting and/or receiving on or using) the channel.

$$\epsilon\epsilon\epsilon\epsilon\ tf = \mathrm{mod}\left(\frac{UE_{ID}}{N_F}\right)$$

In some embodiments, a channel refers to a mmW channel or signal, such as an uplink or downlink physical channel or signal. Downlink channels and signals may include one or more of the following: mmW synchronization signal, mmW broadcast channel, mmW cell reference signal, mmW beam reference signal, mmW beam control channel, mmW beam data channel, mmW hybrid automatic repeat request (ARQ) indicator channel, mmW demodulation reference signal, primary synchronization signal (PSS), secondary synchronization signal (SSS), demodulation reference signal (DMRS), CRS, CSI-RS, Physical Broadcast Channel (PBCH), Physical downlink Control Channel (PDCCH), Physical Hybrid ARQ Indicator Channel (PHICH), Enhanced Physical Downlink Control Channel (EPDCCH), and PDSCH. Uplink channels and signals may include one or more of the following: mmW Physical Random Access Channel (PRACH), mmW control channel, mmW data channel, mmW beam reference signal, mmW demodulation reference signal, PRACH, Physical Uplink Control Channel (PUCCH), sounding reference signal (SRS), DMRS and Physical Uplink Shared Channel (PUSCH). Channel and mmW channel may be used interchangeably. Channels and signals may be used interchangeably.

$$\epsilon\epsilon\epsilon\epsilon\ tf = \mathrm{mod}\left(\frac{UE_{ID}}{N_F}\right)$$

In some embodiments data/control may mean data and/or control signals and/or channels. Control may include synchronization. The data/control may be mmW data/control. Data/control and data/control channels and/or signals may be used interchangeably. Channels and signals may be used interchangeably. The terms control channel, control channel beam, PDCCH, mPDCCH, mmW PDCCH, mmW control channel, directional PDCCH, beamformed control channel, spatial control channel, control channel slice, high frequency control channel may be used interchangeably. The terms data channel, data channel beam, PDSCH, mPDSCH, mmW PDSCH, mmW data channel, directional PDSCH, beamformed data channel, spatial data channel, data channel slice, and high frequency data channel may be used interchangeably.

$$\epsilon\epsilon\epsilon\epsilon\ tf = \mathrm{mod}\left(\frac{UE_{ID}}{N_F}\right)$$

In some embodiments, channel resources may be resources (e.g., 3GPP LTE or LTE-A resources) such as time, frequency, code, and/or spatial resources, which may, at least sometimes, carry one or more channels and/or signals. In some embodiments, channel resources may be used interchangeably with channels and/or signals.

$$\epsilon\epsilon\epsilon\epsilon\ tf = \mathrm{mod}\left(\frac{UE_{ID}}{N_F}\right)$$

The terms mmW beam reference signal, mmW reference resource for beam measurement, mmW measurement reference signal, mmW channel state measurement reference signal, mmW demodulation reference signal, mmW sounding reference signal, reference signal, CSI-RS, CRS, DM-RS, DRS, measurement reference signal, reference resource for measurement, CSI-IM, and measurement RS may be used interchangeably. mmW cell, mmW small cell, SCell, secondary cell, license-assisted cell, unlicensed cell, and Licensed Assisted Access (LAA) cell may be used interchangeably. The terms mmW cell, mmW small cell, PCell, primary cell, LTE cell, and licensed cell may be used interchangeably.

$$\epsilon\epsilon\epsilon\epsilon\ tf = \mathrm{mod}\left(\frac{UE_{ID}}{N_F}\right)$$

The terms interference and interference plus noise may be used interchangeably.

$$\in\in\in\in tf = \mod\left(\frac{UE_{ID}}{N_F}\right)$$

Multiple above-6 GHz frequency bands have been evaluated for next generation cellular networks. For example, 10 GHz and 15 GHz bands have been evaluated at the cmW frequency band. In addition, 28 GHz, 39 GHz, 60 GHz and 73 GHz bands have been evaluated at the mmW frequency band. These higher frequency bands may be allocated as licensed, lightly licensed, and unlicensed spectrums.

$$\in\in\in\in tf = \mod\left(\frac{UE_{ID}}{N_F}\right)$$

Depending on the allocation of the spectrum and its propagation characteristics, the above-6 GHz frequency bands may be deployed in various cellular network configurations. For example, mmW frequencies may be used for a homogenous network with mmW stand-alone Macro-, Micro- and Small Cell base stations. A heterogeneous network may consist of a mmW stand-alone small cell network overlaid with a LTE Macro- and/or Micro-network at sub-6 GHz frequencies. In such a network, a network node may be connected to both above-6 GHz frequencies (e.g., a mmW system) and below-6 GHz frequencies (e.g., a 2 GHz LTE system), which may be referred as Dual Connectivity. Carrier aggregation may be applied to combine above-6 GHz carriers (e.g., mmW) and sub-6 GHz carriers (e.g., 2 GHz LTE carriers).

$$\in\in\in\in tf = \mod\left(\frac{UE_{ID}}{N_F}\right)$$

Embodiments described herein may apply to any above-6 GHz cellular deployment.

$$\in\in\in\in tf = \mod\left(\frac{UE_{ID}}{N_F}\right)$$

Waveforms, such as, for example, orthogonal frequency-division modulation (OFDM), broad-band Single Carrier (SC), SC-OFDM, Generalized OFDM, Filter Bank Multi-carrier (FBMC), and Multi-Carrier Code Division Multiple Access (MC-CDMA) may be used for above-6 GHz systems. Waveforms may have different Peak to Average Power Ratio (PAPR) performance, sensitivity to transmitter nonlinearity, Bit Error Rate (BER) performance, resource channelization, and implementation complexity.

$$\in\in\in\in tf = \mod\left(\frac{UE_{ID}}{N_F}\right)$$

While frame structure may depend on the applied waveform, it may also be dimensioned to meet the above-6 GHz system requirement. For example, in order to achieve very low latency, a higher-frequency cellular system may have a subframe length of 100 μs.

$$\in\in\in\in tf = \mod\left(\frac{UE_{ID}}{N_F}\right)$$

Figure 2:
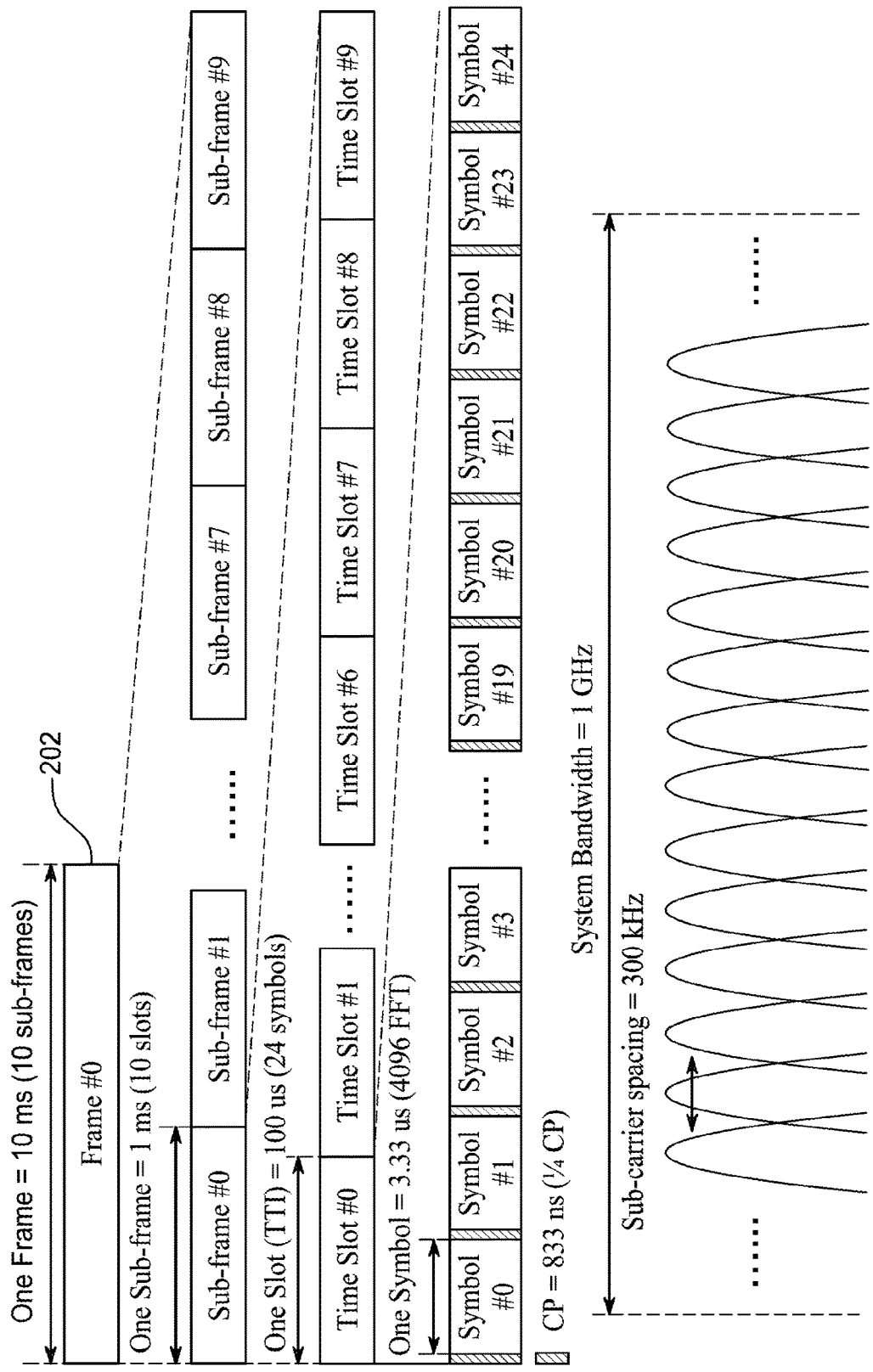
FIG. 2 shows a diagram of an orthogonal frequency-division multiplexing (OFDM) frame structure over a 1-GHz system bandwidth according to one or more embodiments.

Referring to FIG. 2, FIG. 2 shows a diagram of an OFDM frame structure 200 over a 1-GHz system bandwidth. According to the OFDM-based frame structure 200 shown in FIG. 2, a frame 202 includes 10 sub-frames, each sub-frame includes 10 slots, and each slot includes 24 symbols. The OFDM-based frame structure 200 may have, for example, a sub-carrier spacing of 300 kHz with a corresponding symbol length ($T_{symbol}$) of 3.33 μs. Considering a cyclic prefix (CP) length may span over the entire length of the channel time dispersion in order to eliminate the inter-symbol-interference, one example of CP for a $T_{symbol}$ of 3.33 μs may be selected at ¼ of $T_{symbol}$ (i.e., at 0.833 μs). This example numerology may be used for a range of above-6 GHz system bandwidths (e.g., from 50 MHz to 2 GHz) with corresponding Fast Fourier Transform (FFT) length.

$$\in\in\in\in tf = \mod\left(\frac{UE_{ID}}{N_F}\right)$$

Figure 3:
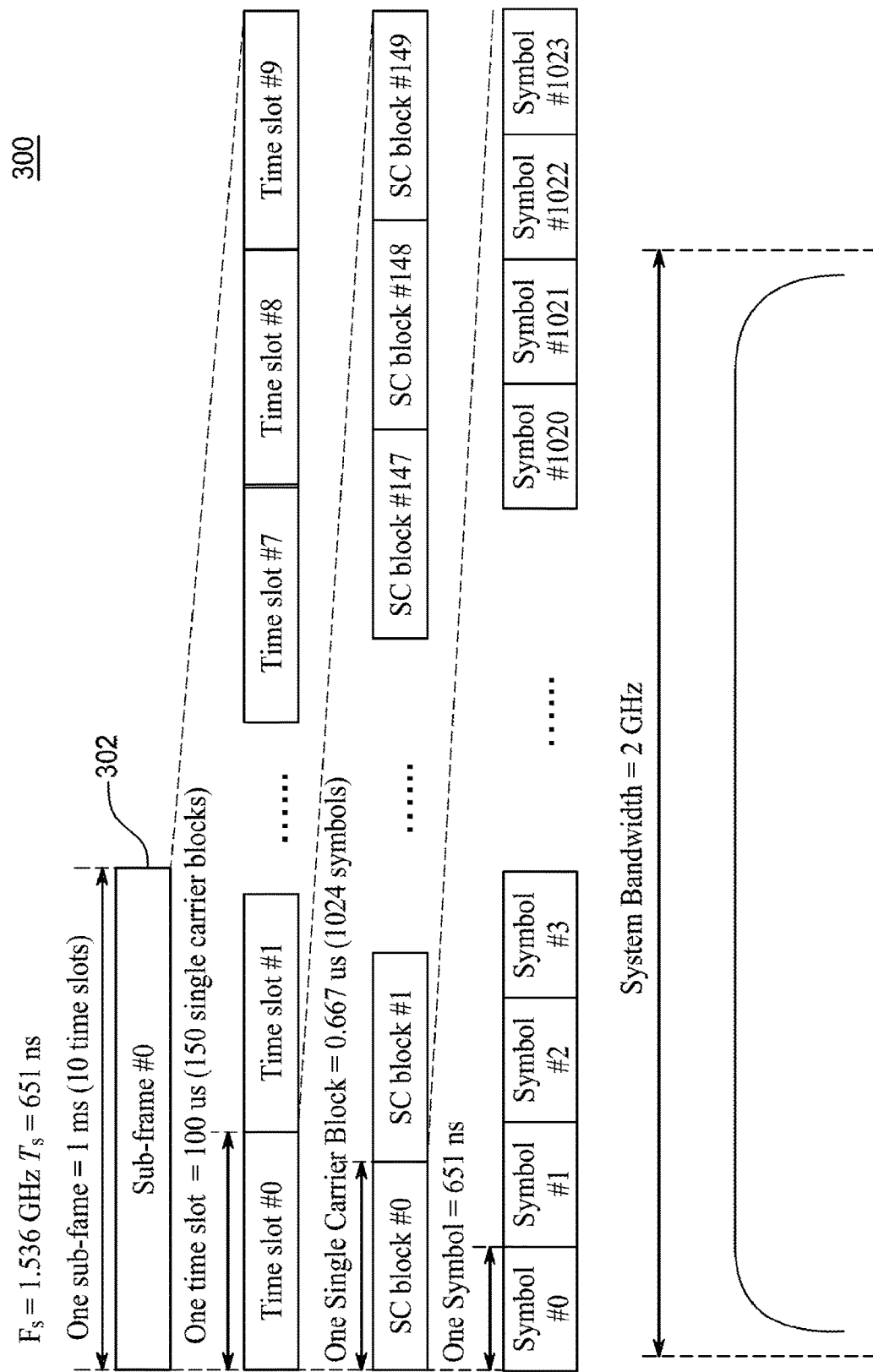
FIG. 3 shows a diagram of a single carrier frame structure over a 2-GHz system bandwidth according to one or more embodiments.

Referring now to FIG. 3, FIG. 3 shows a diagram of a single carrier frame structure 300 over a 2-GHz system bandwidth. Another frame structure may be based on single carrier over an entire system bandwidth. The system bandwidth may range from 50 MHz to 2 GHz. One such example may be based on 2 GHz bandwidth. The sampling frequency $F_s$ may be 1.536 GHz with a 1024-FFT. A subframe 302 may include 10 time slots each of which may be 100 μs and may have 150 single carrier (FFT) blocks. Each single carrier block may have 1024 symbols that can be used for synchronization, reference, control, data, cyclic prefix or other system purposes.

$$\in\in\in\in tf = \mod\left(\frac{UE_{ID}}{N_F}\right)$$

An above-6 GHz system (e.g., cmW and mmW systems) may apply any waveform and frame structure or combination thereof as discussed above. Procedures described in this disclosure may apply to all these waveform and frame structure selections.

$$\in\in\in\in tf = \mod\left(\frac{UE_{ID}}{N_F}\right)$$

Above-6 GHz systems may use Frequency Division Duplex (FDD), Time Division Duplex (TDD), Spatial Division Duplex (SDD) or any combination of them in conjunction with either half-duplex or full-duplex mechanisms.

$$\in\in\in\in tf = \mod\left(\frac{UE_{ID}}{N_F}\right)$$

A full-duplex FDD system may use a duplex filter to allow simultaneous downlink and uplink operation at different frequencies separated by a duplex distance. A half-duplex FDD system may not use a duplex filter, as the downlink and uplink operation may take place at different time instance in its dedicated frequency. A TDD system may have the downlink and uplink operate at the same frequency at different time instances. A SDD system, for example, in a beamformed system, may enable a network node to transmit and receive at a same frequency and time instance but at different outgoing and incoming spatial directions.

$$\in\in\in\in tf = \mathrm{mod}\left(\frac{UE_{ID}}{N_F}\right)$$

An above-6 GHz network may use Frequency Division Multiple Access (FDMA), Time Division Multiple Access (TDMA), Spatial Division Multiple Access (SDMA), Code Division Multiple Access (CDMA), Non-Orthogonal Multiple Access (NOMA), or any combination thereof. FDMA, TDMA, SDMA and CDMA may be applied in an orthogonal manner to avoid interference.

$$\in\in\in\in tf = \mathrm{mod}\left(\frac{UE_{ID}}{N_F}\right)$$

Multiple network nodes may be assigned to use different frequency resources simultaneously in a FDMA system, or to access the system frequency resources at different time instances in a TDMA system. Moreover the network nodes may access the same frequency resources at the same time, but may use a different code in a CDMA system. A SDMA system may assign a spatial resource to network nodes to operate at same frequency, time, and code resource. In a beamformed network, WTRUs may use different beams.

$$\in\in\in\in tf = \mathrm{mod}\left(\frac{UE_{ID}}{N_F}\right)$$

In a NOMA system, multiple network nodes may be assigned overlapping or identical resources in frequency, time, code or spatial domain, but may apply additional mechanisms to remove interference caused by the non-orthogonal use of the resource between users. For example, two WTRUs may be located relatively far from each other, and the difference of their path loss to the base station may be large. They may be assigned with the same frequency resource in the same subframe with very different transport formats. Superposition coding and a Successive Interference Rejection (SIC) receiver may be used for a WTRU to remove the received signal intended for the other.

$$\in\in\in\in tf = \mathrm{mod}\left(\frac{UE_{ID}}{N_F}\right)$$

An above-6 GHz system (e.g., cmW and mmW systems) may apply any duplex scheme and multiple access or combination of them as discussed above. Embodiments described herein may apply to all these duplex schemes and multiple access schemes.

$$\in\in\in\in tf = \mathrm{mod}\left(\frac{UE_{ID}}{N_F}\right)$$

An above-6 GHz system may have a number of physical channels and signals for various system purposes. Certain signals may be used for multiple system procedures.

$$\in\in\in\in tf = \mathrm{mod}\left(\frac{UE_{ID}}{N_F}\right)$$

The following are examples of downlink physical channels and signals.

$$\in\in\in\in tf = \mathrm{mod}\left(\frac{UE_{ID}}{N_F}\right)$$

A synchronization signal may be a pre-defined signal that may be used for cell timing/frequency synchronization. It may be transmitted according to pre-defined periodicity. In a beamformed system, the signal may provide beam timing and frequency acquisition.

$$\in\in\in\in tf = \mathrm{mod}\left(\frac{UE_{ID}}{N_F}\right)$$

A physical broadcast channel may carry broadcast information, such as cell specific system information.

$$\in\in\in\in tf = \mathrm{mod}\left(\frac{UE_{ID}}{N_F}\right)$$

A downlink reference signal may be a pre-defined sequence transmitted to enable various system procedures (e.g., channel estimation for control channel, channel statement measurement, timing and frequency fine-tuning, system measurement, and the like). There may be different types of reference signals. In a beamformed system, a downlink reference signal may be used for beam acquisition, beam pairing, beam tracking, beam switch, beam measurement, and the like.

$$\in\in\in\in tf = \mathrm{mod}\left(\frac{UE_{ID}}{N_F}\right)$$

A physical downlink control channel may carry data related control information to identify, demodulate and decode the associated data channel properly.

$$\in\in\in\in tf = \mathrm{mod}\left(\frac{UE_{ID}}{N_F}\right)$$

A physical downlink data channel may carry payload information in the form of Medium Access Control (MAC) Protocol Data Unit (PDU) from the MAC layer. The resource allocation of this channel may be carried in the scheduling information in the physical downlink control channel.

$$\in\in\in\in tf = \mathrm{mod}\left(\frac{UE_{ID}}{N_F}\right)$$

A data demodulation reference signal may have symbols that may be transmitted for channel estimation of downlink control or data channel. The symbols may be placed together with the associated control or data symbols in the time and frequency domain according to pre-defined pattern. This may ensure correct interpolation and reconstruction of the channel.

$$\epsilon\epsilon\epsilon\epsilon\, tf = \mathrm{mod}\left(\frac{UE_{ID}}{N_F}\right)$$

The following are examples of uplink physical channels and signals.

$$\epsilon\epsilon\epsilon\epsilon\, tf = \mathrm{mod}\left(\frac{UE_{ID}}{N_F}\right)$$

An uplink reference signal may be used for uplink channel sounding, uplink system measurement, etc. In a beamformed system, an uplink reference signal may be used for uplink beam acquisition, beam pairing, beam tracking, beam switch, beam measurement, etc.

$$\epsilon\epsilon\epsilon\epsilon\, tf = \mathrm{mod}\left(\frac{UE_{ID}}{N_F}\right)$$

A physical random access channel (PRACH) may carry a pre-defined sequence in connection with a random access procedure.

$$\epsilon\epsilon\epsilon\epsilon\, tf = \mathrm{mod}\left(\frac{UE_{ID}}{N_F}\right)$$

A physical uplink control channel may carry uplink control information, such as channel state information, data acknowledgement, scheduling request, etc.

$$\epsilon\epsilon\epsilon\epsilon\, tf = \mathrm{mod}\left(\frac{UE_{ID}}{N_F}\right)$$

A physical uplink data channel may carry payload information in the form of MAC PDU from a UE MAC layer. The resource allocation of this channel may be conveyed in the downlink control channel.

$$\epsilon\epsilon\epsilon\epsilon\, tf = \mathrm{mod}\left(\frac{UE_{ID}}{N_F}\right)$$

A data demodulation reference signal may have symbols that may be transmitted for channel estimation of uplink control or data channel. The symbols may be placed together with the associated data symbols in the time and frequency domain according to pre-defined pattern to ensure correct interpolation and reconstruction of the channel.

$$\epsilon\epsilon\epsilon\epsilon\, tf = \mathrm{mod}\left(\frac{UE_{ID}}{N_F}\right)$$

An above-6 GHz system (e.g., cmW and mmW systems) may deploy the signals and channels discussed above. Embodiments described herein may apply to these physical signals and channels.

$$\epsilon\epsilon\epsilon\epsilon\, tf = \mathrm{mod}\left(\frac{UE_{ID}}{N_F}\right)$$

Beamforming may be important in above-6 GHz systems. Outage studies conducted at 28 GHz and 38 GHz in an urban area using a steerable 100-beamwidth and a 24.5-dBi horn antenna have shown a consistent coverage may be achieved with a cell-radius of up to 200 meters. Currently, LTE WTRUs are assumed to have an Omni-directional beam pattern and may perceive a superimposed channel impulse response over the entire angular domain. Thus an aligned beam pair e.g., at mmW frequencies may provide an additional degree of freedom in the angular domain compared with the current LTE system.

$$\epsilon\epsilon\epsilon\epsilon\, tf = \mathrm{mod}\left(\frac{UE_{ID}}{N_F}\right)$$

Conventional LTE WTRUs may have an Omni-directional beam pattern and may perceive a superimposed channel impulse response over the entire angular domain. Thus, an aligned beam pair at, for example, mmW frequencies, may provide an additional degree of freedom in the angular domain compared with conventional LTE systems.

$$\epsilon\epsilon\epsilon\epsilon\, tf = \mathrm{mod}\left(\frac{UE_{ID}}{N_F}\right)$$

Figure 4:
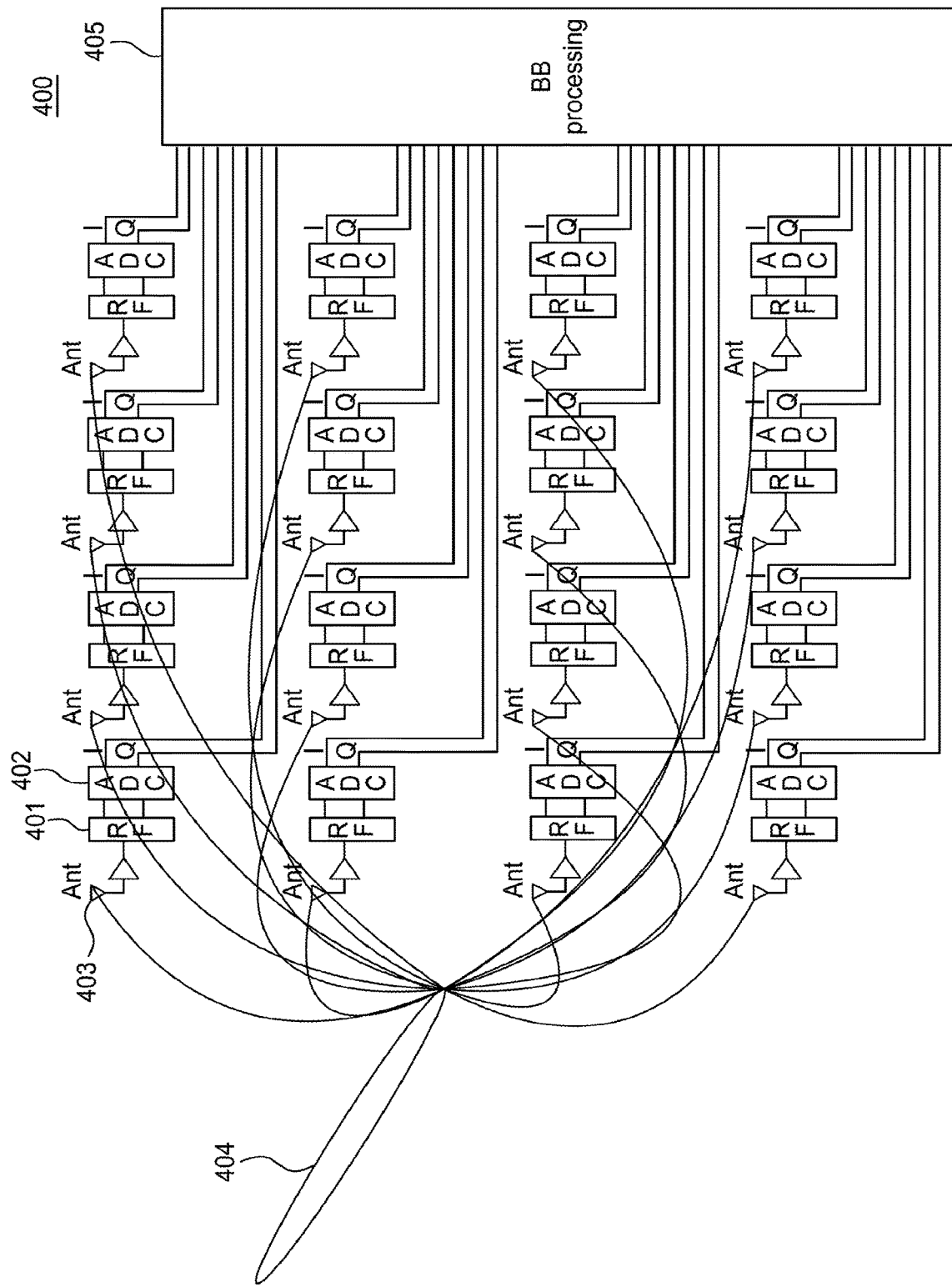
FIG. 4 shows a diagram illustrating a fully digitized beamforming system according to one or more embodiments.

Referring now to FIG. 4, FIG. 4 shows a diagram illustrating fully digitized beamforming system 400 according to one or more embodiments. A phase antenna array (PAA) may be used for beamforming with element spacing, e.g., at 0.5Λ. The phase antenna may apply different beamforming algorithms. A fully digitized beamforming approach may have a dedicated RF chain including an RF processor 401 and an analog-to-digital converter (ADC) 402 for each antenna element 403. The signal 404 processed by each antenna element 403 may be controlled independently in phase and amplitude to optimize the channel capacity. A baseband (BB) processor 405 is configured to perform BB processing on each dedicated RF chain based on the signals received from each ADC 402.

$$\epsilon\epsilon\epsilon\epsilon\, tf = \mathrm{mod}\left(\frac{UE_{ID}}{N_F}\right)$$

Figure 5:
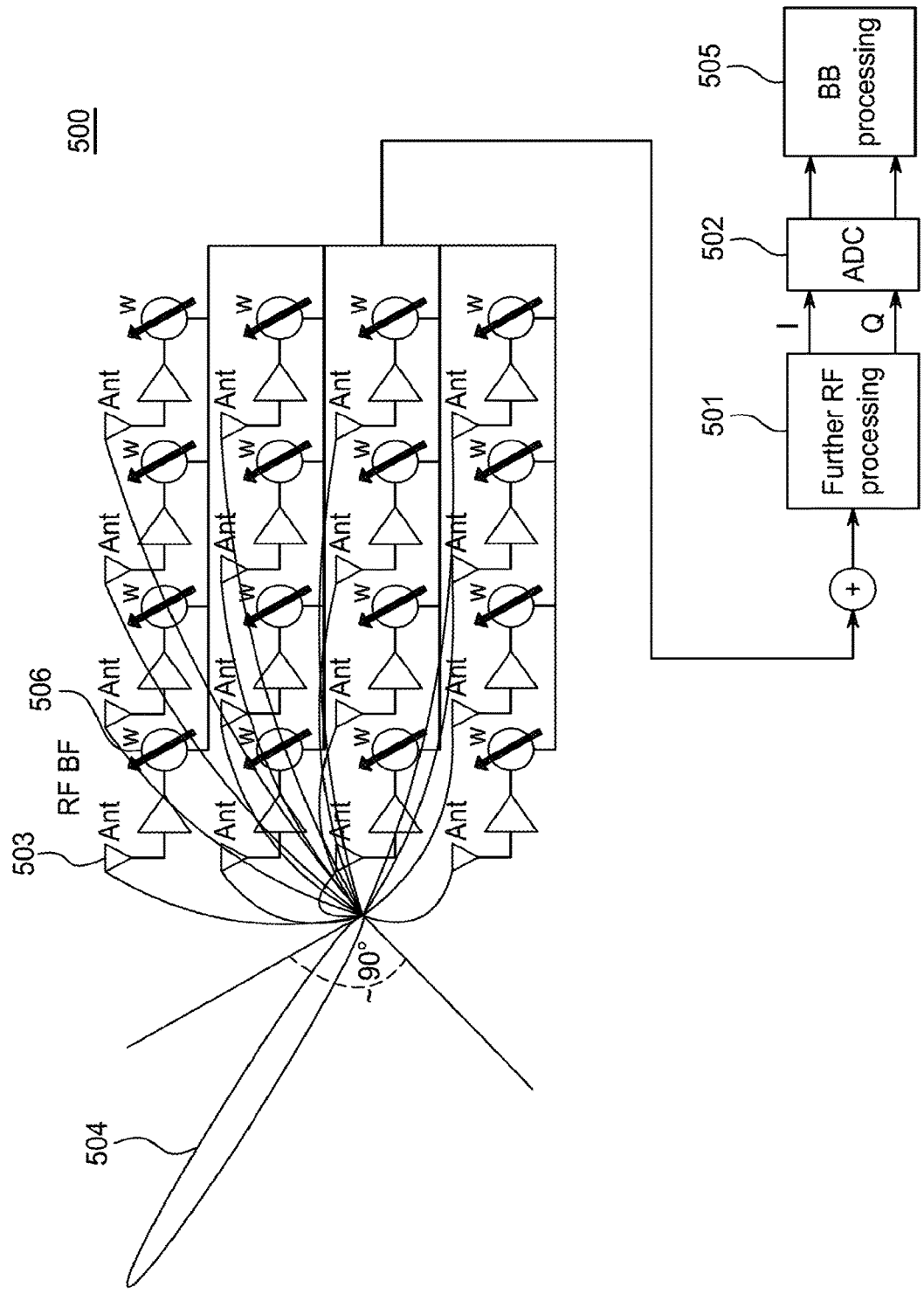
FIG. 5 shows a diagram illustrating an analog beamforming system with one phase antenna array (PAA) and one radio frequency (RF) chain according to one or more embodiments.

Referring now to FIG. 5, FIG. 5 shows a diagram illustrating analog beamforming system 500 according to one or more embodiments. In this embodiment, the analog beamforming may be with one PAA and one RF chain. The analog beamforming may apply one RF chain for a number of antenna elements 503 that process the signal 504. Each antenna element 503 may be connected to a phase shifter 506 that may be used to set the weight for beamforming and steering. The RF chain further includes an RF processor 501 and an ADC 502 which provides an output to a BB processor

505. The implemented number of RF chains may be significantly reduced as well as the energy consumption.

$$\in\in\in\in tf = \mod\left(\frac{UE_{ID}}{N_F}\right)$$

The phase shifting and combining may be implemented in different stages (e.g., at RF state, at BB analog stage, or at Local Oscillator (LO) stage). One example is a single-beam analog configuration. It may operate one beam at a time and the single beam may be placed at, for example, the strongest angular direction such as a LOS path obtained from beam measurement. A broad beam pattern may cover a range of angular directions at the expense of reduced beamforming gain.

$$\in\in\in\in tf = \mod\left(\frac{UE_{ID}}{N_F}\right)$$

A hybrid beamforming may combine digital precoding and analog beamforming. The analog beamforming may be performed over the phase array antenna elements each associated with a phase shifter and all connected to one RF chain. The digital precoding may be applied on the baseband signal of each RF chain.

$$\in\in\in\in tf = \mod\left(\frac{UE_{ID}}{N_F}\right)$$

Examples of system parameters of the hybrid beamforming may be number of data streams ($N_{DATA}$), number of RF chains TRX ($N_{TRX}$), number of antenna ports ($N_{AP}$), number of antenna elements ($N_{AE}$), and number of phase antenna arrays ($N_{PAA}$). The configuration of these parameters may impact on the system function and performance as discussed below.

$$\in\in\in\in tf = \mod\left(\frac{UE_{ID}}{N_F}\right)$$

Figure 6A:
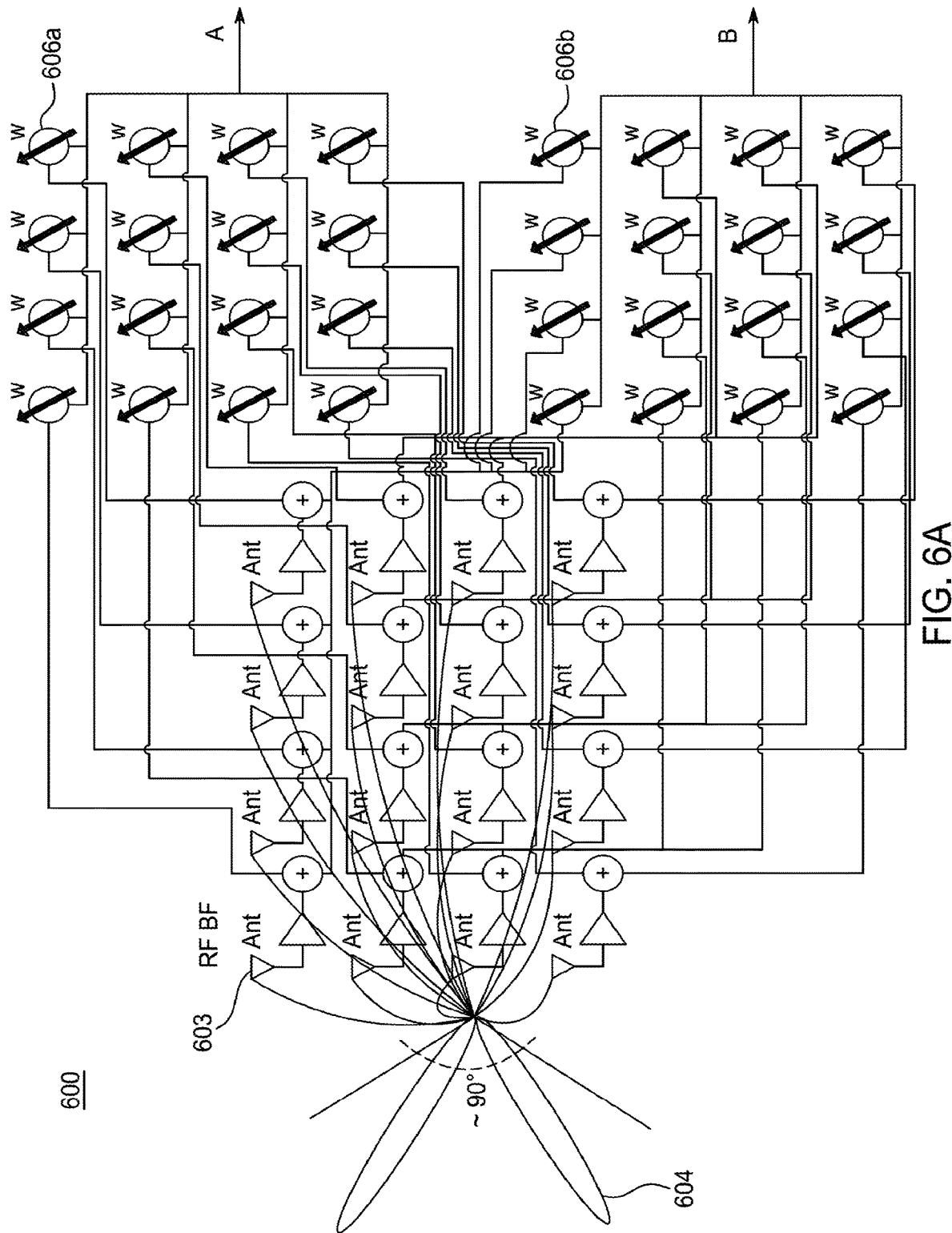

Referring now to FIGS. 6A and 6B, FIGS. 6A and 6B show a diagram illustrating analog beamforming system 600 with one PAA and two RF chains. One antenna port may carry a beamformed reference signal uniquely associated with this antenna port that may be used to identify the antenna port. One PAA may be connected to one RF chain or multiple RF chains depending on the system requirement and configuration. In FIGS. 6A and 6B, one PAA of size 4×4 with 16 antenna elements 603, for receiving a signal 604, may be connected to two RF chains and each RF chain may have a set of 16 phase shifters 606a and 606b. The PAA may form two narrow beam patterns within a +45° and −45° coverage in an azimuth plane. In this configuration, $N_{PAA}<N_{AP}=N_{TRX}<N_{AE}$. Each RF chain further includes an RF processor 601a or 601b and an ADC 602a or 602b which provide an output to a BB processor 605.

$$\in\in\in\in tf = \mod\left(\frac{UE_{ID}}{N_F}\right)$$

Figure 7:
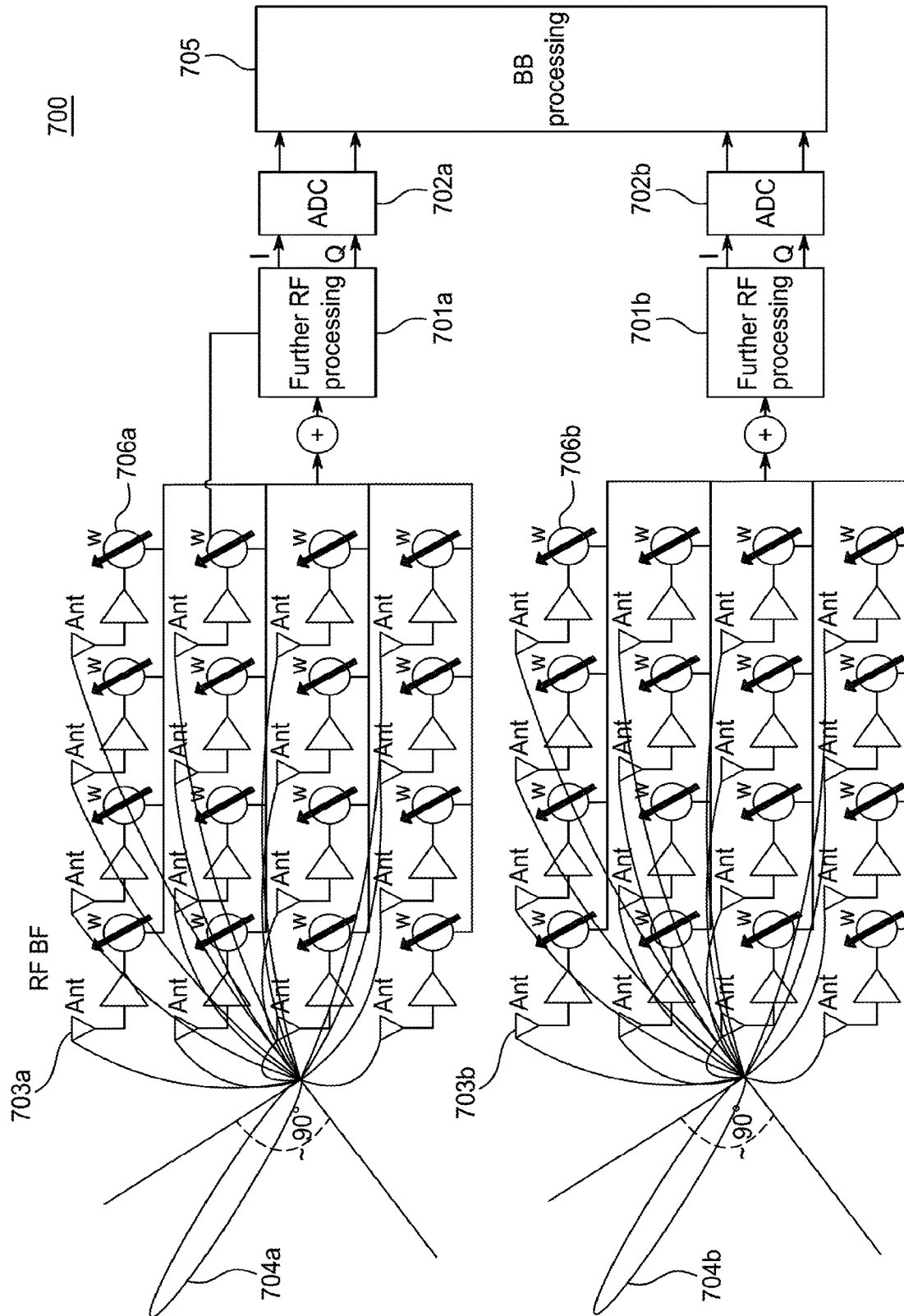
FIG. 7 shows a diagram illustrating an analog beamforming system with two PAAs and two RF chains according to one or more embodiments.

Referring now to FIG. 7, FIG. 7 shows a diagram illustrating analog beamforming system 700 with two PAAs and two RF chains. In an embodiment, there may two PAAs having a set of antenna elements 703a and 703b, respectively, for receiving signals 704a and 704b. Each antenna element 703a, 703b may be connected to a phase shifter 706a, 706b, respectively. Each PAA may have a dedicated RF chain, i.e., $N_{PAA}=N_{AP}=N_{TRX} N_{AE}$, including an RF processor 701a, 701b and an ADC 702a, 702b which provide an output to a BB processor 705. This configuration may allow spatial independence between the two simultaneous signals 704a and 704b by placing the PAAs at different orientations (e.g., in an azimuth plane). An aligned PAA arrangement may provide an aggregated larger coverage.

$$\in\in\in\in tf = \mod\left(\frac{UE_{ID}}{N_F}\right)$$

Both abovementioned example configurations with two RF chains may apply MIMO with two data streams.

$$\in\in\in\in tf = \mod\left(\frac{UE_{ID}}{N_F}\right)$$

Figure 8:
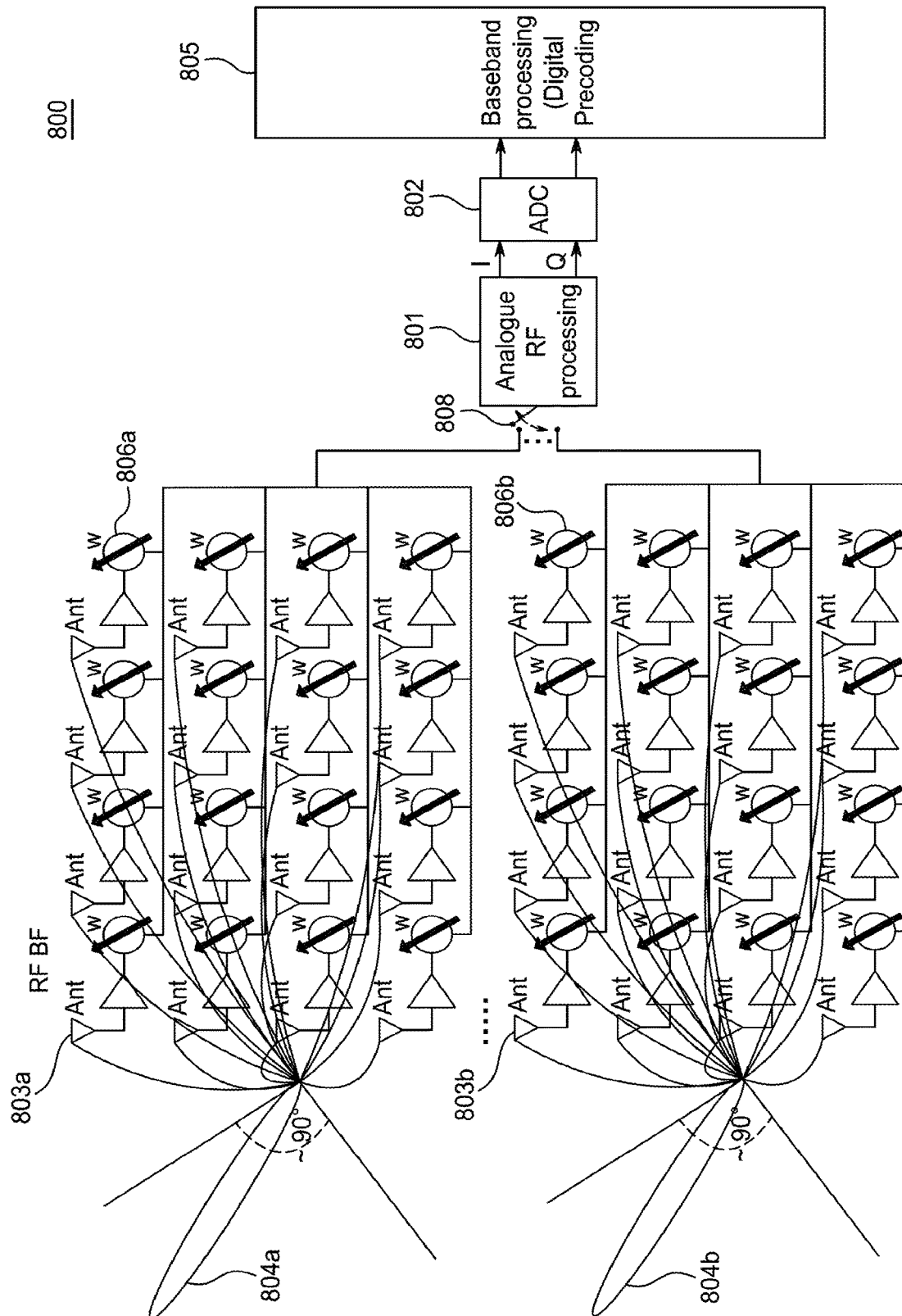
FIG. 8 shows a diagram illustrating an analog beamforming system with two PAAs and a single RF chain according to one or more embodiments.

Referring now to FIG. 8, FIG. 8 shows a diagram illustrating analog beamforming system 800 with two PAAs having a set of antenna elements 803a and 803b, respectively, for receiving signals 804a and 804b. Each antenna element 803a, 803b may be connected to a phase shifter 806a, 806b, respectively. The PAAs are connected to a single RF chain that includes a switch 808, an RF processor 801 and an ADC 802 that provides an output to a BB processor 805. Multiple PAAs may be connected to a single RF chain by using the switch 808 (i.e., $N_{AE}>N_{PAA}>N_{AP}=N_{TRX}$). Each PAA may form a narrow beam pattern covering from +450 to −450 in an azimuth plane. They may be oriented separately so a single-beam network node may have a good coverage by using a beam at different direction at different time instances.

$$\in\in\in\in tf = \mod\left(\frac{UE_{ID}}{N_F}\right)$$

An above-6 GHz system may apply different beamforming techniques, such as analogue, hybrid and digital beamforming. Embodiments described herein may apply to these beamforming techniques.

$$\in\in\in\in tf = \mod\left(\frac{UE_{ID}}{N_F}\right)$$

One or more embodiments may address the transmission schemes and transmission modes for highly directional antenna systems, and define the BRS association, the resource allocation and configuration for the fallback schemes, as well as the necessary CSI feedback.

$$\in\in\in\in tf = \mod\left(\frac{UE_{ID}}{N_F}\right)$$

Another embodiment may address the scenario where the data channel may exhibit a significant degradation, while the control channel may still be received. This scenario may occur for several reasons. For example, the scenario may be due to a change in orientation of the mobile device, which causes misalignment of the previously paired Tx-Rx narrow beams for data transmissions. Embodiments addressing this issue may be based on the fact that the control channel may still be received, and therefore it may be used for the data transmission at a lower rate. In other words, a main principle may be the use of the active control wide beam for data fallback, which may include both DL and UL data. The embodiments may include, but are not limited to: fallback to wide beam (both DL & UL data), and/or fallback to dual transport block (TB) transmission using wide and narrow beams for UE data in the same transmission time interval (TTI).

$$\in\in\in\in tf = \mod\left(\frac{UE_{ID}}{N_F}\right)$$

Another embodiment may address the scenario where both the control and the data channels are lost due to the beam misalignment. In this case, a two-step solution may be needed: the first step may identify a fallback for the control channel, and once the control channel can be decoded, a fallback may be determined for the data channel. The embodiments may include: fallback for the DL control and the associated DL/UL data, using fallback TTI.

$$\in\in\in\in tf = \mod\left(\frac{UE_{ID}}{N_F}\right)$$

The following may provide details for embodiments of DL/UL transmission schemes for one and multiple RF chains.

$$\in\in\in\in tf = \mod\left(\frac{UE_{ID}}{N_F}\right)$$

Transmission schemes for a system operating at a high carrier frequency (e.g., above 6 GHz) may be defined as mapping of the modulated baseband symbols to the allocated space/time/frequency resources, individual transmit antenna(s), and the associated reference symbols.

$$\in\in\in\in tf = \mod\left(\frac{UE_{ID}}{N_F}\right)$$

As indicated above, systems operating at high carrier frequency (e.g., above 6 GHz) may need to use beamforming (analog, digital or hybrid) to compensate for a 20-30 dB pathloss since it becomes more significant as the carrier frequency becomes higher. The beamforming may be used at the transmitter and/or at the receiver. The highest beamforming may be achieved when both transmitter and receiver use beamforming and the beam directions are aligned (e.g., transmitter and receiver beams are paired). The transmit and receive beam widths may be determined as a function of the type, size and number of antenna elements of the phased array antenna (PAA).

$$\in\in\in\in tf = \mod\left(\frac{UE_{ID}}{N_F}\right)$$

A normal transmission scheme may be defined as a transmission scheme used when a transmitter and/or a receiver may control beams properly based on the current channel condition (e.g., wide or narrow transmit and/or receive beam pairing is complete). The system may operate within the expected SNR range. In a system, one or more normal transmission schemes may be defined.

$$\in\in\in\in tf = \mod\left(\frac{UE_{ID}}{N_F}\right)$$

A fallback transmission scheme may be defined as a transmission scheme used for one or more of following cases. A fallback transmission scheme may be used when the performance of the normal transmission scheme is significantly degraded. For example, a significant loss in SNR may occur due to a change of the WTRU orientation with respect to the mB or due to blocking. A fallback transmission scheme may be used when the channel status information (CSI) ages faster than a feedback cycle, so that a transmitter may not rely on the reported CSI. A fallback transmission scheme may be used when a CSI is not available at the transmitter. Fallback transmission schemes may be defined for data channels, and for control channels. The transmission schemes in this disclosure may be not limited to a system with a high carrier frequency and may be used for a system with any carrier frequency.

$$\in\in\in\in tf = \mod\left(\frac{UE_{ID}}{N_F}\right)$$

A normal transmission scheme may use a single transmit RF chain or multiple transmit RF chains. If a single transmit RF chain is used, the normal transmission scheme may use analog beamforming. On the other hand, if multiple RF chains are used, the normal transmission scheme may use analog, digital, or hybrid beamforming. Although the beamforming capability is determined based on the number of RF chain and/or number of antenna element, embodiments described herein may be used for a system with any number of transmit/receive RF chains and/or antenna elements and still be consistent with this disclosure.

$$\in\in\in\in tf = \mod\left(\frac{UE_{ID}}{N_F}\right)$$

The beamforming capability described herein may include one or more of following: a number of beams supported, a beamwidth, a beam control ability (e.g., analog, digital, and hybrid), and a beam measurement/reporting. The number of beams may be interchangeably used as a number of beam steering vectors and a number of precoding vectors. The beamwidth may be interchangeably used as a beam steering vector and as a precoding vector.

$$\in\in\in\in tf = \mod\left(\frac{UE_{ID}}{N_F}\right)$$

A normal transmission scheme may use analog beamforming and may operate using either wide or narrow beams, with or without channel state information (CSI) feedback from the receiver (i.e., closed loop or open loop transmission schemes).

$$\epsilon\epsilon\epsilon\epsilon\, tf = \mathrm{mod}\left(\frac{UE_{ID}}{N_F}\right)$$

In an example, a WTRU may not have a receiver beamforming capability and an analog beamforming may be used only at the transmitter. Therefore, the beam pairing between transmitter beam and receiver beam may not be used. A transmission scheme may be defined without a beam pairing process. Therefore, a transmitter may not provide a transmit beam information (e.g., the transmit beam ID) for a downlink transmission when a transmission scheme which may not support beam pairing process may be used.

$$\epsilon\epsilon\epsilon\epsilon\, tf = \mathrm{mod}\left(\frac{UE_{ID}}{N_F}\right)$$

In another example, a WTRU may have receiver beamforming capability and the analog beamforming may be used at both transmitter and receiver. A beam pairing scheme/process between transmitter beam and receiver beam may be used. A transmission scheme with beam pairing process may use one or more following methods. A downlink control channel may indicate the transmit beam information for the associated data channel. The downlink control channel may be, but is not limited to, a physical downlink control channel, MAC control message, higher layer radio resource control (RRC) signaling, or a broadcasting channel. A downlink control channel may indicate a receive beam information for the associated data channel. Therefore, a WTRU may use the receiver beam indicated from the downlink control channel. A transmitter may request a preferred transmit beam information from a receiver, or a receiver may be configured to report a preferred transmit beam information regularly.

$$\epsilon\epsilon\epsilon\epsilon\, tf = \mathrm{mod}\left(\frac{UE_{ID}}{N_F}\right)$$

The receiver beamforming may be indicated as a WTRU capability and a transmission scheme may be determined as a function of the receiver beamforming capability. For example, if a WTRU indicates no receiver beamforming support, a transmission scheme without beam pairing process may be used. On the other hand, if a WTRU indicates receiver beamforming support, a transmission scheme with beam pairing process may be used. For the transmission scheme determination according to the WTRU receiver beamforming capability, one or more of following operations may apply. Existence of a bit field in a downlink control channel may be used to indicate the transmit beamforming information may be determined as a function of the WTRU receiver beamforming capability. A downlink control information (DCI) format may be determined as a function of the WTRU receiver beamforming capability. A channel status information (CSI) reporting type may be determined as a function of the WTRU receiver beamforming capability. A downlink control type may be determined as a function of the WTRU receiver beamforming capability. The relative timing between a downlink control channel and the associated data channel may be determined as a function of the WTRU beamforming capability.

$$\epsilon\epsilon\epsilon\epsilon\, tf = \mathrm{mod}\left(\frac{UE_{ID}}{N_F}\right)$$

Figure 9:
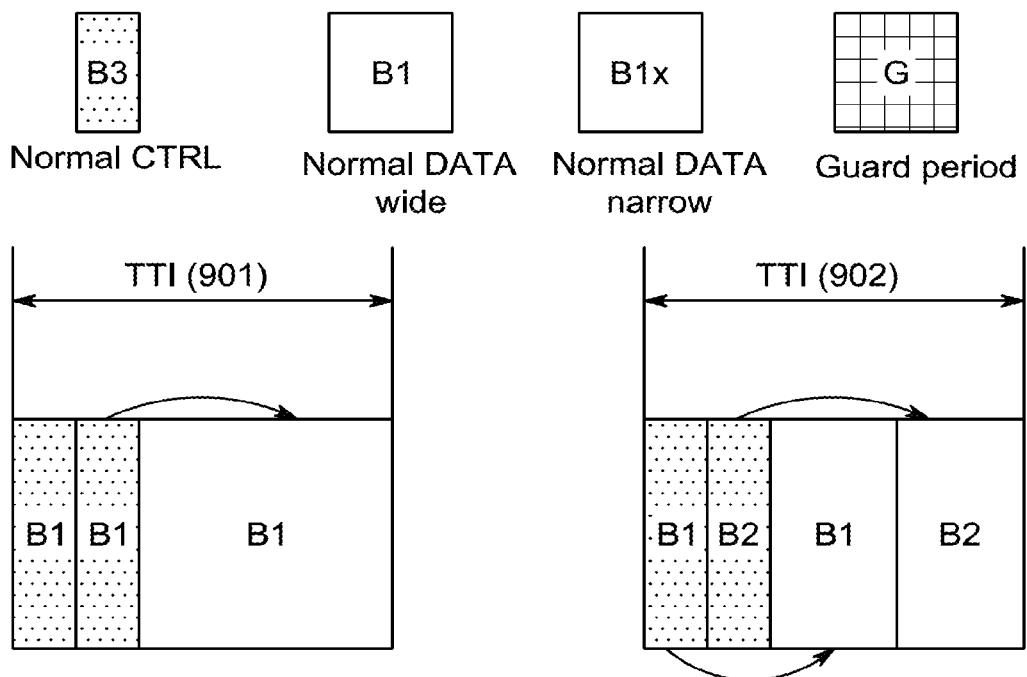
FIG. 9 shows a diagram illustrating of a semi-static association between the control transmit (Tx) beam and data Tx beam according to one or more embodiments.

Referring now to FIG. 9, FIG. 9 illustrates a diagram of a semi-static association between the control transmit (Tx) beam and data Tx beam. While the beams shown in FIG. 9 are described in the context of Tx beams used by a transmitter, it will be appreciated that a receiver uses a corresponding Rx beam in a similar manner. Therefore, Tx and Rx may be used interchangeably in the context of a transmitter or a receiver, respectively.

$$\epsilon\epsilon\epsilon\epsilon\, tf = \mathrm{mod}\left(\frac{UE_{ID}}{N_F}\right)$$

In FIG. 9, two TTIs 901 and 902 are shown. In TTI 901, a normal control Tx beam B1 (i.e., wide beam) is associated with a normal data Tx beam B1, which is a wide beam. In TTI 902, normal control Tx beams B1 and B2 (i.e., wide beams) are associated with normal data Tx beams B1 and B2, respectively, where the normal data Tx beams B1 and B2 are wide beams. A transmission scheme may use an implicit beam association between control channel and data channel, where a same transmit beam may be used for both the control channel and the associated data channel, as illustrated in FIG. 9. A WTRU or receiver may assume that a same transmit beam is used for the control channel and the associated data channel. A WTRU may use the same receiver beam for the control channel and the associated data channel as a WTRU may assume the same transmit beam is used. A WTRU may determine a preferred receiver beam during the control channel reception and use the determined receiver beam for the associated data channel.

$$\epsilon\epsilon\epsilon\epsilon\, tf = \mathrm{mod}\left(\frac{UE_{ID}}{N_F}\right)$$

For a transmission scheme which may use the same transmit beam for a control channel and the associated data channel, or may require the same receiver beam for a control channel and the associated data channel, the transmit beam information may not be indicated from the control channel. The transmit beam may be adapted either semi-statically or dynamically without the downlink beam indication. The beam may be changed semi-statically and the beam information may be transparent to a WTRU. The beam information for the control channel and/or the associated data channel may be indicated via higher layer signaling. The beam may be changed dynamically without beam indication in the downlink control channel. The beam information for the control channel and/or the associated data channel may be determined based on the search space of the control channel. The beam information for the control channel and/or the associated data channel may be determined as a function of the location of the control channel within a search space. A beam index may be determined as a function of the starting control channel element (CCE) or enhanced control channel element (ECCE) index of the control channel. A beam index may be determined as a function of BRS used to demodulation the control channel.

$$\in\in\in\in tf = \mathrm{mod}\left(\frac{UE_{ID}}{N_F}\right)$$

A transmission scheme may use explicit beam association between control channel and the associated data channel, where the transmit beam for the control channel and the associated data channel may be determined independently (or separately). The transmit beam used for the data channel may be explicitly indicated from the corresponding control channel. The transmit beam described herein may include one or more of following parameters: Tx or Rx beam width (e.g., beam subgroup), Tx or Rx beam direction (e.g., beam index) within the beam width, and a time-frequency resource associated with the beam. The beam index may be indicated as antenna port or reference signal sequence.

$$\in\in\in\in tf = \mathrm{mod}\left(\frac{UE_{ID}}{N_F}\right)$$

In an example, the transmission scheme using explicit beam association may dynamically switch the Tx beam within a TTI from the wide beam used for control channel to a narrow beam used for the associated data channel. The narrow beam may reside within the wide beam as a subset of the wide beam. As the transmit node dynamically switches from a wide to a narrow beam within a TTI, the receive node may need to also steer its receive beam to ensure that it can receive the narrow Tx beam correctly from the transmitter (e.g., mB). That is, the receiver configures its receive beam to be aligned with the narrow transmit beam. The DCI in the control channel may carry one or more of following parameters for the transmission scheme using explicit beam association: HARQ process number, transport block information, antenna configuration (as needed), downlink assignment index (DM), and/or power control indicator.

$$\in\in\in\in tf = \mathrm{mod}\left(\frac{UE_{ID}}{N_F}\right)$$

The DCI in the control channel may carry a beam ID or a beam index for the data channel. The beam ID or beam index may be interpreted differently according to the beam used for the control channel. For example, one or more wide beams may be used for the control channel. Additionally, a group of narrow beams, which may be associated with a wide beam, may be used for the associated data channel. Therefore, according to the wide beam used for the control channel, the narrow beam ID or beam index for the associated data channel may be different. The beam ID or beam index may be an index of a narrow beam within the group of narrow beams associated with the wide beam.

$$\in\in\in\in tf = \mathrm{mod}\left(\frac{UE_{ID}}{N_F}\right)$$

The wide beam for the control channel may be determined in a semi-static manner. For example, a higher layer signaling may be used to determine the wide beam and, based on the higher layer configured wide beam for control channel, the group of the narrow beam may be determined. The wide beam for the control channel may be determined as a function of the location of a WTRU-specific search space and/or location within the search space. The wide beam for the control channel may be determined during initial access procedure, random access procedure, and/or cell (re)selection procedure.

$$\in\in\in\in tf = \mathrm{mod}\left(\frac{UE_{ID}}{N_F}\right)$$

The DCI in the control channel may carry a bit field to request preferred beam reporting. If a WTRU receives an indication of preferred beam reporting, the WTRU may report a preferred narrow beam index in the corresponding uplink resource.

$$\in\in\in\in tf = \mathrm{mod}\left(\frac{UE_{ID}}{N_F}\right)$$

The DCI in the control channel may carry a bit field to request beam p airing.

$$\in\in\in\in tf = \mathrm{mod}\left(\frac{UE_{ID}}{N_F}\right)$$

Referring now to FIG. 10, FIG. 10 shows a diagram illustrating an intra-TTI DL assignment with a guard period to detect the Tx beam for data and switch the Rx beam. While the beams shown in 10 are described in the context of Tx beams used by a transmitter, it will be appreciated that a receiver uses a corresponding Rx beam in a similar manner. Therefore, Tx and Rx may be used interchangeably in the context of a transmitter or a receiver, respectively.

$$\in\in\in\in tf = \mathrm{mod}\left(\frac{UE_{ID}}{N_F}\right)$$

In FIG. 10, two TTIs 1001 and 1002 are shown. In TTI 1001, a normal control Tx beam B1 (i.e., wide beam) is associated with a normal data Tx beam B1x, which is a narrow beam. A guard period G is present between the control Tx beam B1 and the normal data Tx beam B1x. In TTI 1002, normal control Tx beams B1 and B2 (i.e., wide beams) are associated with normal data Tx beams B1x and B2y, respectively, where the normal data Tx beams B1x and B2y are narrow beams. A guard period G is present between control Tx beam B2 and the data Tx beam B1x.

$$\in\in\in\in tf = \mathrm{mod}\left(\frac{UE_{ID}}{N_F}\right)$$

Spatially, narrow beams B2x, B2y, etc., are within the area of wide beam B2. Similarly, a number of narrow beams B1x, B1y, etc., reside within the area of wide beam B1. Thus, narrow beams B2*x*, B2*y*, etc., are associated with wide beam B2 and narrow beams B 1*x*, B1*y*, etc., are associated with wide beam B1.

The WTRU may need to decode the control channel, and may extract from the DCI, the ID of the Tx beam (and thus information on the BRS) of the data channel. This may require a guard time G to be used between the end of the control region B1 and the start of the associated data Tx beam B1*x*, to allow the WTRU enough time to correctly steer its receive beam to receive the data channel (i.e., to align its (narrow) receive beam with the mB's transmit beam). Within a TTI, a guard period G may be achieved by creating a gap between the end of the control region and the start of the data region, as illustrated in FIG. 10. The length of the guard period may need to be set such that the WTRU may be able to decode the control channel and switch its receive beam before the start of the data region.

A guard period G may be present between the control channel and its associated data channel in a certain DCI format in which beam index is provided for the associated data channel. One or more of following parameters may apply.

A guard period G may be used for a WTRU with a certain receiver beamforming capability. For example, if a WTRU indicated that the WTRU has analog beamforming capability only at the receiver, the guard period G may be configured by the base station via higher layer signaling. Alternatively, a WTRU may indicate a required guard period for the receiver beamforming adaptation.

A guard period G may include the control channel reception time and receiver beam switching time. Therefore, the portion of control channel reception time may be used, depending on the WTRU receiver beamforming cap abilities.

A guard period G may be present if the DCI in the control channel indicates that the beam index of the associated data channel is changed from the latest beam index. Alternatively, the guard period G may be present if the DCI in the control channel indicates that the beam index of the associated channel is different from the beam index of the control channel. A single bit or state in the DCI may indicate the beam index change confirmation, or guard period indication. Other bits or states may also indicate the beam index change.

If the length of the guard period G is smaller than the CP length, no explicit guard period may be used. If a system supports two or more CP lengths (e.g., a normal CP length and an extended CP length), the guard period G may be used in the normal CP case, while no guard period is used in the extended CP case. Therefore, the guard period G may be considered as '0' in FIG. 10 if the CP length is larger than beam switching time and the decoding time.

It should be noted that CP length and guard time can be interchangeably used. For example, CP length may be used in a certain waveform (e.g., OFDM) and guard time may be used in another waveform (e.g., single carrier modulation) but is not limited to a specific waveform. The CP may be used between modulation symbols and the guard period may be used between the control channel and the associated data channel.

Figure 11:
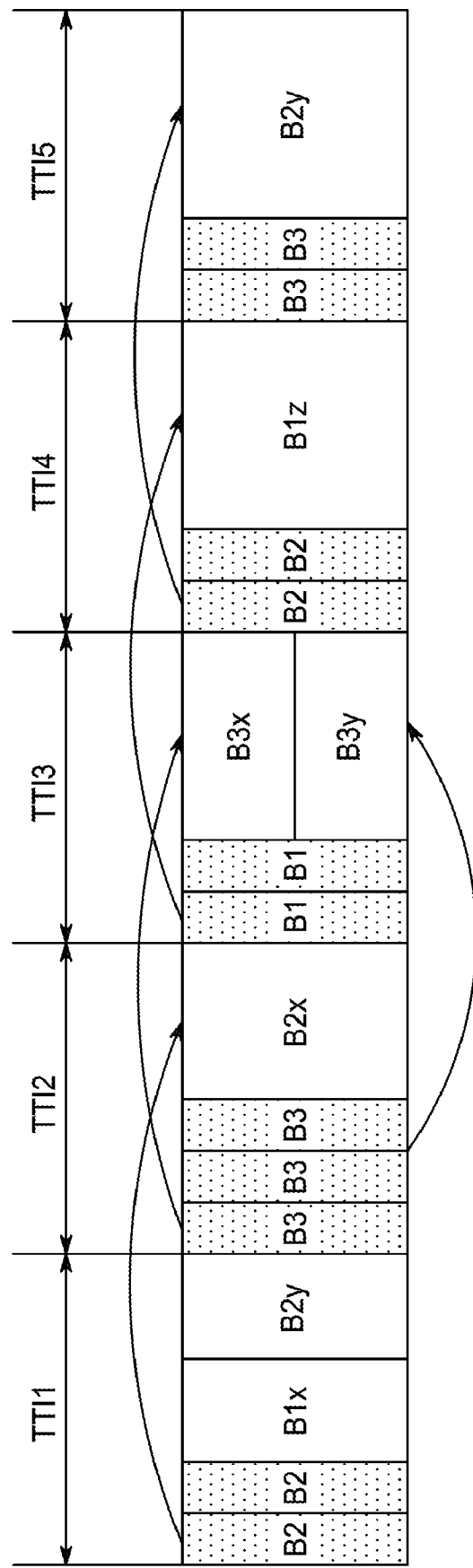
FIG. 11 shows a diagram illustrating a cross-TTI DL assignment with narrow beam indication according to one or more embodiments.

Referring now to FIG. 11, FIG. 11 shows a diagram illustrating a cross-TTI DL assignment with narrow beam indication. Instead of creating guard periods within a TTI, cross-TTI DL assignments may be used where a control Tx beam in one TTI is associated with a data Tx beam in a subsequent TTI. The subsequent TTI may immediately follow the corresponding TTI, or may follow by one or more TTIs. Suffixes "x", "y" and "z" are further used to identify different narrow data Tx beams associated with different wide control Tx beams. For example, B1*x*/My/B1*z* denote narrow beams associated to wide beam B 1, B2*x*/B2*y* denote narrow beams associated to wide beam B2, and so on. In one or more instances, narrow data Tx beams (e.g., B1*x* and B2*y*) may be sequentially transmitted in the same TTI (e.g., TTI 1). In other instances, narrow data Tx beams (e.g., B3*x* and B3*y*) may be transmitted in parallel in the same TTI (e.g., TTI3)

For the cross-TTI assignments, the control channel signaled during TTI "n" may point to DL data assignments for TTI "n+k". In this case, both the offset "k" and the narrow beam for data transmission may need to be signaled in the DCI in addition to the default information fields that may need to be carried in the DCI.

$$\in\in\in\in tf = \mod\left(\frac{UE_{ID}}{N_F}\right)$$

The above examples illustrate schemes using a single transport block (TB) per TTI. In another example, a transmission scheme may use two or more transport blocks (TBs) within a TTI.

$$\in\in\in\in tf = \mod\left(\frac{UE_{ID}}{N_F}\right)$$

Figure 12:
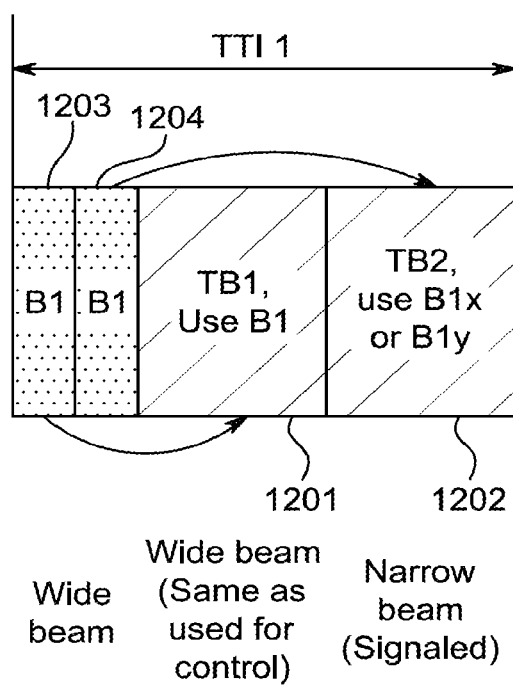
FIG. 12 shows a diagram for a dual transport block (TB) transmission scheme according to one or more embodiments.

Referring now to FIG. 12, FIG. 12 shows a diagram for a dual TB transmission scheme. Two or more transport blocks may be transmitted with a same beam as the control channel, or may be transmitted with different beams. For example, FIG. 12 illustrates two transport blocks 1201 and 1202 transmitted (multiplexed) in a TDM fashion within a single TTI (e.g., TTI1). The transmission of the individual transport blocks may use the same beam as the control channel (e.g., transport block 1201 which uses a wide beam), or may use a different beam (e.g., transport block 1202 which uses a narrow beam). In the latter case, the narrow beam ID may need to be signaled in the control region of the TTI.

$$\in\in\in\in tf = \mod\left(\frac{UE_{ID}}{N_F}\right)$$

In particular, as shown in FIG. 12, a first TB (TB1) may use the same wide beam or the same beam ID as the control channel, and a second TB (TB2) may use a narrow beam or a beam ID that is different from the beam ID used by the control channel. The beam ID for TB2 may be signal in a DCI transmitted in control data B1 that is associated with TB2. In addition, the dual TB transmission scheme shown in FIG. 12 may be used to carry out a fallback transmission, to be described in more detail below. As a fallback mechanism, data carried by TB1 may be a subset of the data carried by TB2, and TB1 may use a lower modulation and coding scheme (MCS) value than TB2.

$$\in\in\in\in tf = \mod\left(\frac{UE_{ID}}{N_F}\right)$$

In an example which the two transport blocks may be transmitted in a TDM fashion, the control channel and the DL data assignment may be in the same TTI. For example, transport block 1201 may be associated with control Tx beam 1203 and transport block 1202 may be associated with control Tx beam 1204. The first transport block may be mapped on to a first codeword provided in the control Tx beam 1203 and the second transport block may be mapped on to a second codeword provided in control Tx beam 1204. The codeword may be associated with: a specific beam or beam ID, a BRS, and/or a time/frequency location. As used herein, a codeword represents user data before it is formatted for transmission.

$$\in\in\in\in tf = \mod\left(\frac{UE_{ID}}{N_F}\right)$$

There may be a one-to-one mapping between the transport block and the codeword. The mapping rule may be fixed. For instance, the first transport block may be mapped onto the first codeword and the second transport block may be mapped onto the second codeword. Alternatively, the mapping rule may be dynamically indicated. For instance, the first transport block may be mapped onto one of the codeword according to the indication. The number of codeword(s) could be equal to or smaller than the number of the transport block(s). If a single codeword is defined, irrespective of the number of transport block, the same beam may be used. Therefore, the transport blocks within a TTI may be mapped on to a single codeword.

$$\in\in\in\in tf = \mod\left(\frac{UE_{ID}}{N_F}\right)$$

Furthermore, the first codeword (codeword #1) may be transmitted on the same wide beam as the control channel, and the second codeword (codeword #2) may be transmitted on a narrow beam. In this case, mapping of codeword #2 in the data region of the TTI may be done such that the WTRU has enough time to decode the control channel and switch its receive beam before it may start buffering and receiving the symbols corresponding to codeword #2.

$$\in\in\in\in tf = \mod\left(\frac{UE_{ID}}{N_F}\right)$$

In another example in which the two transport blocks are transmitted in a TDM fashion, the control channel and the DL data assignment may be in different TTIs. In this case, the network (e.g., mB) may include in the DCI the following information: the relative TTI offset of the DL data assignment and/or the Tx beam index (or beam ID) for both codewords. In this example, codeword #1 and codeword #2 may be mapped anywhere in the data region of the TTI (i.e., flexible mapping).

$$\in\in\in\in tf = \mod\left(\frac{UE_{ID}}{N_F}\right)$$

In an example, a normal transmission scheme in DL may use an open loop wide beam transmission with channel quality indication (CQI) only reporting for link adaptation purposes. For this scheme, the WTRU may use the BRS associated to the mB DL Tx wide beam, to perform channel estimation, receive the data channel and measure the CQI.

$$\in\in\in\in tf = \mod\left(\frac{UE_{ID}}{N_F}\right)$$

In another example, a normal Tx scheme may use closed loop narrow beam transmission. The WTRU may report, in addition to the CQI for the active beam, measurements on other detected narrow beams. For this scheme, the WTRU may use the BRS associated to the active narrow beam to perform channel estimation, receive the data channel, and report the CQI. Additionally, the WTRU may use BRS of other beams to perform and report other narrow beam measurements and report the beam ID of its preferred narrow beam.

$$\epsilon\epsilon\epsilon\epsilon\, tf = \mod\left(\frac{UE_{ID}}{N_F}\right)$$

One or more fallback transmission schemes are provided herein. The term "fallback transmission scheme" may be interchangeably used with the following: open-loop transmission scheme, coverage enhanced transmission scheme, beam diversity transmission scheme, beam sweeping transmission scheme, and transmit diversity scheme.

$$\epsilon\epsilon\epsilon\epsilon\, tf = \mod\left(\frac{UE_{ID}}{N_F}\right)$$

In one or more embodiments, a fallback transmission scheme may be defined as a transmission scheme which may not require a beam pairing process, WTRU reporting assistance for beam pairing, and/or beam ID indication for the associated data channel. One or more of following parameters may apply for fallback transmission scheme. A certain DCI format may be used for fallback transmission scheme which may not include beam ID for the associated data channel. The control channel and/or data channel may be transmitted with one or more beams. A single wide beam may be used. Two or more wide beams may be used, where the two or more wide beams may be configured for a control channel and/or a data channel transmission. Two or more narrow beams associated with a wide beam which may be used in the normal transmission configured or used.

$$\epsilon\epsilon\epsilon\epsilon\, tf = \mod\left(\frac{UE_{ID}}{N_F}\right)$$

The control channel and/or data channel may be transmitted with repetitions. Two or more TTIs may be used for repetitions. A different beam may be used in each TTI. The beam ID in each TTI may be predefined or configured by higher layer signaling. Alternatively, the beam ID in each TTI may be determined as a function of the subframe number and/or SFN. The number of repetition of the fallback transmission scheme may be determined by one or more of following: configuration via higher layer signaling and/or broadcasting channel, a function of number of wide beams and/or number of narrow beams, an indication from the associated DCI, the time/frequency resource used during random access procedure, and/or system parameters.

$$\epsilon\epsilon\epsilon\epsilon\, tf = \mod\left(\frac{UE_{ID}}{N_F}\right)$$

In another example, a fallback transmission scheme may be defined as a transmission scheme which may be transmitted in a subset of the TTIs. A subset of TTIs may be defined or configured for the fallback transmission. A subset of TTIs may be defined or configured to monitor control channel associated with a fallback transmission. The subset of TTIs may be configured via higher layer signaling. The subset of TTIs may be determined as a function of the wide beam index associated with the control channel which is used for normal transmission. The subset of TTIs may be determined as a function of one or more of system parameters including physical cell ID, SFN number, and/or system bandwidth.

$$\epsilon\epsilon\epsilon\epsilon\, tf = \mod\left(\frac{UE_{ID}}{N_F}\right)$$

There may be a BRS association for normal and fallback transmission schemes. Each of two or more BRSs may be defined with a BRS index associated with a beam. The BRS index may be defined according to the beam width. In an example, a BRS index associated with wide beam may be defined as W_x, where x {1, 2, . . . , N}, and a BRS index associated with narrow beam may be defined as N_y, where y {1, 2, . . . , M}. N wide beams and M narrow beams are used in the system with a BRS index. A WTRU may determine an associated receiver beam for each BRS index. The wide beams and the narrow beams may be independently defined. Alternatively, a wide beam may be associated with two or more narrow beams.

$$\epsilon\epsilon\epsilon\epsilon\, tf = \mod\left(\frac{UE_{ID}}{N_F}\right)$$

In another example, the BRS index may be defined in a hierarchical manner. For example, B_x, where x {1, 2, . . . , N} may be defined as BRS index associated with a wide beam and each wide beam may be associated with two or more narrow beams B_xy, where y {1, 2, . . . , M}. Each wide beam may have two or more associated narrow beams. The number of narrow beam may be different according to the wide beam index.

$$\epsilon\epsilon\epsilon\epsilon\, tf = \mod\left(\frac{UE_{ID}}{N_F}\right)$$

According to the BRS index used, a WTRU may determine a receive beam to receive the signal and perform signal reception procedures. For example, the WTRU may form a receiver beam in analog, digital, or hybrid domain to receive the signal and buffer the signals before it starts demodulation.

$$\epsilon\epsilon\epsilon\epsilon\, tf = \mod\left(\frac{UE_{ID}}{N_F}\right)$$

In one or more embodiments, a first BRS index may be used to monitor and/or receive a control channel and a second BRS index may be used to receive an associated data channel. One or more of following parameters may apply.

$$\epsilon\epsilon\epsilon\epsilon\, tf = \mod\left(\frac{UE_{ID}}{N_F}\right)$$

The first BRS index may be associated with a wide beam and the second BRS index may be associated with a narrow beam. The first BRS index may be one of the beam indexes of wide beams. The second BRS index may be a narrow beam index associated with the first BRS index. For example, if the first BRS index is B_x, the narrow beam index may be B_xy, where the x is the same for both first BRS index and the second BRS index.

$$\epsilon\epsilon\epsilon\epsilon\, tf = \mod\left(\frac{UE_{ID}}{N_F}\right)$$

The first BRS index may be determined during random access procedures and the second BRS index may be determined by a transmitter (e.g., a mB). For example, the first BRS index may be determined as a function of the PRACH resource used and the second BRS index may be indicated in the associated DCI.

$$\epsilon\epsilon\epsilon\epsilon\, tf = \mod\left(\frac{UE_{ID}}{N_F}\right)$$

The first BRS index may be determined during initial access procedures including cell selection/reselection procedures. The first BRS index may be determined as a function of the physical cell ID. The first BRS index may be determined based on the downlink measurement which may be used for cell selection/reselection. The first BRS index may be determined based on the time location of the synchronization signal received.

$$\epsilon\epsilon\epsilon\epsilon\, tf = \mod\left(\frac{UE_{ID}}{N_F}\right)$$

In one or more embodiments, a first BRS index may be used to monitor and/or receive a first type of control channel and a second BRS index may be used to monitor and/or receive a second type of control channel. One or more of following parameters may apply. The first BRS index and the second BRS index may be associated with a wide beam. The first BRS index may be associated with a wide beam and the second BRS index may be associated with a narrow beam. The second BRS index may be one of the narrow beams associated with the first BRS index. The second BRS index may be one of the narrow beams which may be independent from the wide beam index.

$$\epsilon\epsilon\epsilon\epsilon\, tf = \mod\left(\frac{UE_{ID}}{N_F}\right)$$

The first type of control channel may be a broadcasting/multi-casting channel and the second type of control channel may be a WTRU-specific control channel. For example, the first type of control channel may be defined as a common search space and the second type of the control channel may be defined as a WTRU-specific search space. A WTRU may monitor the first type of control channel in a common search space to receive a multi-casting and broadcasting channels including system information, group power control, paging, and MBMS. A WTRU may monitor the second type of control channel in a WTRU-specific search space to receive unicast traffic.

$$\epsilon\epsilon\epsilon\epsilon\, tf = \mod\left(\frac{UE_{ID}}{N_F}\right)$$

In one or more embodiments, the WTRU and the mB may operate using multiple transmission schemes. For example, both wide beams and narrow beams may be used in a first transmission scheme and wide beams may be only used in a second transmission scheme. One or more of following parameters may apply. The first transmission scheme may be a normal transmission scheme and the second transmission may be a fallback transmission scheme.

$$\epsilon\epsilon\epsilon\epsilon\, tf = \mod(\frac{UE_{ID}}{N_F})$$

The first transmission scheme may use one beam for a single transmission while the second transmission scheme may use beams available for a single transmission. The single transmission may be a control channel transmission or a data channel transmission. The single transmission may be a single transport block transmission for the data channel. In case of the control channel, the single transmission may be a single DCI transmission. The second transmission scheme may use beams available with repetitions. For example, N repetitions may be used with N beams. Therefore, one BRS index associated with a repetition transmission and all BRS indices are used with N repetitions, where N wide beams may be used in the system.

$$\epsilon\epsilon\epsilon\epsilon\, tf = \mod(\frac{UE_{ID}}{N_F})$$

The first transmission scheme may use the BRS index indicated from a transmitter while the second transmission scheme may use a predefined BRS index. The predefined BRS index may be determined by one or more of following: a fixed number, a predefined sequence, a subframe number and/or frame number, time/frequency location, a WTRU ID, and/or system parameters.

$$\epsilon\epsilon\epsilon\epsilon\, tf = \mod(\frac{UE_{ID}}{N_F})$$

In one or more embodiments, a WTRU may report downlink reference signal received power (e.g., RSRP) for one or more BRS in order to provide physical layer (i.e., layer 1 (L1)) measurement and CSI feedback. For example, a hierarchical BRS structure may be used, wherein N wide beams may be used with M narrow beams for each N wide beams. It should be noted that the terms reference signal received power, downlink pathloss, pathloss, channel quality indicator, wideband channel quality indicator, RSRP and downlink measurement may be used interchangeably.

$$\epsilon\epsilon\epsilon\epsilon\, tf = \mod(\frac{UE_{ID}}{N_F})$$

One or more of following parameters may apply for the downlink measurement reporting. A downlink measurement may be reported for the currently configured or used wide beam. A downlink measurement may be reported for a subset of N wide beams wherein the subset may be determined based on currently configured or used wide beam. For example, adjacent wide beams of the currently configured or used wide beam may be determined as the subset. The downlink measurement reporting for a subset of N wide beams may include individual downlink measurement value for each wide beam within the subset. The downlink measurement reporting for a subset of N wide beams may include an index of the wide beam within the subset of N wide beams, which may provide the highest value and its associated downlink measurement value.

$$\in\in\in\in tf = \mod(\frac{UE_{ID}}{N_F})$$

A downlink measurement may be reported for all N wide beams configured by mB. A WTRU may report one downlink measurement for a wide beam at a time. A reporting cycle (e.g., duty cycle) may be determined or configured for each wide beam. Therefore, each wide beam may have a same or a different reporting cycle. A time offset (e.g., TTIs) may be used for downlink measurement reporting for each wide beam.

$$\in\in\in\in tf = \mod(\frac{UE_{ID}}{N_F})$$

In one or more embodiments, a WTRU may send a beam pairing, or beam re-pairing, request to a mB. For example, if a currently configured or used downlink transmit beam is below a predefined threshold, the WTRU may send a request of beam pairing between transmit and receive beams. The beam pairing request information may be transmitted in a higher layer configured uplink control resource. The higher layer configured uplink control resource may be the same as the uplink control resource configured for scheduling request. The beam pairing request information may be interchangeably used by a fallback transmission request.

$$\in\in\in\in tf = \mod(\frac{UE_{ID}}{N_F})$$

The following provides a description of DL/UL transmission modes and modes of operation. In the current 3GPP specifications, the transmission modes may only be applicable to a downlink shared channel (DL-SCH) transmission, and may define the single or multi antenna transmission scheme, the specific antenna mapping, the reference symbols used for demodulation (e.g., CRS or DM-RS), and the associated CSI feedback. For systems operating at frequencies above 6 GHz, there may be a need to expand the concept of transmission mode to address aspects of the propagation channel specific to the use of directional antennas (i.e., narrow and wide beams), such as: effects of change in the WTRU orientation, blocking effects, delay and angle spread, and so on.

$$\in\in\in\in tf = \mod(\frac{UE_{ID}}{N_F})$$

One or more transmission modes may be used in a system and a transmission mode may use one or more transmission schemes. A WTRU may be configured with a transmission mode in a semi-static manner and the transmission schemes used within a transmission mode may be switched dynamically (e.g., according to a dynamic switching transmission mode). A transmission mode may be configured via higher layer signaling. A transmission mode may be determined as a function of at least one of the number of antenna ports, WTRU capability, and system parameters. A transmission mode may be determined based on the beamforming capability of a WTRU which may include the number of RF chains, number of receive beams, and/or beam switching time.

$$\in\in\in\in tf = \mod(\frac{UE_{ID}}{N_F})$$

For example, a transmission mode may use two transmission schemes where a normal transmission scheme and a fallback transmission scheme may be used. One or more of following parameters may apply. Within a transmission mode, a transmission scheme used in a TTI may be determined by a DCI format received in the control region. A first transmission scheme may be used if a first DCI format (e.g., DCI format-A) is received in the control region and a second transmission scheme may be used if a second DCI format (e.g., DCI format-B) is received in the control region. The first transmission scheme may be a normal transmission scheme and the second transmission scheme may be a fallback transmission scheme.

$$\in\in\in\in tf = \mod(\frac{UE_{ID}}{N_F})$$

The transmission scheme used in the TTI may be determined by a TTI type associated with a transmission. Each TTI may be associated with a transmission among the transmission schemes associated with the transmission mode. Therefore, the transmission scheme may be determined as a function of the subframe number and/or frame number.

$$\in\in\in\in tf = \mod(\frac{UE_{ID}}{N_F})$$

The transmission scheme used in the TTI may be determined by a search space of the control channel. The control channel monitored by WTRU may be split into multiple subsets and each subset may be associated with a certain transmission scheme.

$$\in\in\in\in tf = \mod(\frac{UE_{ID}}{N_F})$$

The transmission scheme used in the TTI may be determined by an indication in the DCI.

$$\in\in\in\in tf = \mod(\frac{UE_{ID}}{N_F})$$

A WTRU may monitor a control channel according to a first transmission scheme in all TTIs, while the WTRU may monitor a control channel according to a second transmission scheme in a subset of TTIs. The first transmission scheme may be a normal transmission scheme and the second transmission scheme may be a fallback transmission scheme. A WTRU may monitor the control channel for the second transmission scheme if one or more of the following applies: the WTRU is not scheduled for a certain number of consecutive TTIs, the WTRU sends a certain number of consecutive negative ACK corresponding to downlink transmissions, or a downlink measurement is below a predefined threshold.

$$\epsilon\epsilon\epsilon\epsilon \; tf = \mathrm{mod}(\frac{UE_{ID}}{N_F})$$

A WTRU receiver may use a narrow beam in the first transmission scheme and the WTRU may use a wide beam in the second transmission.

$$\epsilon\epsilon\epsilon\epsilon \; tf = \mathrm{mod}(\frac{UE_{ID}}{N_F})$$

A WTRU receiver may use a beam ID indicated in the associated control channel to receive the corresponding data channel for the first transmission scheme, and the WTRU may use a predefined beam to receive the corresponding data channel for the second transmission scheme. The predefined receiver beam for the second transmission scheme may be the same receiver beam used for the associated control channel. Alternatively, a sequence of beams may be predefined.

$$\epsilon\epsilon\epsilon\epsilon \; tf = \mathrm{mod}\left(\frac{UE_{ID}}{N_F}\right)$$

The following embodiments may include switching (in a semi-static or dynamic fashion) between fallback and normal transmission schemes and may address the following aspects: DCI and UE monitoring behavior, and WTRU behavior for switching between fallback and normal transmission schemes.

$$\epsilon\epsilon\epsilon\epsilon \; tf = \mathrm{mod}\left(\frac{UE_{ID}}{N_F}\right)$$

In one of more embodiments, it may be assumed that the WTRU may be connected to the mB via a narrow beam pair for the DL and UL data, and that the mB may use a wide beam for the DL control channel transmission. Thus, an operation with data fallback to a wide beam is described such that, as the orientation of the WTRU may change, the paired narrow beams used for data transmission may become misaligned, and the data link may experience a sudden and significant drop in signal-to-noise ratio (SNR). If the change in the WTRU orientation does not exceed a certain value, the DL control channel transmissions using wide beams may still be received by the WTRU. This scenario may trigger the mB to dynamically switch the WTRU to a data fallback scheme that uses the same wide beam as for the DL control channel. The data fallback scheme may allow the WTRU to maintain connection using the current transmission mode, while the mB may perform a RRC reconfiguration of the transmission mode until the mB may perform a beam switch, or until the operating SNR using the current transmission mode may improve.

$$\epsilon\epsilon\epsilon\epsilon \; tf = \mathrm{mod}\left(\frac{UE_{ID}}{N_F}\right)$$

The following embodiments may address triggers that initiate the mB to use the data fallback, how the DL data fallback scheme is signaled to the WTRU, and how the WTRU data fallback scheme is signaled to the WTRU.

$$\epsilon\epsilon\epsilon\epsilon \; tf = \mathrm{mod}\left(\frac{UE_{ID}}{N_F}\right)$$

In one or more embodiments, signaling the DL data fallback to wide beam is described such that the mB may use the same wide beam as used for the control channel for the transmission of the DL fallback data. One or more of following parameters may apply. The WTRU may need to switch its receive beam for data to the beam used to receive the control channel. If control and fallback data are scheduled in the same TTI, a guard time may be needed between the control and the data regions of the TTI, as shown in FIG. 10. The fallback data may be scheduled for a subsequent TTI. The offset of the TTI carrying fallback data may be signaled in the DCI, may be pre-defined, or may be semi-statically configured.

$$\epsilon\epsilon\epsilon\epsilon \; tf = \mathrm{mod}\left(\frac{UE_{ID}}{N_F}\right)$$

A different DCI format may be used for fallback and normal transmission. For example, DCI-A may be used for normal transmission and DCI-B may be used for fallback transmissions. In the embodiment described above, the use of fallback DCI (DCI-B) may implicitly indicate the fallback data is transmitted on the same wide beam as the control. In this case, the fallback DCI may not include the BRS and beam ID.

$$\epsilon\epsilon\epsilon\epsilon \; tf = \mathrm{mod}\left(\frac{UE_{ID}}{N_F}\right)$$

In another embodiment, the fallback DCI may explicitly indicate the data fallback beam. The fallback DCI may include at least one of the following pieces of information: BRS, beam ID, and the offset (in TTIs) of the DL data assignment. The fallback DCI may also include the preferred WTRU transmit beam for UL data fallback.

$$\epsilon\epsilon\epsilon\epsilon \; tf = \mathrm{mod}\left(\frac{UE_{ID}}{N_F}\right)$$

In another embodiment, the data fallback beam may be determined implicitly during the reception of the associated control channel. For example, a WTRU may perform a blind decoding of the associated control channel with one or more BRS candidates. The WTRU may determine one BRS for the associated control channel decoding. Based on the determined BRS for the associated control channel, the WTRU may determine the data fallback beam. In another example, a WTRU may perform a blind decoding of the associated control channel with one or more control channel candidates. The WTRU may determine the control fallback beam as a function of the control channel candidate. Based on the determined control fallback beam, the WTRU may determine the data fallback beam.

$$\in\in\in\in tf = \mod\left(\frac{UE_{ID}}{N_F}\right)$$

A WTRU may monitor for both a first DCI format (e.g. DCI-A) and a second DCI format (e.g., DCI-B) in each TTI. Alternatively, the WTRU may monitor for DCI-B only in configured TTIs. The use of DCI-A versus DCI-B may implicitly indicate a different timing rule for the associated data channel reception. In one example, the data channel associated to DCI-A may be transmitted in TTI n+k1 for a DCI-A signaled in TTI n, while the fallback data channel associated to DCI-B may be transmitted in TTI n+k2 for a DCI-B signaled in TTI n. The offset values k1 and k2 may be either explicitly included in the DCI, or the offset of the fallback data, k2, may be implicitly derived from the fallback DCI-B type.

$$\in\in\in\in tf = \mod\left(\frac{UE_{ID}}{N_F}\right)$$

Upon the detection of the fallback DCI-B on the control wide beam in TTI #n, the WTRU may configure its receive beam for DL data in TTI #n+k2, where k2 may be explicitly signaled in DCI-B or implicitly derived from the fallback DCI-B type. This may be done using the appropriate BRS, which may be either the same BRS as used for the wide beam control, or determined based on the beam ID that may be signaled in DCI-B.

$$\in\in\in\in tf = \mod\left(\frac{UE_{ID}}{N_F}\right)$$

Additionally, the WTRU may transmit the UL Acknowledgment-Negative Acknowledgment (A/N) feedback using an UL beam that has the same orientation as the DL beam used for the data fallback reception. The timing for the transmission of the UL A/N feedback may be determined implicitly based on the TTI index (n+k2) of the fallback data transmission. For example, the UL A/N corresponding to the DL fallback data on TTI #N+k2 may be transmitted in TTI #N+k2+m. During TTI #N+k2+m, the mB may monitor the WTRU UL A/N feedback using an UL Rx beam with the same orientation as the DL Tx beam used for DL data fallback transmission during TTI #n+k2.

$$\in\in\in\in tf = \mod\left(\frac{UE_{ID}}{N_F}\right)$$

In an embodiment, a mB may indicate a fallback for UL data transmission. The fallback for UL data transmission may have at least one of the following parameters. First, a predefined wide beam may be used for uplink transmission. The predefined wide beam may be based on the beam used for UL control. The predefined wide beam may be a beam index. Second, a wider beam, which may be associated with the most recent narrow beam, may be used. For example, a wider beam may consist of one or more narrow beams that may be used for normal UL data transmission, and if a fallback UL transmission is triggered or indicated, the wider beam may be used for the UL fallback data transmission. Third, repetitions of the UL data transmission may be used. Fourth, the UL data transmission may be within a narrower bandwidth. Fifth, a higher transmission power may be used.

$$\in\in\in\in tf = \mod\left(\frac{UE_{ID}}{N_F}\right)$$

In an embodiment, the indication of a fallback UL data transmission may be transmitted in a DCI. For example, a reserved bit in a DCI, which may be used for uplink grant, may be used to indicate a fallback UL data transmission. In another example, a fallback DCI may be used and a WTRU may monitor for the fallback DCI as well as for a normal DCI for normal UL data transmission (e.g., normal DCI). One or more of the following parameters may apply.

$$\in\in\in\in tf = \mod\left(\frac{UE_{ID}}{N_F}\right)$$

The fallback DCI may be monitored for in a subset of resources in which a WTRU may monitor for normal DCI. For example, if a WTRU monitors for normal DCI in every TTI, the WTRU may monitor for the fallback DCI in a subset of TTIs. A WTRU may monitor for both normal DCI and fallback DCI in a TTI, which may be a subset of TTIs determined for the fallback DCI.

$$\in\in\in\in tf = \mod\left(\frac{UE_{ID}}{N_F}\right)$$

The fallback DCI and the normal DCI may be monitored in a disjoint set of TTIs. For example, a first set of TTIs may be used for normal DCI and a second set of TTIs may be used for fallback DCI, and there may be no overlap between the first set and the second set. The first set of TTIs may be larger than the second set of TTIs. A transmission scheme for the associated UL data transmission may be different for the first set of TTIs and the second set of TTIs.

$$\in\in\in\in tf = \mod\left(\frac{UE_{ID}}{N_F}\right)$$

A fallback DCI may be received over multiple TTIs while a normal DCI may be received within a single TTI. For example, the fallback DCI may be transmitted with repetitions with multiple (e.g., consecutive) TTIs, while the normal DCI may be transmitted within a TTI.

$$\in\in\in\in tf = \mod\left(\frac{UE_{ID}}{N_F}\right)$$

When the fallback DCI is transmitted with repetitions, at least one of following parameters may apply. A different transmit beam (e.g., beam ID) may be used for each repetition. For example, if the number of repetitions (i.e., number of TTIs) is N, the transmit beam may change in each repetition. Therefore, N transmit beams may be used for a single fallback DCI transmission. If a total number of transmit beams at a transmitter is M and M is smaller than N, the M transmit beams may be cyclically used with N repetitions. Therefore, M transmit beams may be used for a single fallback DCI transmission with N repetitions. If a different transmit beam (e.g., beam ID) may be used for each repetition, a corresponding receiver beam may be used at a receiver.

$$\epsilon\epsilon\epsilon\epsilon \, tf = \mod\left(\frac{UE_{ID}}{N_F}\right)$$

The embodiments described herein may be used for the DCI that is used for normal and fallback downlink data transmissions, although an uplink transmission beam may be replaced by a downlink receiver beam and still be consistent with the embodiments.

$$\epsilon\epsilon\epsilon\epsilon \, tf = \mod\left(\frac{UE_{ID}}{N_F}\right)$$

In one or more embodiments, the dual TB transmission scheme described above (see e.g., FIG. 12) may be used as a fallback transmission while operating in the dynamic switching transmission mode. Thus, an operation with dual TB based fallback Tx scheme is provided. As used herein, transport block and codeword may be used interchangeably.

$$\epsilon\epsilon\epsilon\epsilon \, tf = \mod\left(\frac{UE_{ID}}{N_F}\right)$$

When the mB detects that a particular WTRU needs data fallback, it may partition the transmission of the next transport block (MAC PDU) into two physical layer code words, which may be transmitted on a single spatial layer, in a TDM fashion within the TTI. The first codeword may use the same wide beam as the control channel, while the second codeword may use a narrow beam, with the beam ID or the beam index signaled by the mB in the DCI (see e.g., FIG. 12).

$$\epsilon\epsilon\epsilon\epsilon \, tf = \mod\left(\frac{UE_{ID}}{N_F}\right)$$

In an embodiment, the first codeword may use a robust coding and modulation scheme, and the data carried in the first codeword may be a subset of the data in the second codeword (current MAC PDU being transmitted). The WTRU may use the data that is correctly decoded in the first codeword to decode the second codeword.

$$\epsilon\epsilon\epsilon\epsilon \, tf = \mod\left(\frac{UE_{ID}}{N_F}\right)$$

Figure 13:
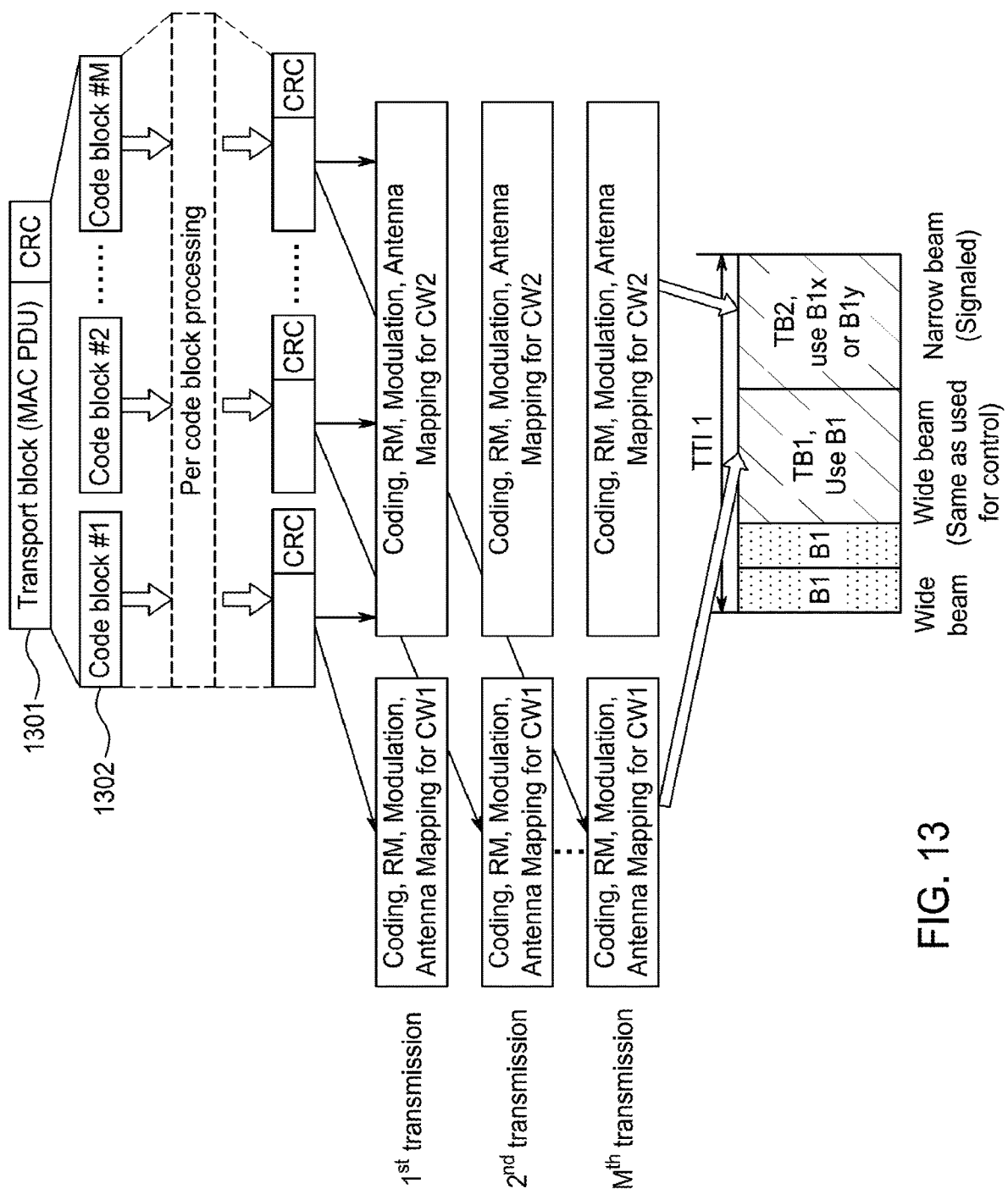
FIG. 13 shows a diagram illustrating a use of a dual TB transmission scheme for data fallback according to one or more embodiments.

Referring now to FIG. 13, FIG. 13 shows a diagram illustrating using a dual TB transmission scheme for data fallback. In an embodiment according to FIG. 13, the size of a MAC PDU 1301 to be transmitted may exceed a max Turbo coder block size and code block segmentation with M code blocks 1302 may be used. In this scenario, in a first transmission, the data transmitted by the first codeword may be a full code block of the MAC PDU carried in the second codeword, as illustrated in FIG. 13. The next (e.g., second) transmission of fallback data using this scheme may transmit, in the first codeword, the next code block of the current MAC PDU, and may re-transmit the full MAC PDU in the second codeword. This transmission scheme may continue (e.g., for M transmissions) until the WTRU correctly decodes the MAC PDU and the mB receives an ACK for the current MAC PDU transmission. The A/N signaling for this scheme will be described in more detail below. Thus, a wide data Tx beam B1 may be used for transmitting TB1 (i.e., first codeword) of a transmission and a narrow data Tx beam B1x or B1y may be used for transmitting TB2 (i.e., second codeword).

$$\epsilon\epsilon\epsilon\epsilon \, tf = \mod\left(\frac{UE_{ID}}{N_F}\right)$$

Figure 14:
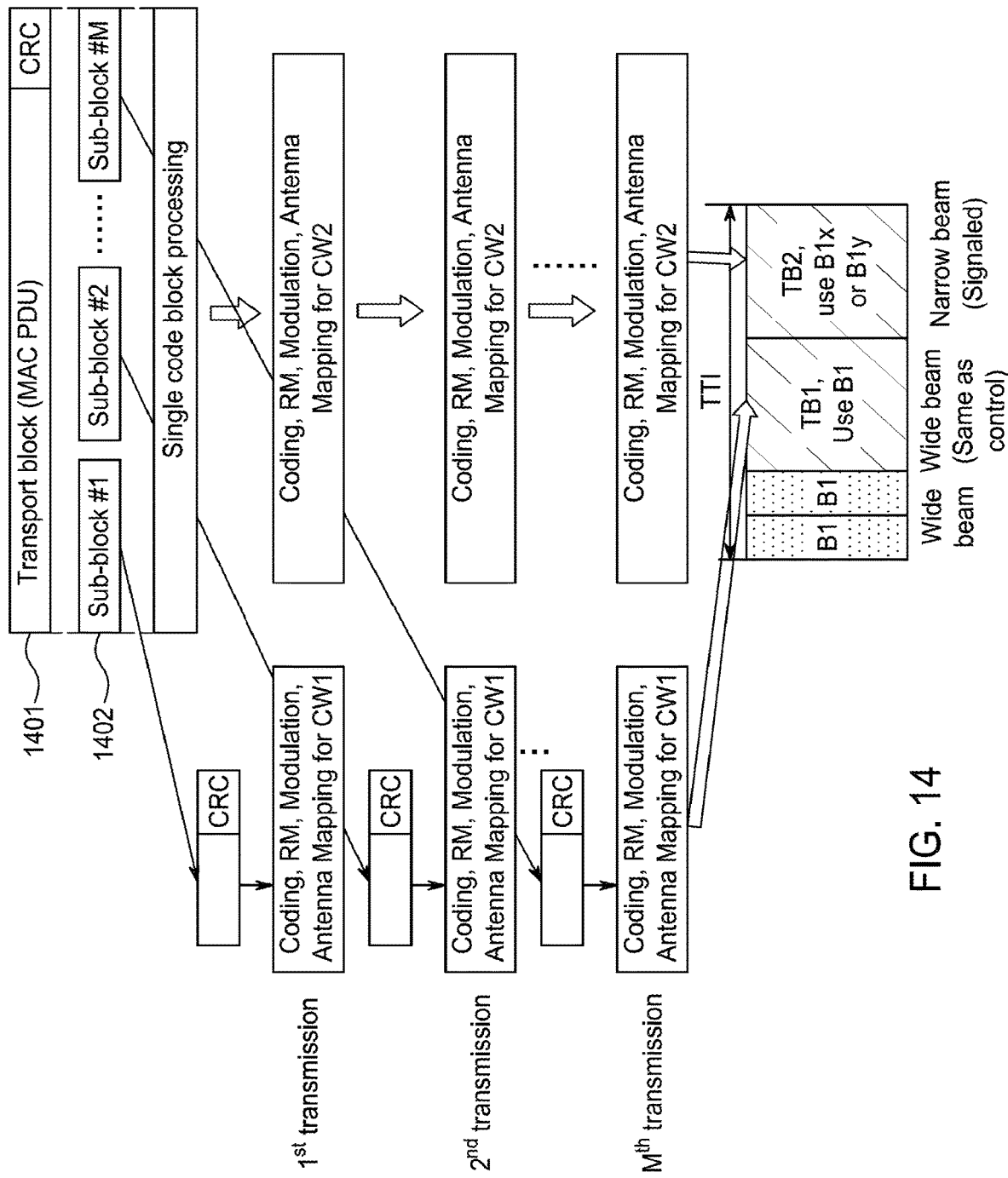
FIG. 14 shows a diagram illustrating another example of using a dual TB transmission scheme for data fallback according to one or more embodiments.

Referring now to FIG. 14, FIG. 14 shows a diagram illustrating another example of using the dual TB transmission scheme for data fallback. In an embodiment according to FIG. 14, if a size of the MAC PDU does not exceed the max Turbo coder block size, the MAC PDU 1401 may be partitioned in M sub-blocks 1402. The first codeword may be used for sequential transmission of independently coded sub-blocks and the second codeword may be used for the transmission (and re-transmission) of the entire MAC PDU, as shown in FIG. 14. For example, for the first transmission of the fallback data, codeword #1 may transmit sub-block #1 of the MAC PDU, and codeword #2 may transmit the entire MAC PDU. For the first re-transmission (e.g., second transmission) of the fallback data, codeword #1 may carry sub-block #2, and codeword #2 may carry the full MAC PDU. The process may continue for a next transmission (e.g., third transmission) until the WTRU ACKs codeword #2. Thus, a wide data Tx beam B1 may be used for transmitting TB1 (i.e., first codeword) of a transmission and a narrow data Tx beam B1x or B1y may be used for transmitting TB2 (i.e., second codeword).

$$\epsilon\epsilon\epsilon\epsilon \, tf = \mod\left(\frac{UE_{ID}}{N_F}\right)$$

DL assignment for the dual TB transmission may be provided such that the dual TB transmission may be used as a normal transmission scheme, or as a fallback scheme. The DCI for the dual TB transmission scheme may include the default information: resource assignment information for each codeword (e.g., resource block allocation), HARQ process number, transport block information (modulation and coding scheme (MCS), redundancy version (RV), new data indicator (NDI), etc.), antenna configuration (as needed), DAI, power control indicator, and other flags as needed. Additionally, the DCI may include beam ID or beam index for each TB. In one or more embodiments, the beam ID or beam index of the first codeword may implicitly be set to the beam ID or beam index used for the control channel transmission, and thus it may not be included in the DCI.

$$\epsilon\epsilon\epsilon\epsilon \, tf = \mod\left(\frac{UE_{ID}}{N_F}\right)$$

As the segmentation of the MAC PDU may be different for the fallback scheme as compared to the normal scheme, the segmentation configuration may be signaled to the WTRU. The type of segmentation may be indicated in the DCI, or may be included in the MAC header. For the case where the type of segmentation is included in the DCI, the DCI format for the dual TB scheme used for fallback may be different from the DCI format for the dual TB scheme used for normal transmission.

$$\epsilon\epsilon\epsilon\epsilon\, tf = \mathrm{mod}\left(\frac{UE_{ID}}{N_F}\right)$$

In one example, for the data fallback transmission, the DCI may include the following: a field indicating that a single MAC PDU is transmitted using the 2 CW scheme, a field indicating the number M of sub-blocks (or code blocks) the MAC PDU is partitioned in for mapping to codeword #1 (see e.g., FIG. 13 and FIG. 14), and the index (in the range 1 to M) of the sub-block (or code block) transmitted in the current TTI. The maximum value of M may be pre-defined. The choice for the maximum value of M may be a trade-off between the maximum transport block size to be transmitted with the fallback scheme, and the maximum number of TTIs the MAC PDU may be transmitted due to sub-block or code-block partitioning for transmission on codeword #1.

$$\epsilon\epsilon\epsilon\epsilon\, tf = \mathrm{mod}\left(\frac{UE_{ID}}{N_F}\right)$$

The dual TB transmission scheme may be used in all TTIs, or may be used in configured TTIs. When the scheme is used in all TTIs, the WTRU may need to monitor the normal DCI as well as the fallback DCI in all TTIs. When the scheme is used in configured TTIs, the WTRU may monitor the normal DCI and the fallback DCI during the configured TTIs, and may monitor the normal DCI only for the rest of the TTIs.

$$\epsilon\epsilon\epsilon\epsilon\, tf = \mathrm{mod}\left(\frac{UE_{ID}}{N_F}\right)$$

In one or more embodiments, HARQ retransmissions may be used when using the dual TB scheme. For example, when the dual TB scheme is used for fallback data, the mB may transmit in the first codeword, consecutive code blocks (or sub-blocks) of the original MAC PDU (as shown in FIG. 13 and FIG. 14). The WTRU may only transmit UL A/N signals for the second codeword. The mB may sequentially transmit code block (or sub-block) index 1, 2, . . . M of the current MAC PDU on codeword #1 and the full MAC PDU on codeword #2. This may be done until the WTRU correctly decodes the MAC PDU on codeword #2. Due to HARQ processing latencies, and depending on how the DL fallback data transmissions are scheduled, it may happen that the mB transmits code block (or sub-block) k+1 after the WTRU has ACK-ed the MAC PDU after receiving code block (or sub-block) k. In this case, the WTRU may discard all the subsequent received buffers for the current MAC PDU.

$$\epsilon\epsilon\epsilon\epsilon\, tf = \mathrm{mod}\left(\frac{UE_{ID}}{N_F}\right)$$

In another embodiment, when the dual TB scheme is used for normal data transmission, the WTRU may transmit UL A/N signals for each codeword. In this case, if the WTRU correctly decodes codeword #1, but not codeword #2, the WTRU may send an ACK for codeword #1 and a NACK for codeword #2. When the mB receives an ACK for codeword #1 and a NACK for codeword #2, for the next transmission to the WTRU, the mB may transmit the next code block (or sub-block) of the sequence in codeword #1, and re-transmit the entire MAC PDU in codeword #2.

$$\epsilon\epsilon\epsilon\epsilon\, tf = \mathrm{mod}\left(\frac{UE_{ID}}{N_F}\right)$$

A control channel fallback operation is described such that fallback TTIs may be pre-defined TTIs within sub-frames, which may be used by the mB to transmit the control channel on multiple wide beams (i.e., perform wide beam sweeping) to WTRUs that may need control fallback. For example, for cases where the WTRU may change its orientation, or when blockage of an active beam pair may occur, the mB may determine the need to use a fallback transmission scheme for the control channel and the data channel of a specific WTRU. In this case, during the fallback TTIs, the mB may repeat the transmission of the control channel on several spatial beams, to enable the WTRU to correctly receive the control channel in one or more beams. The one or more beams may be different from the original active beam of the active beam pair. The mB may use a fallback DCI (e.g., DCI-B) to transmit the fallback control channel during the fallback TTIs.

$$\epsilon\epsilon\epsilon\epsilon\, tf = \mathrm{mod}\left(\frac{UE_{ID}}{N_F}\right)$$

To make efficient use of the spectrum resources, the fallback TTIs may be used for regular transmissions when fallback schemes are not used. Thus, the mB may use fallback schemes only if the mB determines it needs to. In this case, the mB may use normal DCI (e.g., DCI-A) for the control channel transmissions. During fallback TTIs, the WTRU may monitor for both the normal DCI (e.g., DCI-A) and the fallback DCI (e.g., DCI-B).

$$\epsilon\epsilon\epsilon\epsilon\, tf = \mathrm{mod}\left(\frac{UE_{ID}}{N_F}\right)$$

In one or more embodiments, when the mB determines the need for control fallback for a WTRU, it may use the same reference signal (BRS) for all control beams that it re-transmits to the WTRU. In this case, the WTRU may need knowledge of the number of repetitions of the control channel, as well as of the time and frequency resources that may be assigned to the fallback TTI. Accordingly, the WTRU may monitor the fallback TTIs using the same reference signals (BRS) as used for the normal transmission scheme.

$$\epsilon\epsilon\epsilon\epsilon\, tf = \mathrm{mod}\left(\frac{UE_{ID}}{N_F}\right)$$

In another embodiment, the mB may use different BRSs for each beam, which may enable the WTRU to perform beam measurements. In this case, a mapping of the mB Tx beam ID (or beam index, or BRS) to time-frequency resources within the fallback TTIs may need to be known at the WTRU. This mapping may be either cell-specific (in which case, it may be signaled on broadcast), or WTRU specific, which may be configured via RRC signaling.

$$tf = \mod\left(\frac{UE_{ID}}{N_F}\right)$$

Mapping of Tx beam for fallback DCI to resources (TTI/OFDM symbol) is provided according to one or more embodiments. As previously indicated, the first element that enables the control channel fallback operation may be the provisioning of fallback TTIs. The fallback TTIs may be either cell specific or WTRU specific.

$$tf = \mod\left(\frac{UE_{ID}}{N_F}\right)$$

In addition to provisioning the fallback TTIs, the WTRU may need to be able to find and decode the fallback control channel within the fallback TTIs. Therefore, a mapping between the mB transmit beam and the resources used for the fallback control channel may need to be defined. The mapping may be cell specific or WTRU specific and may be signaled to the WTRU via broadcast signals or RRC signaling. The signaling may include information on the number of Tx wide beams supported by the mB, the number of fallback TTIs per sub-frame, the length of the control region in the fallback TTIs.

$$tf = \mod\left(\frac{UE_{ID}}{N_F}\right)$$

In one or more mapping embodiments, the number of mB Tx wide beams is denoted by Nwb, the size (in OFDM symbols) of the control region within a TTI is denoted by Lc, and the number of fallback TTIs per sub-frame is denoted by Nf. The mapping may be static, and pre-defined, as follows.

$$tf = \mod\left(\frac{UE_{ID}}{N_F}\right)$$

The sub-frame pattern periodicity, T, may be determined as the ratio between the number of mB wide beams (Nwb) and the number of OFDM symbols per sub-frame that may be used for fallback control signaling ($L_c N_f$).

$$tf = \mod\left(\frac{UE_{ID}}{N_F}\right)$$

The index of the fallback TTI ($t_f$) within a sub-frame may be fixed (pre-defined), or it may be WTRU specific. If the index of the fallback TTI is WTRU specific, in one example, the index may be set as: If more than one fallback TTIs per sub-frame are assigned to a WTRU, the index of the first fallback TTI may be calculated as indicated above. The indices of the subsequent fallback TTIs in the sub-frame may be at a fixed offset (pre-defined or signaled) with respect to the first fallback TTI.

$$tf = \mod\left(\frac{UE_{ID}}{N_F}\right)$$

The mapping between the mB Tx wide beam b, ($0 \leq b \leq N_{wb}-1$), the fallback TTI index n, ($0 \leq n \leq N_f-1$) within sub-frame k, ($0 \leq k \leq T-1$), and the OFDM symbol index (I), may be expressed as: $b = k\, N_f\, L_c + n\, L_c + I$.

$$tf = \mod\left(\frac{UE_{ID}}{N_F}\right)$$

Figure 15:
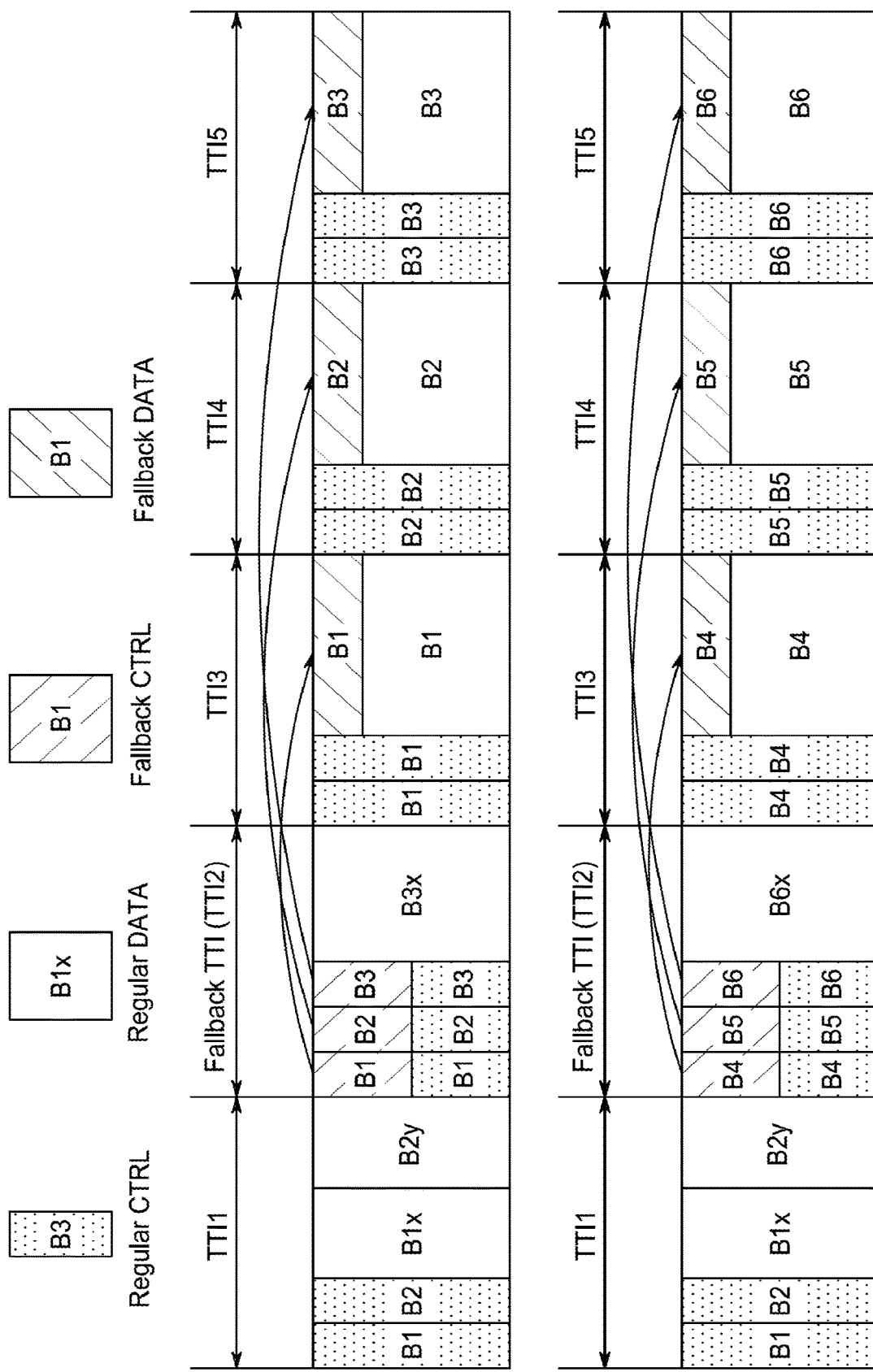
FIG. 15 shows a diagram illustrating an example of fallback TTI and linkage between fallback downlink control information (DCI) and fallback data, where the mB supports one RF chain according to one or more embodiments.

In this example, the mB would transmit the fallback DCI on wide beam index b in sub-frame k, fallback TTI index n within sub-frame k, and OFDM index 1 within the fallback TTI. FIG. 15 shows a diagram of a mapping of Tx beams for fallback DCI to resources for a single RF chain mB. According to this mapping, Nwb=6, Nf=1 and Lc=3 and a WTRU and mB behavior during fallback TTI is provided according to such mapping.

$$tf = \mod\left(\frac{UE_{ID}}{N_F}\right)$$

In particular, FIG. 15 shows a diagram illustrating an example of fallback TTI and linkage between fallback DCI and fallback data, where the mB has one RF chain. In particular, a control channel fallback transmission scheme using fallback TTIs is shown such that a DL control channel in a fallback TTI may be repeated for one or more beam identities in a TDM manner. A WTRU may monitor and/or attempt to decode one or more of the control channels. Furthermore, the WTRU may use one Rx beam or sweep its Rx beam over a set of predefined or configured beam indices for monitoring/decoding the control channels.

$$tf = \mod\left(\frac{UE_{ID}}{N_F}\right)$$

During the TTIs that the mB configures as fallback, the mB may sweep the wide beam control channel using fallback DCI (DCI-B) for the WTRUs that may need control fallback. During the TTIs configured for fallback, the WTRU may monitor for both the regular DCI (DCI-A) and the fallback DCI (DCI-B). During the TTIs not configured for fallback (i.e., non-fallback TTIs), the WTRU may monitor for the regular DCI (DCI-A). The WTRU may not monitor for the fallback DCI (DCI-B) during the non-fallback TTIs.

$$tf = \mod\left(\frac{UE_{ID}}{N_F}\right)$$

The fallback DCI (DCI-B) may point to the DL resource assignment (time, frequency and beam) for fallback data. The mB may schedule fallback data repeated on multiple wide beams (e.g., B1, B2, B3 in FIG. 15), using smaller TBs (i.e., a smaller TB size).

$$tf = \mod\left(\frac{UE_{ID}}{N_F}\right)$$

In one example, the association between the fallback control (DCI-B) and the fallback data is shown in FIG. 15. The fallback data may be assigned on the same wide beam as the wide beam used for signaling the fallback control (DCI-B). In this case, in addition to the regular information carried in the DCI, DCI-B may also signal the offset (in TTIs) of the TTI that carries the fallback data, with respect to the current TTI (the offset may also be set to zero). Alternatively, the DCI-B may signal the beam ID or the beam index, and correspondingly the BRS of the beam that carries the fallback data.

$$\epsilon\epsilon\epsilon\epsilon tf = \mod\left(\frac{UE_{ID}}{N_F}\right)$$

Figure 16:
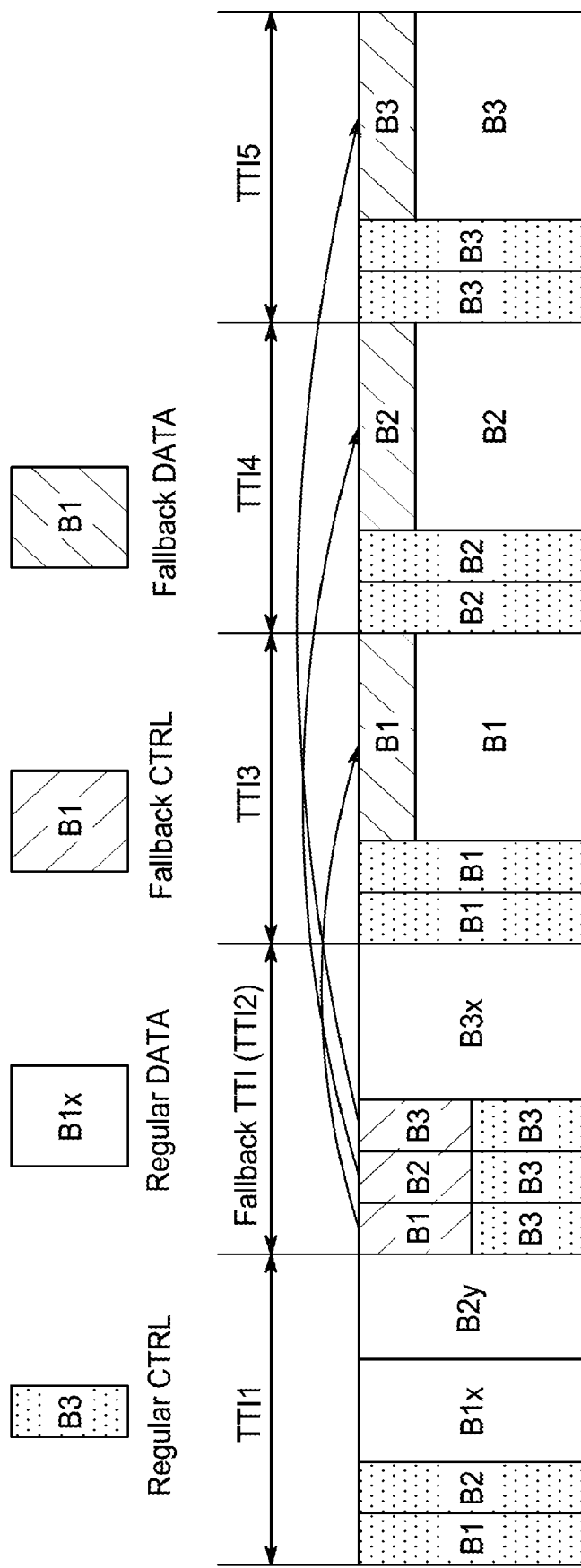
FIG. 16 shows a diagram illustrating an example of fallback TTI and linkage between fallback DCI and fallback data, where the mB supports multiple RF chains according to one or more embodiments.

Referring now to FIG. 16, FIG. 16 shows a diagram illustrating an example of fallback TTI and linkage between fallback DCI and fallback data, where the mB supports multiple RF chains. Since the mB may support multiple Tx RF chains, the mB may simultaneously transmit multiple beams during either the control region of the TTI, or the data region, or both. For example, in FIG. 16, the mB may simultaneously transmit control channels on beams B1 and B3 during the first time resource of the fallback TTI, followed by control channel on beams B2 and B3 during the second time resource of the fallback TTI, and so on. The time-frequency resources may be used across different beams in a SDM fashion. For this example, the mB may insert beam-specific reference signals (BRS) in the appropriate time-frequency resources to enable correct reception by the WTRU.

$$\epsilon\epsilon\epsilon\epsilon tf = \mod\left(\frac{UE_{ID}}{N_F}\right)$$

Uplink A/N feedback may be signaled by a WTRU that received fallback DCI-B using an UL Tx wide beam that matches the DL Rx beam that the fallback DCI-B was received on (as an example, use the same steering vector).

$$\epsilon\epsilon\epsilon\epsilon tf = \mod\left(\frac{UE_{ID}}{N_F}\right)$$

The WTRU may transmit UL A/N feedback for the fallback data that corresponds to the fallback DCI-Bs that the WTRU decoded. For example, if in FIG. 15, the UE successfully decoded DCI-B transmitted on beams B2 and B3 in the fallback TTI, but it did not decode DCI-B transmitted on beam B1, it may transmit UL A/N corresponding to the fallback data on Tx beam B2 in TTI4 and UL A/N corresponding to the fallback data on Tx beam B3 in TTI5.

$$\epsilon\epsilon\epsilon\epsilon tf = \mod\left(\frac{UE_{ID}}{N_F}\right)$$

The timing of the UL A/N feedback may be derived by the WTRU according to the duplexing mode that the system operates on. For example, if the system operates in a TDD mode (including dynamic or enhanced TDD operation), the UL A/N feedback for data received on Tx beam B2 in TTI4 may be transmitted in the UL transmission opportunity that meets the HARQ timing requirements. The mB may use the timing of the ACK transmitted by the WTRU, to determine the DL Tx beam ID of the successful reception of fallback control and data. Corresponding to that TTI, and in order to monitor for the UL A/N transmission from the WTRU, the mB may configure the UL Rx beam to match DL Tx beam B2.

$$\epsilon\epsilon\epsilon\epsilon tf = \mod\left(\frac{UE_{ID}}{N_F}\right)$$

The mB may continue transmitting fallback control (DCI-B) during the configured fallback TTIs, until either it receives a positive ACK for the current transport block, or a fallback timer expires.

$$\epsilon\epsilon\epsilon\epsilon tf = \mod\left(\frac{UE_{ID}}{N_F}\right)$$

If the WTRU correctly decodes a fallback DCI-B and its associated fallback data on a beam that is different from the current active beam, the mB may issue a measurement request for that different beam, or the WTRU may send a measurement report of the (preferred) different beam. If a measurement (e.g., signal quality or strength) in the measurement report is above a threshold, the mB may issue a beam switch command to the WTRU, while maintaining the same transmission mode. In another solution, if the WTRU correctly decodes the fallback data on only one of the fallback beams used for re-transmission, the mB may directly issue a beam switch command to the WTRU for the ACK'ed beam, and maintain the same transmission mode.

$$\epsilon\epsilon\epsilon\epsilon tf = \mod\left(\frac{UE_{ID}}{N_F}\right)$$

Figure 17:
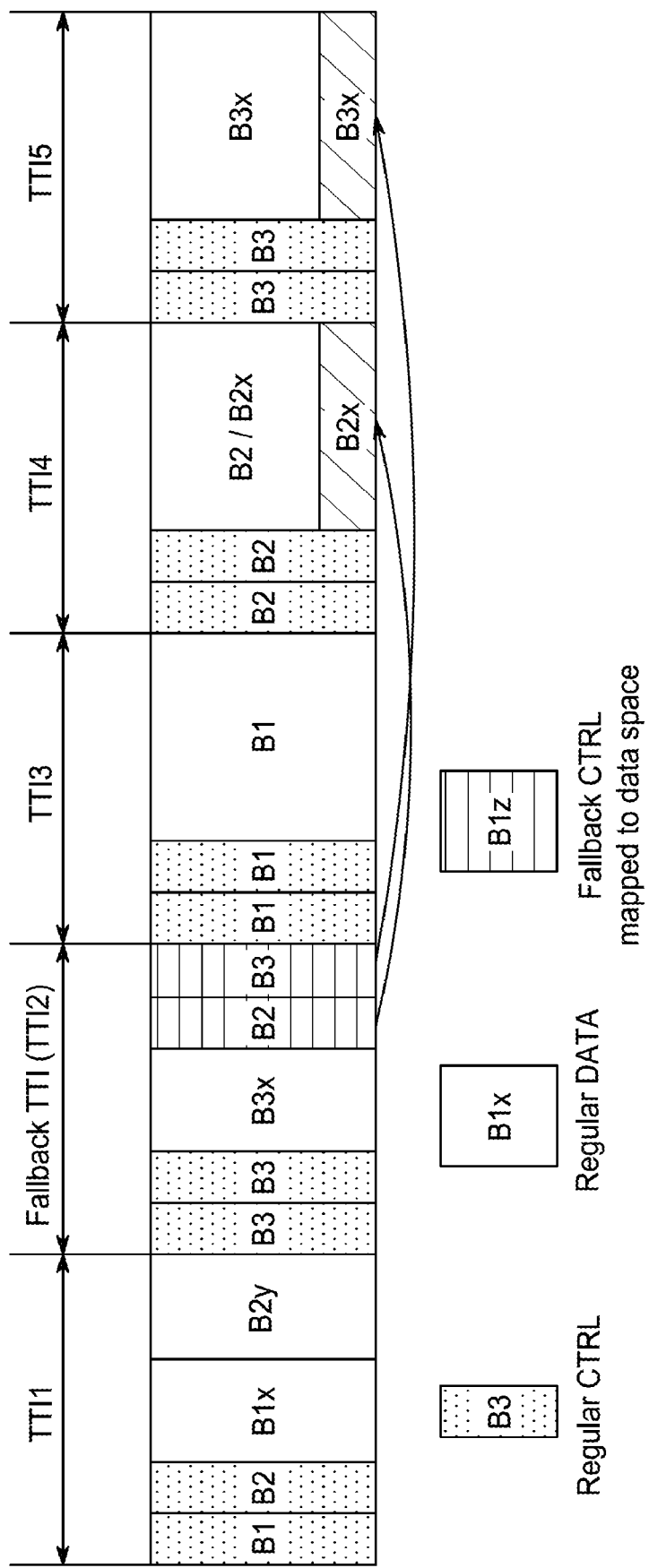
FIG. 17 shows a diagram of fallback DCI mapped to the data region, and linkage to fallback data according to one or more embodiments.

Fallback DCI using wide beam sweeping in the PDSCH region may be provided in one or more embodiments. For example, FIG. 17 shows a diagram of fallback DCI mapped to the data region, and linkage to fallback data, where the mB supports one or more RF chains. Accordingly, the fallback TTIs may be still be defined and assigned as described above, but within the fallback TTIs, the fallback DCI (DCI-B) may be mapped to the data region. This approach may be used for scenarios that require control channel congestion mitigation. To enable the WTRU to decode the fallback DCI (DCI-B), the mapping between the transmitted beam and the specific time-frequency resources may need to be known by the WTRU. This mapping may be cell-specific or WTRU specific, and may be signaled to the WTRU via broadcast signaling (MIB or SIB) or via RRC signaling.

$$\epsilon\epsilon\epsilon\epsilon tf = \mod\left(\frac{UE_{ID}}{N_F}\right)$$

In the example illustrated in FIG. 17, the end of the data region (and the start of the region that may be used for the fallback control channel) may be indicated explicitly via signaling, implicitly to the WTRU, or may be pre-defined. For single Tx RF chain mBs, the mB may sweep the fallback DCI (DCI-B) on multiple beams in a TDM fashion, according to the beam to resource mapping. In this case, the mB may apply beam-specific reference signals (BRS) to the time-frequency resources used for each beam. In the fallback TTI (TTI2) of FIG. 17, fallback DCI-B may be transmitted on Beam B2 during the data region of the TTI. BRS specific to beam B2 may need to be inserted in the time-frequency resources used for the DCI-B transmission with beam B2. Furthermore, BRS specific to beam B3 may need to be inserted in the time-frequency resources used for the DCI-B transmission with beam B3.

$$\in\in\in\in tf = \mod\left(\frac{UE_{ID}}{N_F}\right)$$

The mB may transmit fallback DCI in that data region if it determines the need to do so. If no WTRUs need fallback transmissions, the mB may reuse the time-frequency resources to schedule regular data. The WTRUs that may monitor for the fallback DCI during the fallback TTI may still attempt to blind decode the fallback control channel, but may not successfully detect the fallback control channel.

$$\in\in\in\in tf = \mod\left(\frac{UE_{ID}}{N_F}\right)$$

Figure 18:
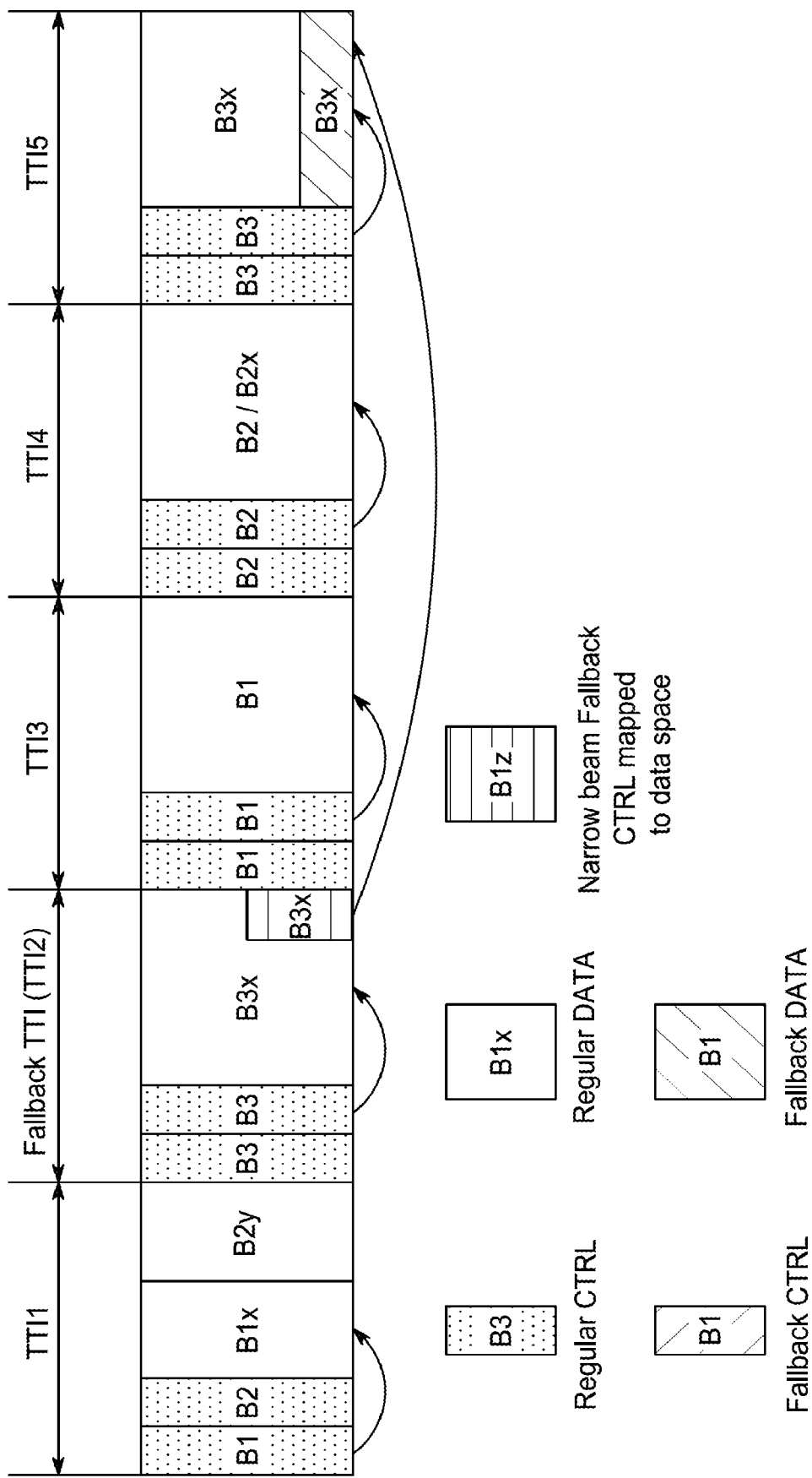
FIG. 18 shows a diagram illustrating fallback DCI mapped to the data region using narrow beam transmission according to one or more embodiments.

Referring now to FIG. 18, FIG. 18 shows a diagram illustrating fallback DCI mapped to the data region using narrow beam transmission. Accordingly, the fallback DCI may be transmitted in a narrow band within the assigned time-frequency resources in the data region of the TTI. This may allow the mB to use the rest of the frequency resource(s) for data transmission to the WTRUs operating in normal transmission mode. Mapping between the fallback TTI & time resource within a TTI and the mB DL beam for fallback DCI transmission may be done in a similar fashion as described above.

$$\in\in\in\in tf = \mod\left(\frac{UE_{ID}}{N_F}\right)$$

Figure 19:
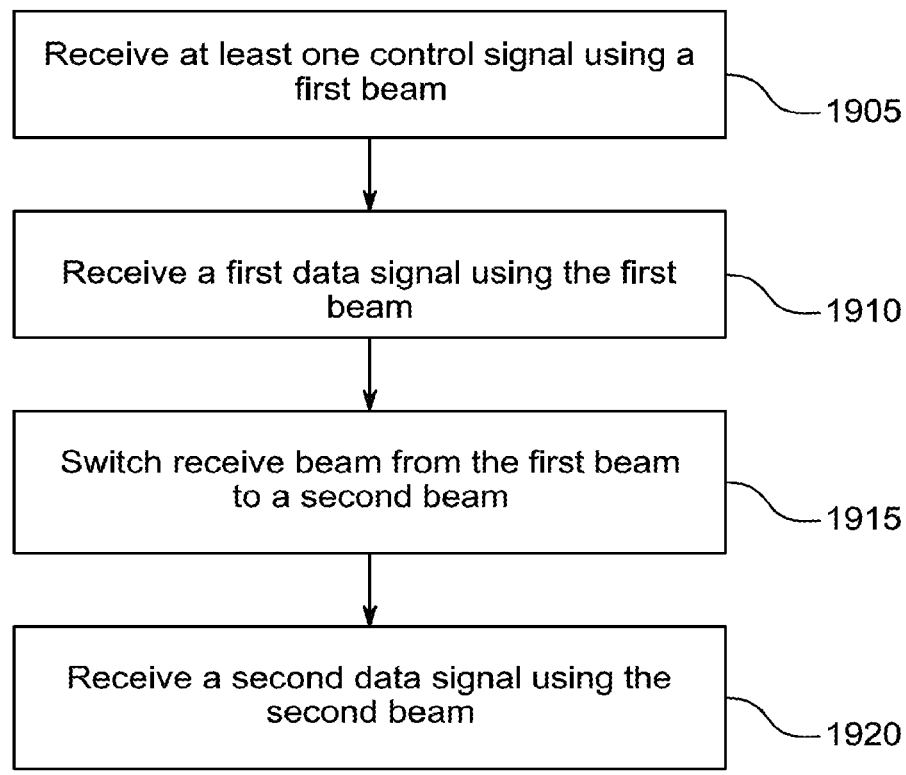
FIG. 19 shows a flow diagram utilizing a dual TB transmission scheme according to one or more embodiments.

FIG. 19 shows a flow diagram utilizing a dual TB transmission scheme, for example, as shown in FIG. 12, according to one or more embodiments. While FIG. 12 may serve as an example of a dual TB transmission scheme, process 1900 shown in FIG. 19 can be applied to any dual TB transmission scheme.

$$\in\in\in\in tf = \mod\left(\frac{UE_{ID}}{N_F}\right)$$

The process 1900, implemented by a WTRU while operating in the high frequency bands (e.g., above 6 GHz), includes receiving multiple signals in a time transmission interval (TTI) (operations 1905, 1910 and 1920). In particular, the receiving of multiple signals includes receiving at least one control signal (operation 1905) using a first beam associated with a first beam identifier (ID), receiving a first data signal (operation 1910) using the first beam associated with the first beam ID, and receiving a second data signal (operation 1920), subsequent to the first data signal, using a second beam associated with a second beam ID different from the first beam ID. At least one of the control signal(s) indicates the second beam ID. The process 1900 further includes switching a receive beam of the WTRU from the first beam to the second beam based on the second beam ID to receive the second data signal (operation 1915).

$$\in\in\in\in tf = \mod\left(\frac{UE_{ID}}{N_F}\right)$$

According to another embodiment, a method implemented by a WTRU includes receiving, in a time transmission interval (TTI), at least one control signal, a first transport block and a second transport block. The at least one control signal and the first transport block are received using a first beam, and the second transport block is received using a second beam that has a beam width that is more narrow than a beam width of the first beam. In addition, the first transport block and the second transport block are multiplexed using time division multiplexing such that the second transport block is received subsequent to the first transport block. The method further includes switching a receive beam of the WTRU from the first beam to the second beam, to receive the second transport block, based on beam information associated with the second beam received in one of the at least one control signal.

$$\in\in\in\in tf = \mod\left(\frac{UE_{ID}}{N_F}\right)$$

Figure 20:
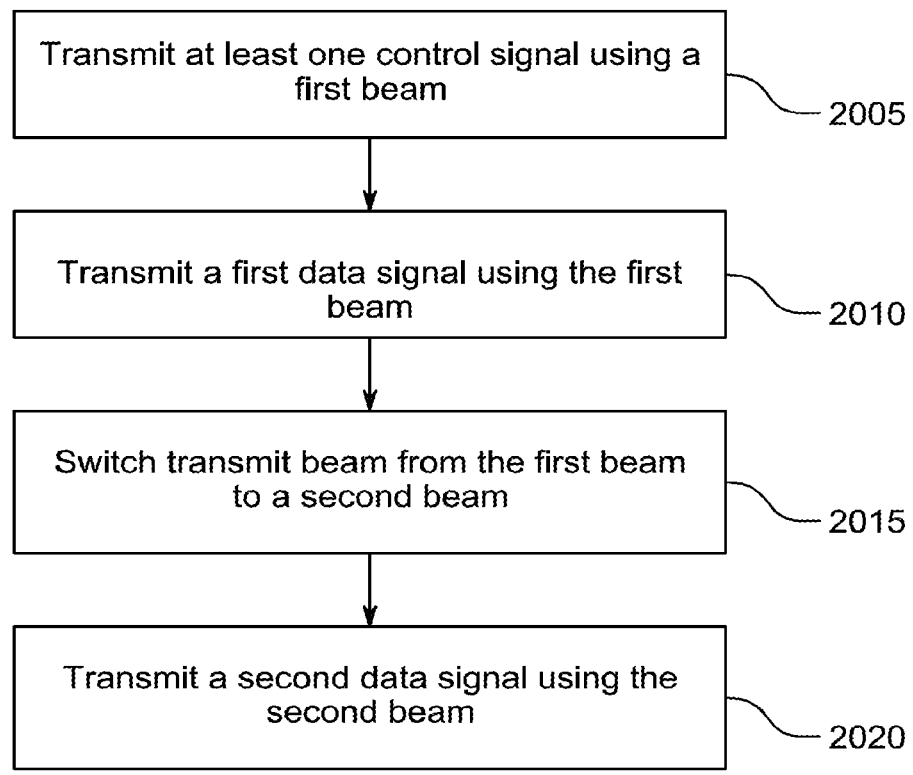
FIG. 20 shows a flow diagram utilizing a dual TB transmission scheme according to one or more embodiments.

FIG. 20 shows a flow diagram utilizing a dual TB transmission scheme, for example, as shown in FIG. 12, according to one or more embodiments. While FIG. 12 may serve as an example of a dual TB transmission scheme, the process shown in FIG. 20 can be applied to any dual TB transmission scheme.

$$\in\in\in\in tf = \mod\left(\frac{UE_{ID}}{N_F}\right)$$

The process 2000, implemented by wireless communication device (e.g., a base station, eNB, mB, or the like) while operating in the high frequency bands (e.g., above 6 GHz), includes transmitting multiple signals in a time transmission interval (TTI) (operations 2005, 2010 and 2020). In particular, the transmitting of multiple signals includes transmitting at least one control signal (operation 2005) using a first beam associated with a first beam identifier (ID), transmitting a first data signal (operation 20910) using the first beam associated with the first beam ID, and transmitting a second data signal (operation 2020), subsequent to the first data signal, using a second beam associated with a second beam ID different from the first beam ID. At least one of the control signal(s) indicates the second beam ID. The process 2000 further includes switching a transmit beam of the wireless communication device from the first beam to the second beam based on the second beam ID to transmit the second data signal (operation 2015).

$$\in\in\in\in tf = \mod\left(\frac{UE_{ID}}{N_F}\right)$$

According to another embodiment, a method implemented by a wireless communication device includes transmitting, in a time transmission interval (TTI), at least one control signal, a first transport block and a second transport block. The at least one control signal and the first transport block are transmitted using a first beam, and the second transport block is transmitted using a second beam that has a beam width that is more narrow than a beam width of the first beam. In addition, the first transport block and the second transport block are multiplexed using time division multiplexing such that the second transport block is transmitted subsequent to the first transport block. The method further includes switching a transmit beam of the wireless communication from the first beam to the second beam, to transmit the second transport block, based on beam information associated with the second beam transmitted in one of the at least one control signal.

$$\epsilon\epsilon\epsilon\epsilon tf = \mathrm{mod}\left(\frac{UE_{ID}}{N_F}\right)$$

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
a transceiver; and
a processor, wherein:
the processor is configured to measure a downlink quality associated with at least one first beam;
the processor is further configured to determine whether the measured downlink quality associated with the at least one first beam is below a threshold value; and
the transceiver and the processor are further configured to receive at least one control channel transmission using a determined second beam, based on, in part, a determination that the measured downlink quality associated with the at least one first beam is below the threshold value, wherein the determined second beam used to receive the at least one control channel transmission is a same beam that is used to receive an associated data channel transmission.

2. The WTRU of claim 1, wherein the determined second beam is from a set of beams, wherein the set of beams are received via higher layer signaling.

3. The WTRU of claim 1, wherein the control channel transmission is a physical downlink control channel (PDCCH) transmission.

4. The WTRU of claim 1, wherein the data channel transmission is a physical downlink shared channel (PDSCH) transmission.

5. The WTRU of claim 1, wherein the at least one first beam is different than the determined second beam.

6. The WTRU of claim 1, wherein the transceiver and the processor are further configured to receive at least one control channel transmission of a third beam, based on, in part, a determination that the measured downlink quality is not below the threshold value, wherein the third beam is different than the determined second beam.

7. The WTRU of claim 1, wherein the determined second beam is a fallback beam.

8. The WTRU of claim 1, wherein the determined second beam is associated with a transmission scheme.

9. The WTRU of claim 1, wherein the measured downlink quality is reference signal received power (RSRP).

10. The WTRU of claim 1, wherein the processor is further configured to:
measure a plurality of beams; and
report an indication of a beam associated with a highest measured value to a base station.

11. A method implemented by a wireless transmit/receive unit (WTRU), the method comprising:
measuring a downlink quality associated with at least one first beam;
determining whether the measured downlink quality associated with the at least one first beam is below a threshold value; and
receiving at least one control channel transmission using a determined second beam, based on, in part, a determination that the measured downlink quality associated with the at least one first beam is below the threshold value, wherein the determined second beam used to receive the at least one control channel transmission is a same beam that is used to receive an associated data channel transmission.

12. The method of claim 11, wherein the determined second beam is from a set of beams, wherein the set of beams are received via higher layer signaling.

13. The method of claim 11, wherein the control channel transmission is a physical downlink control channel (PDCCH) transmission.

14. The method of claim 11, wherein the data channel transmission is a physical downlink shared channel (PDSCH) transmission.

15. The method of claim 11, wherein the at least one first beam is different than the determined second beam.

16. The method of claim 11, further comprising receiving at least one control channel transmission of a third beam, based on, in part, a determination that the measured downlink quality is not below the threshold value, wherein the third beam is different than the determined second beam.

17. The method of claim 11, wherein the determined second beam is a fallback beam.

18. The method of claim 11, wherein the determined second beam is associated with a transmission scheme.

19. The method of claim 11, wherein the measured downlink quality is reference signal received power (RSRP).

20. The method of claim 11, further comprising:
measuring a plurality of beams; and
reporting an indication of a beam associated with a highest measured value to a base station.

* * * * *